US011012657B2

(12) United States Patent
Hur et al.

(10) Patent No.: US 11,012,657 B2
(45) Date of Patent: May 18, 2021

(54) METHOD FOR PROCESSING OVERLAY IN 360-DEGREE VIDEO SYSTEM AND APPARATUS FOR THE SAME

(71) Applicant: LG ELECTRONICS INC., Seoul (KR)

(72) Inventors: Hyejung Hur, Seoul (KR); Sejin Oh, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 16/436,352

(22) Filed: Jun. 10, 2019

(65) Prior Publication Data

US 2019/0379856 A1 Dec. 12, 2019

(30) Foreign Application Priority Data

Jun. 8, 2018 (KR) .................. 10-2018-0066307
Jul. 4, 2018 (KR) .................. 10-2018-0077375

(51) Int. Cl.
*H04N 5/445* (2011.01)
*H04N 5/232* (2006.01)
(Continued)

(52) U.S. Cl.
CPC ....... *H04N 5/44504* (2013.01); *G06F 16/583* (2019.01); *G06F 16/5866* (2019.01); *H04N 5/23238* (2013.01)

(58) Field of Classification Search
CPC combination set(s) only.
See application file for complete search history.

(56) References Cited

U.S. PATENT DOCUMENTS 6,542,162 B1 * 4/2003 Hrusecky ............... H04N 9/641
345/549
7,719,563 B2 * 5/2010 Richards .............. H04N 21/242
348/36

(Continued)

FOREIGN PATENT DOCUMENTS

KR 1020120133006 A 12/2012
KR 20130135828 A * 12/2013 ........... H04N 13/161

(Continued)

OTHER PUBLICATIONS

KK Sreedhar, Viewport-Adaptive Encoding and Streaming of 360-Degree Video for Virtual Reality Applications,Dec. 2016, IEEE International Symposium on Multimedia (ISM), pp. 583-586 (Year: 2016).*

(Continued)

*Primary Examiner* — Motilewa Good Johnson
(74) *Attorney, Agent, or Firm* — Dentons US LLP

(57) ABSTRACT

A 360-degree image data processing method performed by a 360-degree video reception apparatus, the method including: receiving 360-degree image data, obtaining information on an encoded picture and metadata from the 360-degree image data, decoding a picture based on the information on the encoded picture, and rendering the decoded picture and an overlay based on the metadata, wherein the metadata includes overlay related metadata, wherein the overlay is rendered based on the overlay related metadata, and wherein the overlay related metadata include packing information of the overlay.

20 Claims, 75 Drawing Sheets

(51) Int. Cl.
*G06F 16/58* (2019.01)
*G06F 16/583* (2019.01)

(56) References Cited

U.S. PATENT DOCUMENTS

| | | | |
|---|---|---|---|
| 9,704,298 B2* | 7/2017 | Espeset | G06T 15/04 |
| 10,424,082 B2* | 9/2019 | Boyce | G06T 1/60 |
| 2010/0001997 A1* | 1/2010 | Kajikawa | G06T 15/20 |
| | | | 345/419 |
| 2010/0226593 A1 | 9/2010 | Gerhard et al. | |
| 2011/0254915 A1 | 10/2011 | Vincent et al. | |
| 2013/0051646 A1* | 2/2013 | Nakano | G16H 30/20 |
| | | | 382/131 |
| 2013/0106855 A1* | 5/2013 | Urbach | G06T 15/08 |
| | | | 345/424 |
| 2014/0375764 A1* | 12/2014 | Choe | H04N 13/161 |
| | | | 348/43 |
| 2015/0156469 A1* | 6/2015 | Qu | G09G 5/006 |
| | | | 348/43 |
| 2016/0073155 A1* | 3/2016 | Subramaniam | H04N 21/4316 |
| | | | 725/32 |
| 2016/0088287 A1* | 3/2016 | Sadi | H04N 13/271 |
| | | | 348/43 |
| 2016/0261927 A1* | 9/2016 | Smolic | H04N 21/8133 |
| 2016/0379415 A1* | 12/2016 | Espeset | G06T 15/04 |
| | | | 345/633 |
| 2017/0237965 A1* | 8/2017 | Wang | H04N 21/85406 |
| | | | 348/42 |
| 2017/0332085 A1* | 11/2017 | Ramasubramonian | |
| | | | H04N 19/167 |
| 2018/0061002 A1* | 3/2018 | Lee | H04N 19/597 |
| 2018/0199044 A1* | 7/2018 | Wang | H04N 21/234 |
| 2018/0278985 A1* | 9/2018 | De Haan | H04N 21/845 |
| 2018/0279014 A1* | 9/2018 | Chen | H04N 5/2624 |
| 2018/0295282 A1* | 10/2018 | Boyce | H04L 65/4092 |
| 2018/0332265 A1* | 11/2018 | Hwang | H04N 13/156 |
| 2018/0342267 A1* | 11/2018 | Popa | H04N 21/21805 |
| 2018/0343470 A1* | 11/2018 | Schmit | H04N 19/593 |
| 2018/0376152 A1* | 12/2018 | Wang | H04N 19/33 |
| 2019/0020863 A1* | 1/2019 | Wang | H04N 13/243 |
| 2019/0141311 A1* | 5/2019 | Lee | H04N 19/597 |
| 2019/0197661 A1* | 6/2019 | Choi | H04N 21/816 |
| 2019/0243881 A1* | 8/2019 | Zia | G06F 16/955 |
| 2019/0306519 A1* | 10/2019 | Chen | H04N 19/33 |
| 2019/0313081 A1* | 10/2019 | Oh | H04N 13/117 |

FOREIGN PATENT DOCUMENTS

| | | | | |
|---|---|---|---|---|
| WO | 2017142353 A1 | 8/2017 | | |
| WO | WO-2017142353 A1 * | 8/2017 | | H04N 19/597 |

OTHER PUBLICATIONS

Zare et al., 6K Effective Resolution with 4K HEVC Decoding Capability for OMAF-compliant 360 Video Streaming, ACM, 2018, pp. 72-77 (Year: 2018).*

Oh, MPEG Omnidirectional Media Format (OMAF) for 360 Media, JBE, vol. 22, No. 5, p. 1-8, (Year: 2017).*

Podborski et al., Virtual Reality and DASH, ResearchGate, pp. 1-11, 2017 (Year: 2017).*

* cited by examiner

FIG. 9A
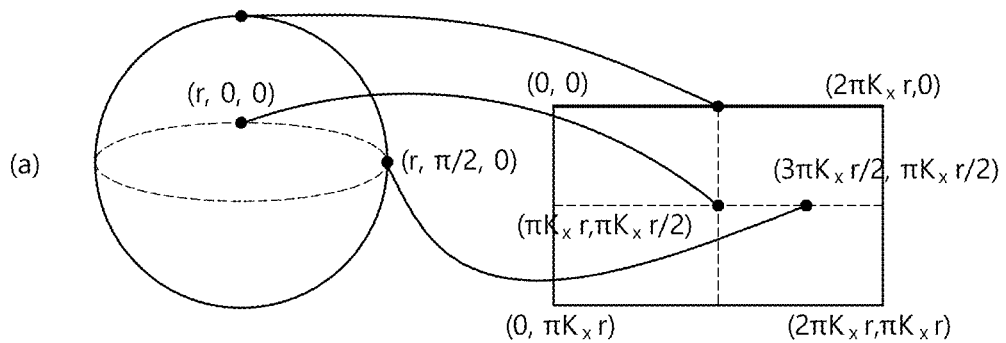
(a)
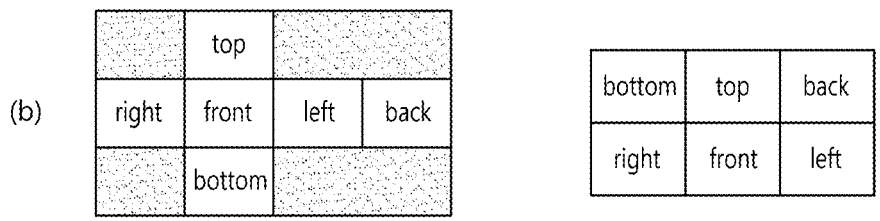
(b)
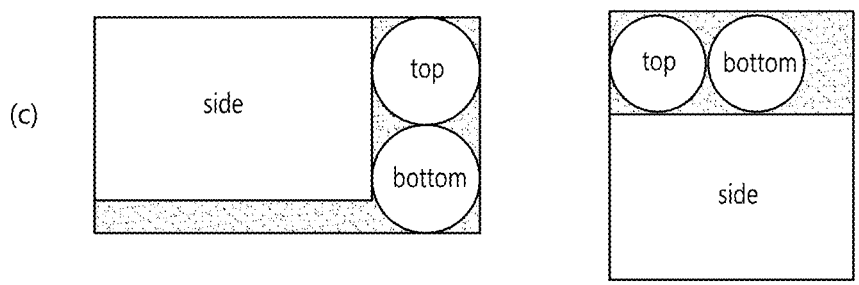
(c)
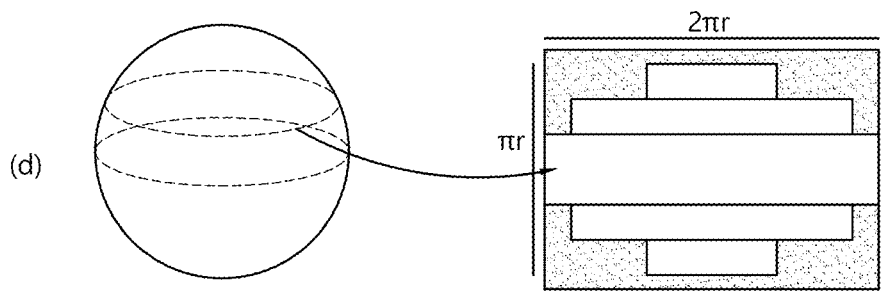
(d)

FIG. 9B
(e) 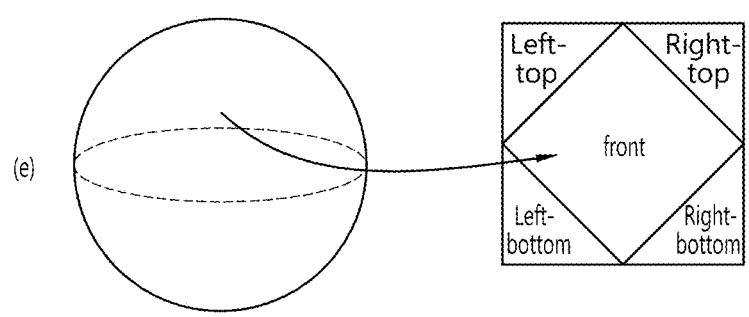
(f) 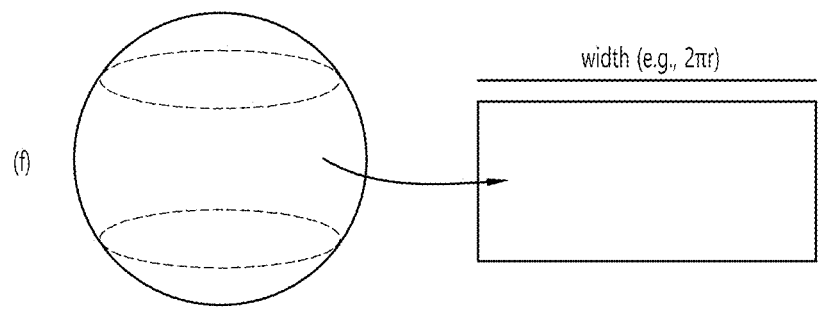
(g) 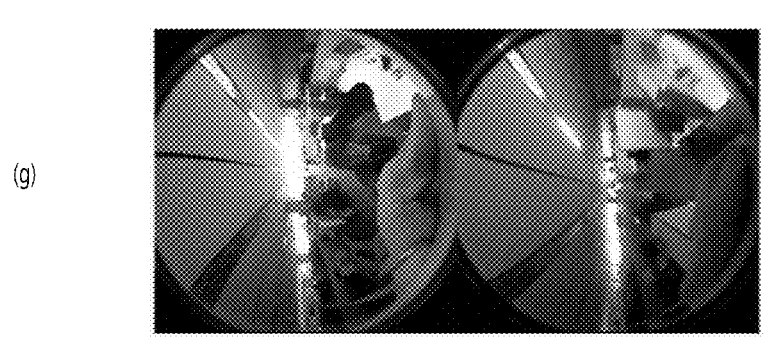

FIG. 11

```
...
        <Basic metadata>
unsigned      int(8)      vr_geometry;
unsigned      int(8)      projection_schme;
        <Stereoscopic related metadata>
unsigned      int(1)      is_stereoscopic;
unsigned      int(3)      stereo_mode;
        <Initial View related metadata>
signed        int(8)      initial_view_yaw_degree;
signed        int(8)      initial_view_pitch_degree;
signed        int(8)      initial_view_roll_degree;
        <ROI related metadata>
unsigned int(1)           2d_roi_range_flag;
unsigned int(1)           3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <FOV related metadata>
unsigned int(1)           content_fov_flag;
if (content_fov_flag==1) {
  unsigned int(16)        content_fov;
}
        <Cropped Region related metadata>
unsigned int(1)           is_copped_region;
if (content_fov_flag==1) {
  unsigned int(16)        cr_region_left_top_x;
  unsigned int(16)        cr_region_left_top_y;
  unsigned int(16)        cr_region_width;
  unsigned int(16)        cr_region_height;
}
...
```

FIG. 26
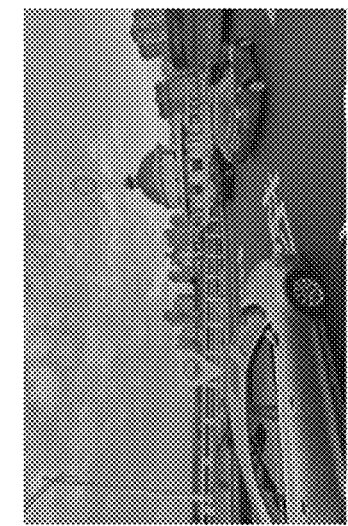
OVERLAY RENDERED ON 360-DEGREE VIDEO
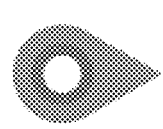
OVERLAID IMAGE
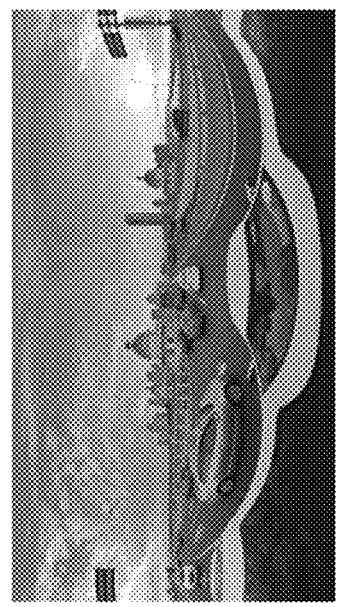
360-DEGREE VIDEO

FIG. 28

| # of IMAGE | 1 | N (SUB-SAMPLE) | 1 | M (SUB-SAMPLE) |
|---|---|---|---|---|
| # of OVERLAY | 1 | N | N | M |
| Example | | | | |
| | Case1 | Case2 | Case3 | Case4 |

*IMAGE TO WHICH TEXTURE ATLAS HAS BEEN APPLIED

WHEN PLACED ON 3D SPACE

METHOD FOR PROCESSING OVERLAY IN 360-DEGREE VIDEO SYSTEM AND APPARATUS FOR THE SAME

CROSS-REFERENCE TO RELATED APPLICATIONS

Pursuant to 35 U.S.C. § 119 (e), this application claims the benefit of KR Provisional Application Nos. 10-2018-0066307 filed on Jun. 8, 2018, and 10-2018-0077375 filed on Jul. 4, 2018, the contents of which are all hereby incorporated by reference herein in their entirety.

BACKGROUND OF THE INVENTION

Technical Field

The present invention relates to a 360-degree video, and more particularly to a method for processing an overlay in a 360-degree video system and an apparatus for the same.

Background Art

A virtual reality (VR) system provides a user with sensory experiences through which the user may feel as if he/she were in an electronically projected environment. An Augmented Reality (AR) system overlay a three-dimensional (3D) virtual image on an actual image or background of a real word, thereby allowing a user to feel as if the user is placed in an environment where a virtual reality and the real word are mixed. A system for providing VR may be further improved in order to provide higher-quality images and spatial sound. The VR or AR system may enable the user to interactively enjoy VR or AR content.

DISCLOSURE

Technical Problem

An object of the present invention is to provide a method and an apparatus for processing 360 video data.

Another objective of the present invention is to provide a method and an apparatus for transmitting metadata related to 360 video data.

Yet another objective of the present invention is to provide a method and an apparatus for processing an overlay for a 360 video.

Yet another objective of the present invention is to provide a method and an apparatus for transmitting metadata related to an overlay for a 360 video.

Technical Solution

According to an embodiment of the present invention, there is provided a 360-degree image data processing method performed by a 360-degree video reception apparatus. The method includes: receiving 360-degree image data; obtaining information on an encoded picture and metadata from the 360-degree image data; decoding a picture based on the information on the encoded picture; and rendering the decoded picture and an overlay based on the metadata, wherein the metadata includes overlay related metadata, wherein the overlay is rendered based on the overlay related metadata, and wherein the overlay related metadata include packing information of the overlay.

According to another embodiment of the present invention, there is provided a 360-degree image data processing method performed by a 360-degree image transmission apparatus. The method includes: obtaining a 360-degree image; deriving a picture by processing the 360-degree image; generating metadata related to the 360-degree image; encoding the picture; and performing a process for storing or transmitting the encoded picture and the metadata, wherein the metadata includes metadata related to an overlay, and wherein the metadata related to the overlay comprises packing information of the overlay According to yet another embodiment of the present invention, there is provided a 360-degree video reception apparatus. The 360-degree video reception apparatus includes: a reception processor configured to receive 360-degree image data, and obtain information on an encoded picture and metadata from the 360-degree image data; a data decoder configured to decode a picture based on the information on the encoded picture; and a renderer configured to render the decoded picture and an overlay based on the metadata, wherein the metadata includes overlay related metadata, wherein the renderer is configured to render the overlay based on the overlay related metadata, and wherein the overlay related metadata include packing information of the overlay.

According to yet another embodiment of the present invention there is provided a 360-degree video transmission apparatus. The 360-degree video transmission apparatus includes: a data input unit configured to obtain a 360-degree image; a projection processor configured to derive a picture by processing the 360-degree image; a metadata processor configured to generate metadata related to the 360-degree image; a data encoder configured to encoding the picture; and a transmission processor configured to perform a process for storing or transmitting the encoded picture and the metadata, wherein the metadata includes metadata related to an overlay, and wherein the metadata related to the overlay comprises packing information of the overlay

Advantageous Effects

According to the present invention, it is possible to efficiently transmit VR content (360 content) in an environment that supports next-generation hybrid broadcast using a territorial broadcasting network and the Internet network.

According to the present invention, it is possible to provide interactive experience to a user who is enjoying 360 content.

According to the present invention, there may be proposed a method for performing signaling so as to reflect exactly what a 360 content producer intends, when it comes to a user's comsunption of a 360 content.

According to the present invention, there may be provided a method for efficiently increasing a transmission capacity and deliver necessary information, when it comes to 360 content delivery.

According to the present invention, it is possible to efficiently provide an overlay on a 360 video and to efficiently display additional information based on a user's point of view.

According to the present invention, it is possible to provide a link to a specific target through an overlay on a 360 video.

According to the present invention, it is possible to provide a link for efficient screen transition or additional information provision through an overlay.

According to the present invention, it is possible to efficiently store and transmit signaling information on 360-degree video data using an International Organization for Standardization (ISO)-based media file format such as an ISO base media file format (ISOBMFF).

According to the present invention, it is possible to transmit signaling information on 360-degree video data through HyperText Transfer Protocol (HTTP)-based adaptive streaming, such as Dynamic Adaptive Streaming over HTTP (DASH).

According to the present invention, it is possible to store and transmit signaling information on 360-degree video data through Supplemental enhancement information (SEI) message or Video Usability Information (VUI), thereby enhancing overall transmission efficiency.

DESCRIPTION OF DRAWINGS

FIGS. 9A to 9B exemplarily show projection formats according to some embodiments of the present invention.

FIG. 11 is a diagram showing an example of 360-degree-video related metadata according to an embodiment of the present invention.

FIG. 26 is an example of an overlay of a 360 video.

FIG. 28 is an example of four types of an overlay media packing in File #1.

DETAILED DESCRIPTION

Figure 1:
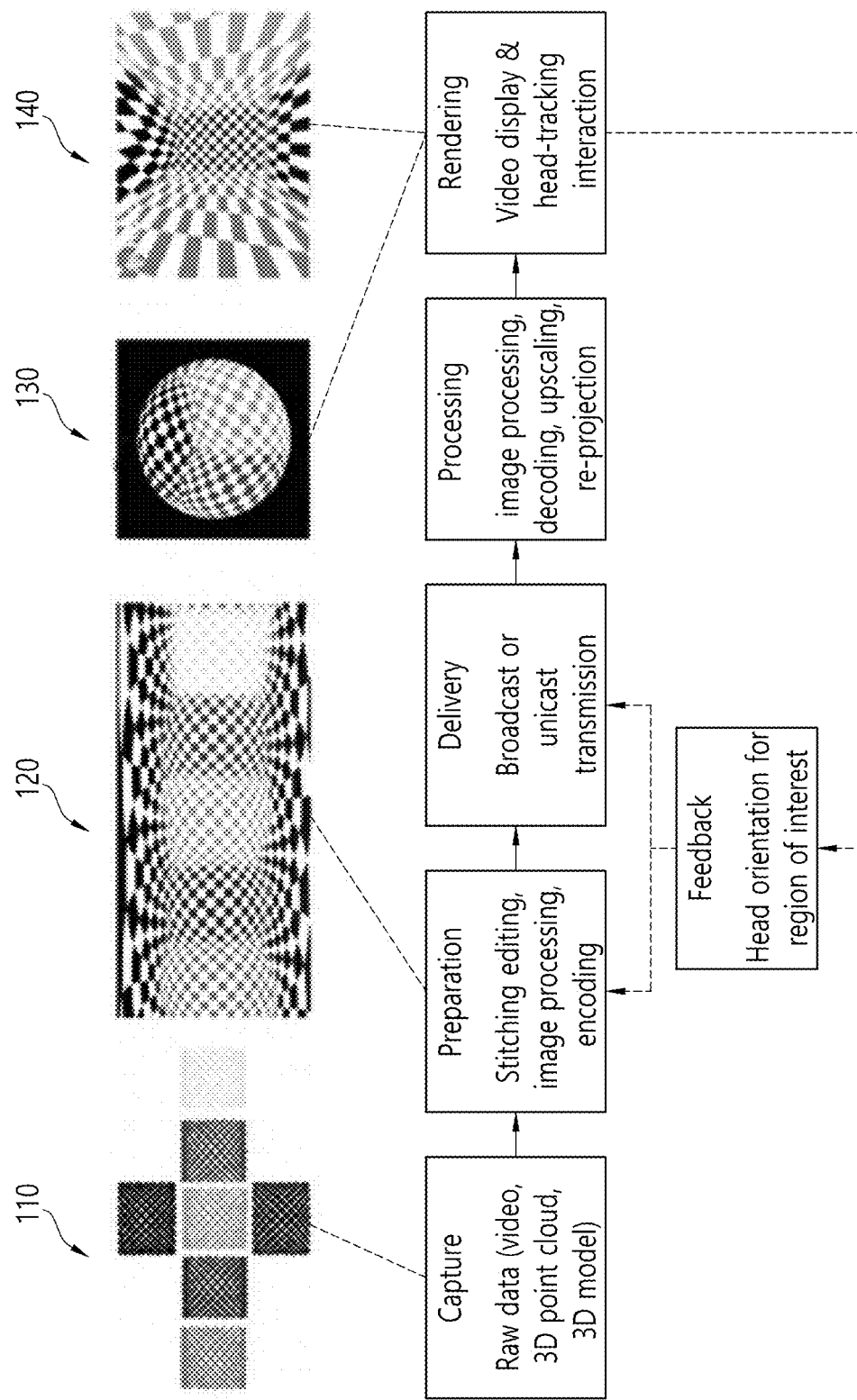
FIG. 1 is a diagram showing an overall architecture for providing 360 contents according to an embodiment of the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 contents according to an embodiment of the present invention.

VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 260-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel.

An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present invention may have a file format based on ISO base media file format (ISO BMFF).

Figure 2:
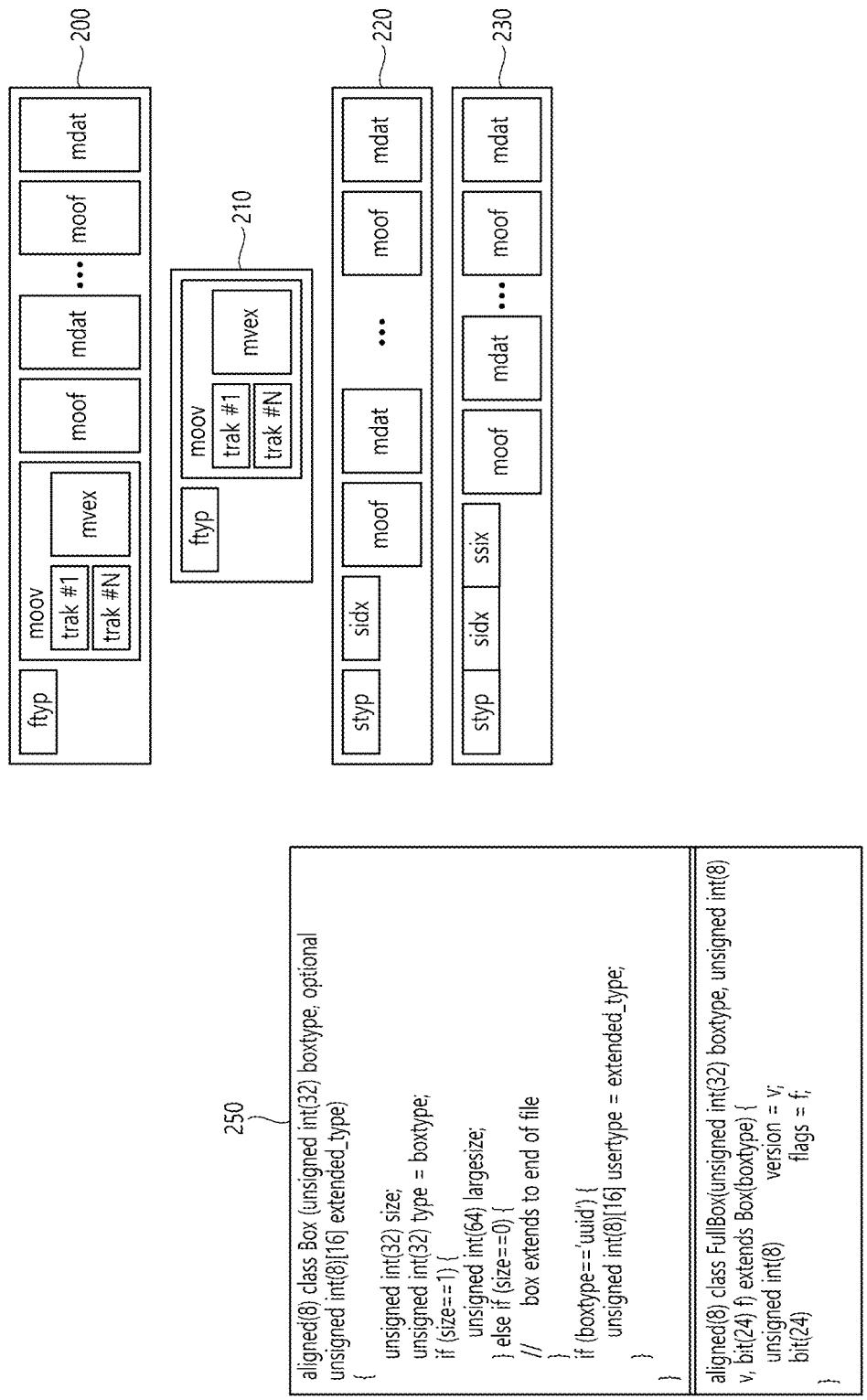
FIGS. 2 and 3 are diagrams illustrating the structure of a media file according to an aspect of the present invention.
Figure 3:
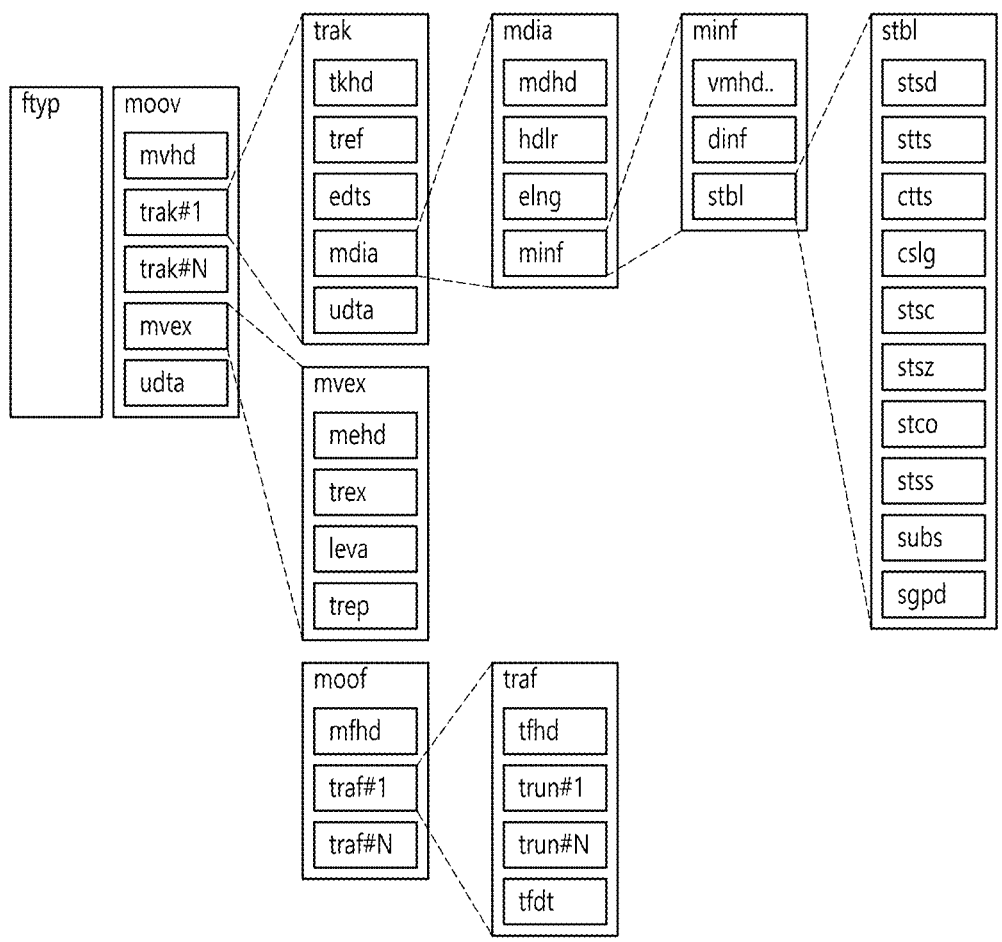

FIGS. 2 and 3 are diagrams illustrating the structure of a media file according to an aspect of the present invention.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) related to 360-degree video according to an embodiment of the present invention may be included in a DASH-based adaptive streaming model to be transmitted.

Figure 4:
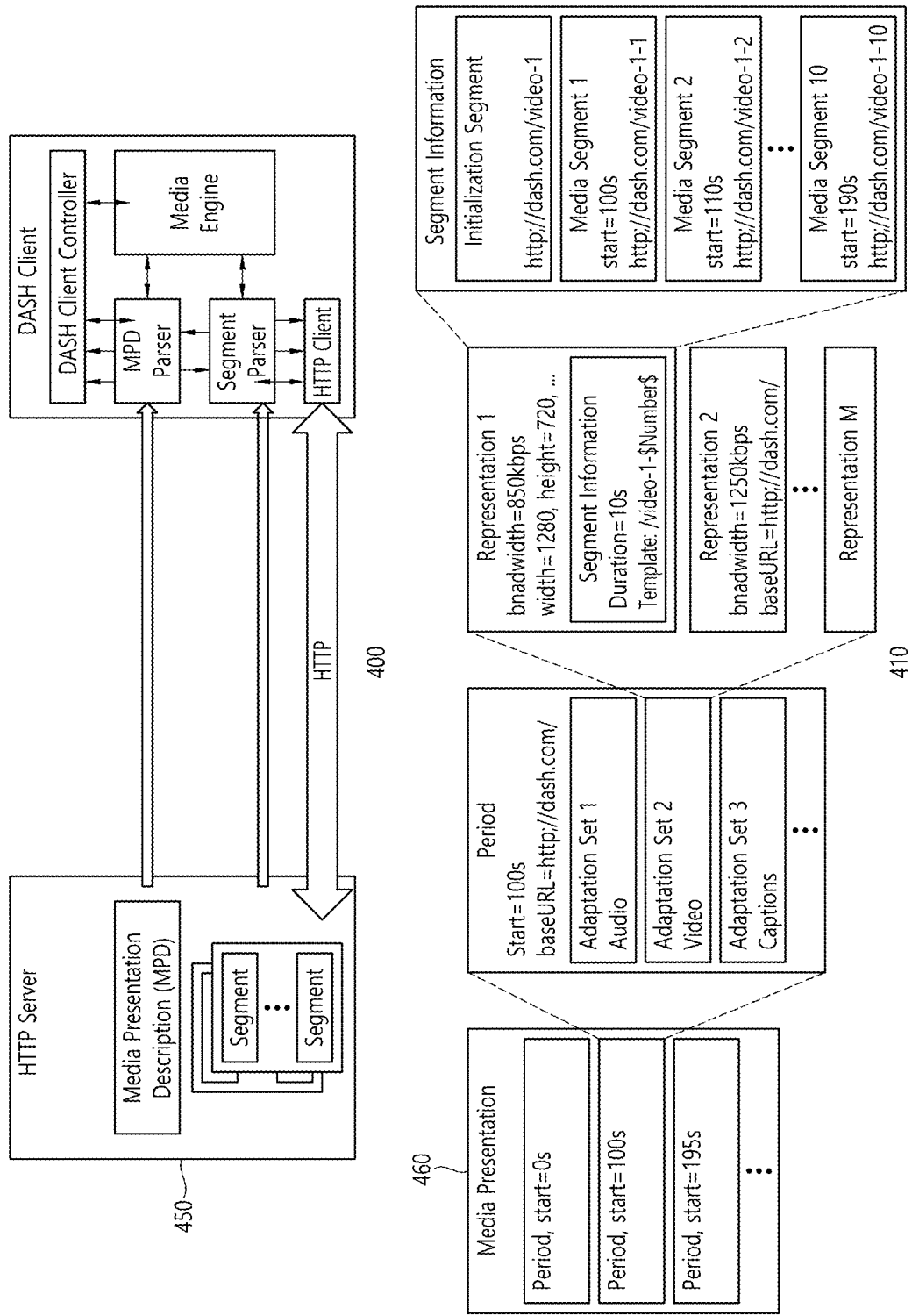
FIG. 4 is a diagram illustrating the overall operation of a Dynamic Adaptive Streaming over HTTP (DASH)-based adaptive streaming model according to an embodiment of the present invention.

FIG. 4 is a diagram illustrating the overall operation of a DASH-based adaptive streaming model according to an embodiment of the present invention.

A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 5:
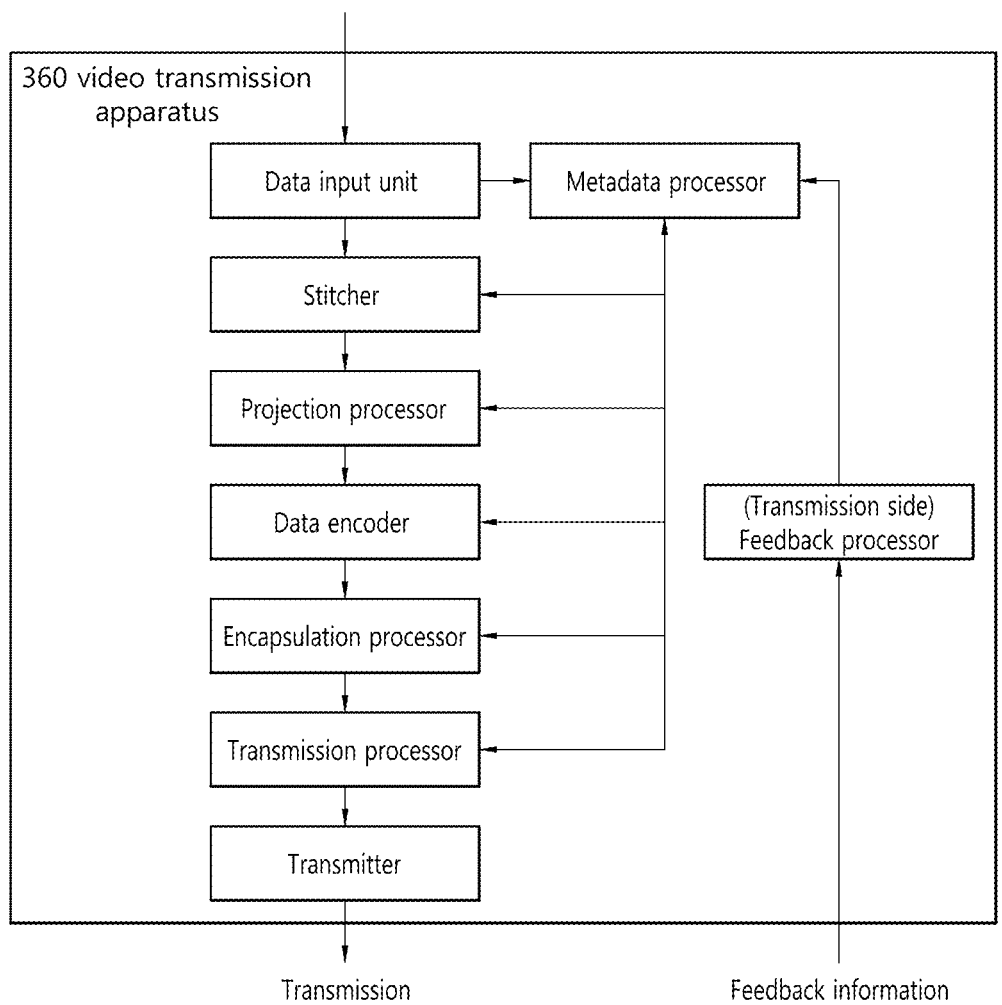
FIG. 5 is a diagram schematically showing configuration of a 360 video transmission apparatus according to an embodiment of the present invention.

FIG. 5 is a diagram schematically showing configuration of a 360 video transmission apparatus according to an embodiment of the present invention.

The 360 video transmission apparatus according to an embodiment can perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to an embodiment, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to an embodiment, the 360 video transmission apparatus may further include a (transmission side) feedback processor and/or a network interface (not shown) as internal/external elements. The network interface can receive feedback information from a 360 video reception apparatus according to an embodiment and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to an embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to an embodiment, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to an embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to an embodiment may be hardware elements. According to an embodiment, the internal/external elements may be changed, omitted, replaced by other elements or integrated.

Figure 6:
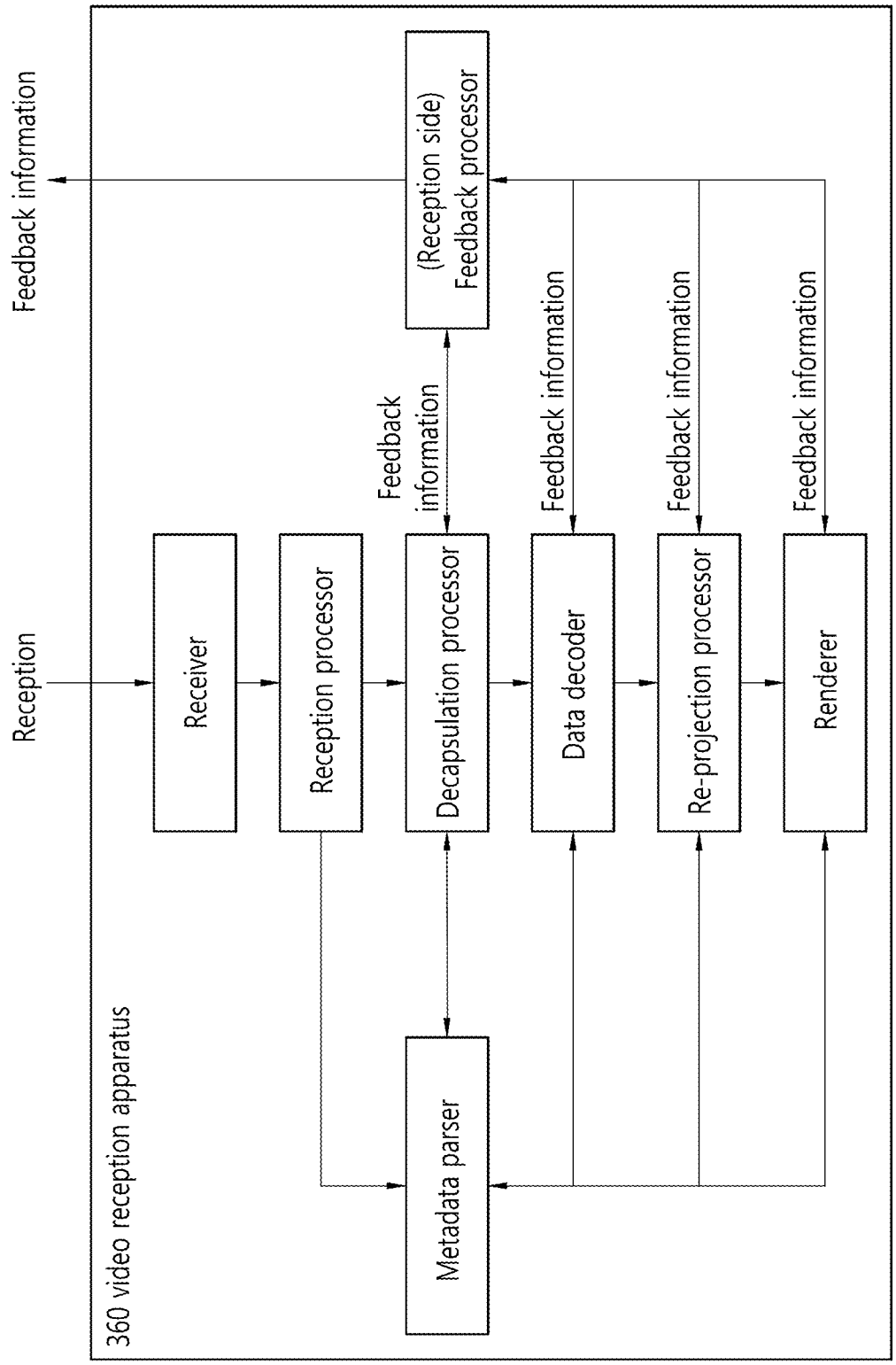
FIG. 6 is a diagram schematically illustrating a configuration of a 360 video reception apparatus according to an embodiment.

FIG. 6 is a diagram schematically illustrating a configuration of a 360 video reception apparatus according to an embodiment.

The 360 video reception apparatus according to an embodiment can perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360 video data transmitted from the 360 video transmission apparatus according to an embodiment. The receiver may receive the 360 video data through a broadcast network or a broadband depending on a channel through which the 360 video data is transmitted.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to an embodiment, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to an embodiment may be hardware elements. According to an embodiment, the internal/external elements may be changed, omitted, replaced by other elements or integrated. According to an embodiment, additional elements may be added to the 360 video reception apparatus.

In another aspect, the operation method of the 360 video reception apparatus according to the aforementioned embodiment may be related to a 360 video transmitting method and a 360 video receiving method. The 360 video transmitting/receiving method according to an embodiment may be performed by the aforementioned 360 video transmission/reception apparatus or embodiments of the apparatus.

Respective embodiments of the 360 video transmission/reception apparatus and the 360 video transmission/reception method according to the aforementioned embodiments, and embodiments of inner/external elements thereof may be combined. For example, embodiments of the projection processor and embodiments of the data encoder may be combined to produce embodiments of the 360 video transmission apparatus as much as the combined embodiments of the projection processor and the data encoder.

Figure 7:
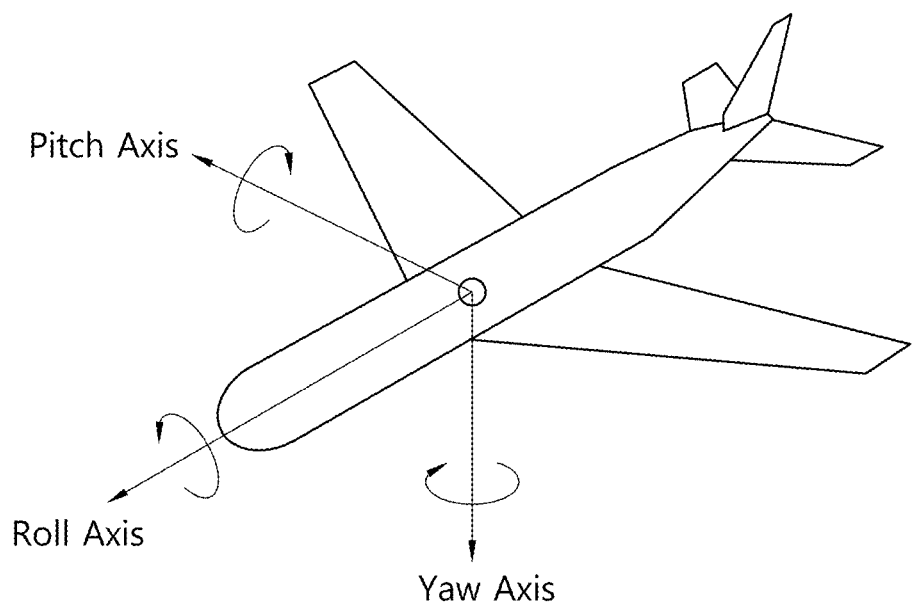
FIG. 7 is a diagram showing the concept of aircraft principal axes for describing 3D space according to an embodiment of the present invention.

FIG. 7 is a diagram showing the concept of aircraft principal axes for describing 3D space according to an embodiment of the present invention.

In the present invention, the concept of aircraft principal axes may be used in order to express a specific point, position, direction, distance, area, etc. in the 3D space. That is, in the present invention, the 3D space before projection or after re-projection may be described, and the concept of principal aircraft axes may be used in order to perform signaling thereon.

In some embodiments, a method of using an orthogonal coordinate system or a spherical coordinate system using X, Y, and Z-axes may be used.

An aircraft may freely rotate in three dimensions. Axes constituting the three dimensions are referred to as a pitch axis, a yaw axis, and a roll axis. In the present specification, these terms may also be expressed either as pitch, yaw, and roll or as a pitch direction, a yaw direction, and a roll direction.

In one example, the roll axis may correspond to X axis in the orthogonal coordinate system or the back-to-front axis. Or, in the shown concept of principal aircraft axes, the roll axis may be an axis extending from the forward portion to the tail of the aircraft. Rotation in the roll direction may be rotation performed about the roll axis. The range of a roll value indicating an angle of rotation about the roll axis may be between −180 degree and 180 degree. In this case, −180 degree and 180 degree, which are edge values, may be included in the range of a roll value.

In another embodiment, the pitch axis may correspond to Y axis in the orthogonal coordinate system or the side-to-side axis. Or, the pitch axis may be an axis about which the forward portion of the aircraft is rotated upwards/downwards. In the shown concept of principal aircraft axes, the pitch axis may be an axis extending from one wing to another wing of the aircraft. The range of a pitch value indicating an angle of rotation about the pitch axis may be between −90 degree and 90 degree. In this case, −90 degree and 90 degree, which are edge values, may be included in the range of a pitch value.

In yet another example, the yaw axis may correspond to Z axis in the orthogonal coordinate system or the vertical axis. Or, the yaw axis may be an axis about which the forward portion of the aircraft is rotated leftwards/rightwards. In the shown concept of principal aircraft axes, the yaw axis may be an axis extending from the top to the bottom of the aircraft. The range of a yaw value indicating an angle of rotation about the yaw axis may be between −180 degree and 180 degree. In this case, −180 degree and 180 degree, which are edge values, may be included in the range of a yaw value.

The center point, which is the basis for determining the yaw axis, the pitch axis, and the roll axis in a 3D space according to an embodiment, may not be static.

As described above, the 3D space in the present invention may be described using the pitch, yaw, and roll concept.

Meanwhile, as described above, video data projected on a 2D image may undergo a region-wise packing process in order to improve video coding efficiency. The region-wise packing process may be a process of individually processing the video data projected on the 2D image for each region. The term "regions" may indicate divided parts of the 2D image on which 360 video data are projected, and the regions may be partitioned depending on a projection scheme. The 2D image may be referred to as a video frame or a frame.

Regarding this, the present invention proposes metadata for the region-wise packing process depending on a projection scheme, and a method for signaling the metadata. The region-wise packing process may be performed more efficiently based on the metadata.

Figure 8:
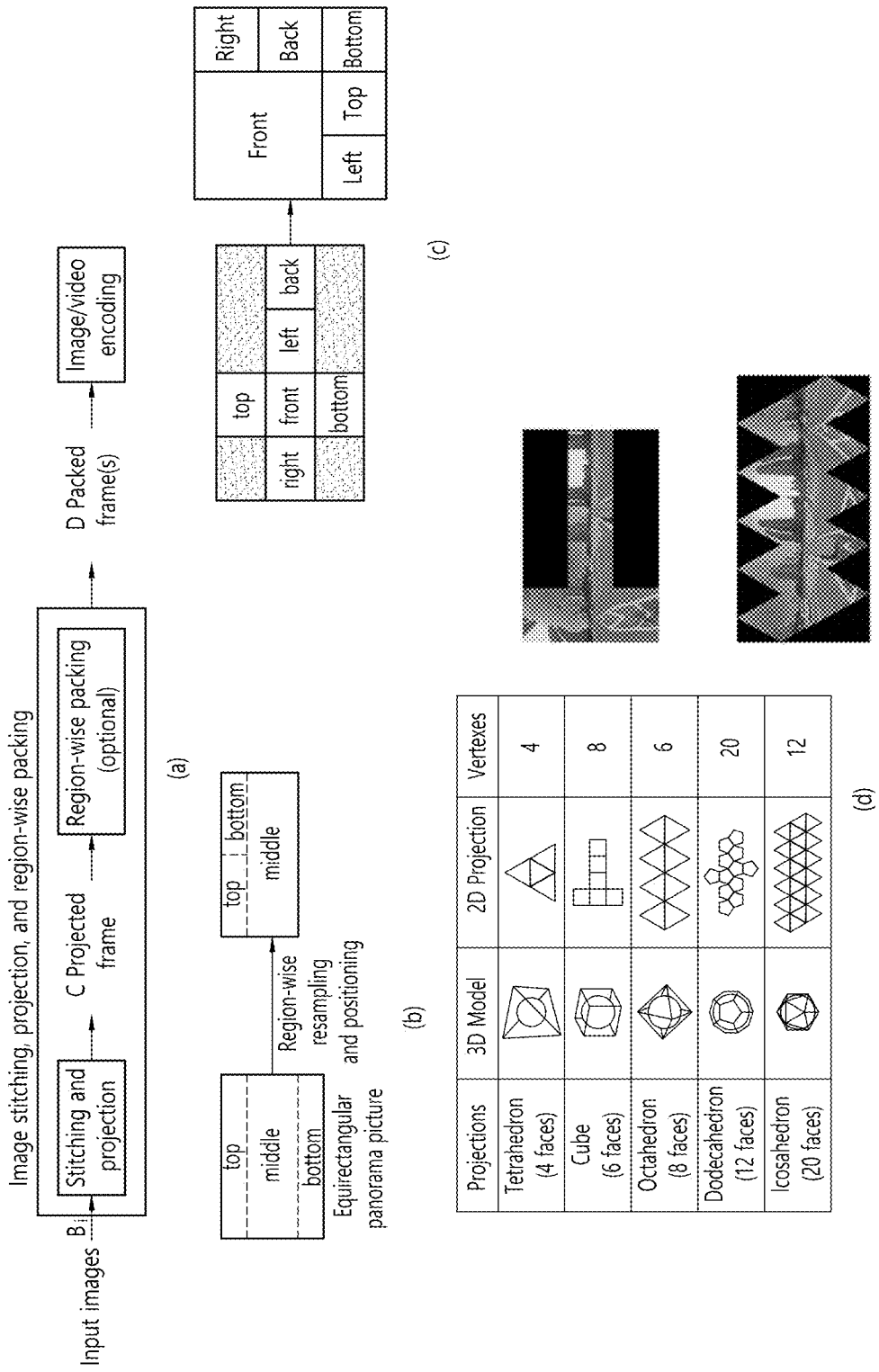
FIG. 8 exemplarily shows a 2D image having underwent 360-degree video processing process and a region-wise packing process according to a projection format.

FIG. 8 exemplarily shows a 2D image having underwent 360 video processing process and a region-wise packing process according to a projection format.

In FIG. 8, (a) may show a process of processing input 360 video. Referring to (a) of FIG. 8, input viewpoint-wise 360 video data may be stitched or projected on a 3D projection structure according to various projection schemes, and the 360e video data projected on the 3D projection structure may be expressed as a 2D image. That is, the 360 video data may be stitched, and may be projected as the 2D image. The 2D image, on which the 360 video is projected, may be expressed as a projected frame. In addition, the projected frame may undergo the aforementioned region-wise packing process. That is, a process of dividing an area including the projected 360 video data on the projected frame into regions, and rotating or rearranging each region or increasing or decreasing resolution of each region may be performed. In other words, the region-wise packing process may indicate a process of mapping the projected frame as one or more packed frames. The region-wise packing process may be optionally performed, and, if the region-wise packing process is not performed, the packed frame and the projected frame may be identical to each other. If the region-wise packing process is performed, each region of the projected frame may be mapped to the region of the packed frame, and it is possible to derive metadata that represents a position, a shape, and a size of a region of the packed frame to which each region of the projected frame is mapped.

In FIG. 8, (b) and (c) may show examples in which each region of the projected frame is mapped to a region of the packed frame. Referring to (b) of FIG. 8, the 360 video data may be projected on a 2D image (or frame) according to a panoramic projection scheme. The top region, the middle region, and the bottom region of the projected frame may undergo the region-wise packing process and hence rearranged as shown in the right drawing. Here, the top region may be a region representing the upper surface of the panorama on the 2D image, the middle region may be a region representing the middle surface of the panorama on the 2D image, and the bottom region may be a region representing the bottom surface of the panorama on the 2D image. In addition, referring to (c) of FIG. 8, the 360 video data may be projected on a 2D image (or frame) according to a cubic projection scheme. The front region, the back region, the top region, the bottom region, the right-side region, and the left-side region of the projected frame may undergo the region-wise packing process and hence rearranged as shown in the right drawing. Here, the front region may be a region representing the front surface of the cube on the 2D image, the back region may be a region representing the back surface of the cube on the 2D image. In addition, the top region may be a region representing an upper surface of the cube on the 2D image, and the bottom region may be a region representing the bottom surface of the cube on the 2D image. In addition, the right-side region may be a region representing the right-side surface of the cube on the 2D image, and the left-side region may be a region representing the left-side surface of the cube on the 2D image.

In FIG. 8, (d) may show various 3D projection formats into which the 360 video data can be projected. Referring to (d) of FIG. 8. The 3D projection formats may include a tetrahedron, a cube, a octahedron, a dodecahedron, and an icosahedron. The 2D projections shown in (d) of FIG. 8, may represent projected frames which represents the 360 video data projected into a 3D projection format on a 2D image.

The projection formats are merely exemplary, and, according to an embodiment, some or all of various projection formats (or projection schemes) may be used. A projection format used for 360 video may be indicated, for example, through a projection format field of metadata.

FIGS. 9A to 9B exemplarily show projection formats according to some embodiments of the present invention.

In FIG. 9A, (a) may show an equirectangular projection format. When the equirectangular projection format is used, a point (r, θ0, 0), that is, a point where θ=θ0 and φ=0, on a spherical surface and a central pixel on a 2D image may be mapped. A principal point of a front camera may be assumed to be a point (r, 0, 0) on the spherical surface. In addition, φ0=0 may be fixed. Therefore, a value (x, y) transformed into XY coordinate system may be transformed into a (X, Y) pixel on the 2D image through the following equation.

$$X = K_x * x + X_O = K_x * (\theta - \theta_0) * r + X_O$$

$$Y = -K_y * y - Y_O \quad \text{[Equation 1]}$$

In addition, if a left top pixel on the 2D image is positioned at (0, 0) in the XY system, an offset value for X axis and an offset value for Y axis may be represented by the following equation.

$$X_O = K_x * \pi * r$$

$$Y_O - K_y * \pi/2 * r \quad \text{[Equation 2]}$$

Using the above, a transformation equation into the XY coordinate system may be as below.

$$X = K_x x + X_O = K_x * (\pi + \theta - \theta_0) * r$$

$$Y = -K_y y - Y_O = K_y * (\pi/2 - \varphi) * r \quad \text{[Equation 3]}$$

For example, if θ0=0, that is, if a central pixel on a 2D image indicates data of θ=0 on a spherical surface, the spherical surface may be mapped to an area of a horizontal length (width)=2Kxπr and a vertical length (height)=Kxπr on the 2D image on the basis of (0,0). Data of φ=π/2 on the spherical surface may be mapped to the whole upper edge on the 2D image. In addition, data of (r, π/2, 0) on the spherical surface may be mapped to a point of (3πKxr/2, πKx r/2) on the 2D image.

At the reception side, 360 video data on the 2D image may be re-projected to the spherical surface. This may be represented by a transformation equation as below.

$$\theta = \theta_0 + X/K_x * r - \pi$$

$$\varphi = \pi/2 - Y/K_y * r \quad \text{[Equation 4]}$$

For example, a pixel at XY coordinates of (Kxπr, 0) on a 2D image may be re-projected to a point where θ=θ0 and φ=π/2 on a spherical surface.

In FIG. 9A, (b) may show a cubic projection format. For example, stitched 360 video data may appear on a spherical surface. The projection processor may project the 360 video data on a 2D image in the form of a cube. The 360 video data on the spherical surface may correspond to respective surfaces of the cube. As a result, the 360 video data may be projected on the 2D image, as shown in at the left side or the right side of (b) in FIG. 9A.

In FIG. 9A, (c) may show a cylindrical projection format. On the assumption that stitched 360 video data appear on a spherical surface, the projection processor may project the 360 video data on a 2D image in the form of a cylinder. The 360-degree video data on the spherical surface may correspond to the side, the top, and the bottom of the cylinder. As a result, the 360 video data may be projected on the 2D image, as shown in the left side or the right side of (c) in FIG. 9A.

In FIG. 9A, (d) may show a tile-based projection format. If the tile-based projection scheme is used, the aforementioned projection processor may divide 360 video data on a spherical surface into one or more sub-areas, as shown in (d) of FIG. 9A, and project on a 2D image. The sub-areas may be called tiles.

In FIG. 9B, (e) may show a pyramid projection format. On the assumption that stitched 360 video data appear on a spherical surface, the projection processor may regard the 360 video data as a pyramid and project the 360 video data on a 2D image in the form of a pyramid. The 360 video data on the spherical surface may correspond to four surfaces (the front, the left top, the left bottom, the right top, and the right bottom) of the pyramid. As a result, the 360-degree video data may be projected on the 2D image, as shown at the left side or the right side of (e) of FIG. 9B. In this case, the bottom surface may be a region including data acquired by a camera that faces forward.

In FIG. 9B, (f) may show a panoramic projection format, If the panoramic projection format is used, the aforementioned projection processor may project only a side surface of 360 video data on a spherical surface on a 2D image, as shown in (f) of FIG. 9B. This may be the same as the case where the top and bottom surfaces do not exist in the cylindrical projection scheme.

Meanwhile, according to one embodiment, projection may be performed without a stitching process. In FIG. 9B, (g) may show the case where projection is performed without the stitching process. If projection is performed without the stitching process, the aforementioned projection processor may project 360 video data intact on a 2D image, as shown in (g) of FIG. 9B. In this case, a stitching process may be not performed, and intact images acquired by a camera may be projected on the 2D image.

Referring to (g) of FIG. 9B, two images may be projected on a 2D image without a stitching process. Each of the images may be a fish-eye image acquired by a spherical camera (or a fish-eye camera) through each sensor. As described above, at the reception side, image data acquired from camera sensors may be stitched, and the stitched image data may be mapped to a spherical surface to render spherical video, that is, 360 video.

Figure 10A:
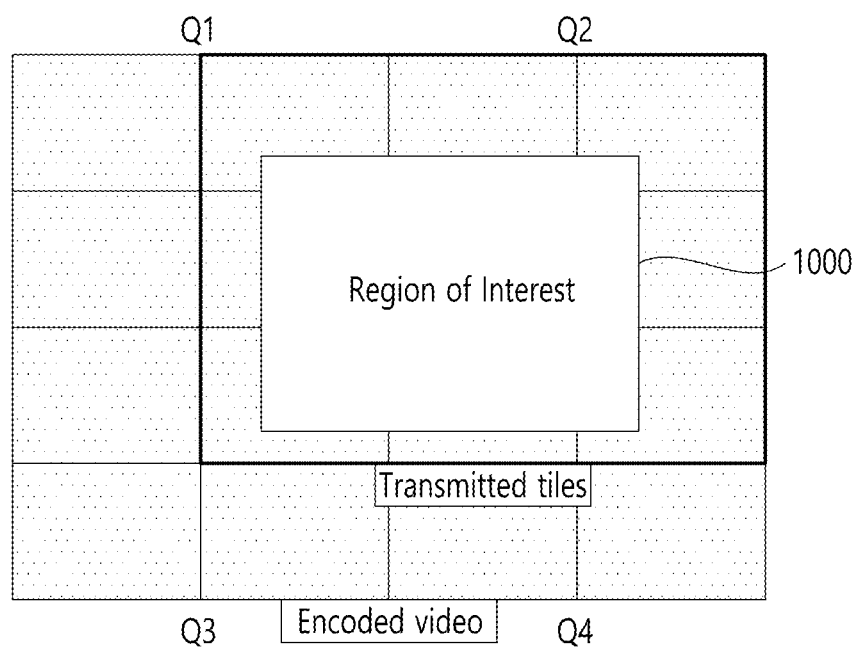
FIGS. 10A and 10B are diagrams showing tiles according to some embodiments of the present invention.
Figure 10B:
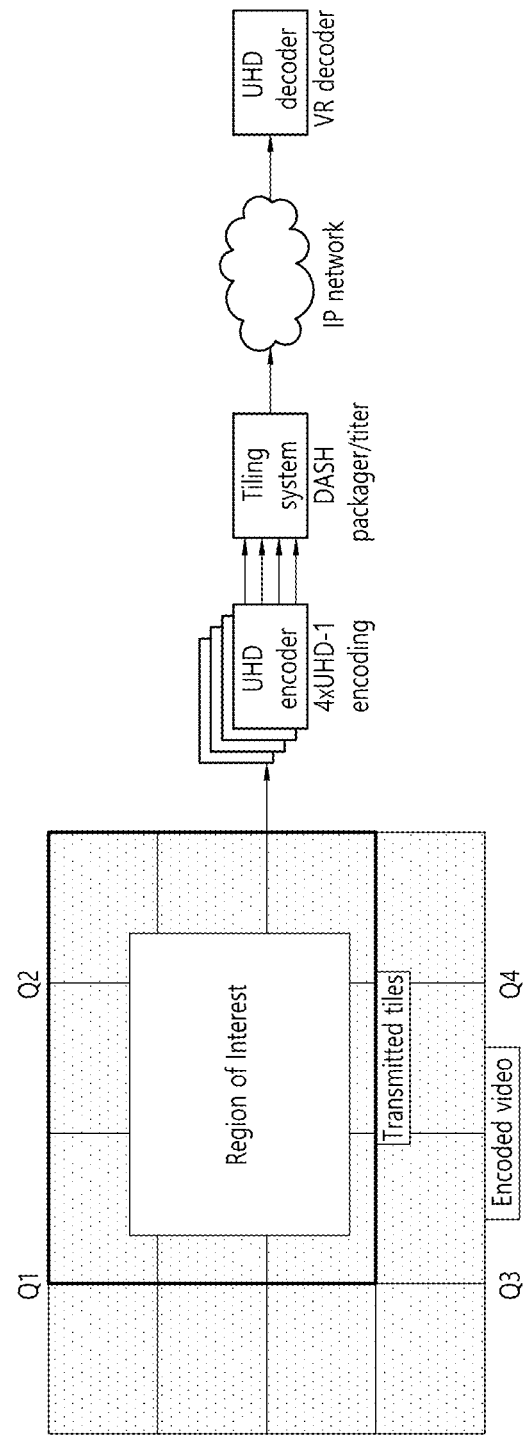

FIGS. 10A and 10B are diagrams showing tiles according to some embodiments of the present invention.

360 video data projected on a 2D image or 360 video data having undergone a region-wise packing process may be partitioned into one or more tiles. FIG. 10A shows the case where one 2D image is partitioned into 16 tiles. Here, a 2D image may be the aforementioned projected frame or packed frame. According to another embodiment of a 360 video transmission apparatus of the present invention, the data encoder is able to encode the respective tiles independently.

Region-wise packing and tiling may be different from each other. Region-wise packing may be processing each region of the 360 video data projected on the 2D image in order to improve coding efficiency or to adjust resolution. Tiling may be dividing, the data encoder, the projected frame or the packed frame into tiles and independently encoding the tiles. When the 360 video data are provided, the user does not simultaneously enjoy all parts of the 360 video data. Tiling may enable the reception side to enjoy or receive only tiles corresponding to an important part or a predetermined part, such as the viewport that is being viewed by the user, to the reception side within a limited bandwidth. The limited bandwidth may be more efficiently utilized through tiling, and calculation load for the reception side may be reduced compared to the case of processing the entire 360 video data all at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case where the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360 content provider. The 360 content provider may produce a 360 video in consideration of the area of the 360 video in which users are expected to be interested. In some embodiments, the ROI may correspond to an area of the 360 video in which an important portion of the 360-degree video is shown.

In another embodiment of the 360 video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 10A shows a viewport t6010 displayed on the 2D image. Here, the viewport may be located over 9 tiles on the 2D image.

In this case, the 360 video transmission apparatus may further include a tiling system. In some embodiments, the tiling system may be disposed after the data encoder (see FIG. 10B), may be included in the data encoder or the transmission-processing unit, or may be included in the 360 video transmission apparatus as a separate internal/external element.

The tiling system may receive the viewport information from the transmission-side feedback-processing unit. The tiling system may select and transmit only tiles including the viewport area. In the FIG. 10A, 9 tiles including the viewport area 1000, among a total of 16 tiles of the 2D image, may be transmitted. Here, the tiling system may transmit the tiles in a unicast manner over a broadband connection. It is because the viewport area varies depending on a user.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata for the viewport area to the internal elements of the 360 video transmission apparatus, or may include the same in the 360-video related metadata.

By using this tiling method, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360 video through the VR display (initial viewport).

According to another embodiment of the 360 video transmission apparatus, the transmission-processing unit may perform transmission processing differently for respective tiles. The transmission-processing unit may apply different transport parameters (modulation order, code rate, etc.) to the tiles such that robustness of data delivered for each region is changed.

At this point, the transmission-side feedback-processing unit may deliver the feedback information, received from the 360 video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 11 is a view showing 360-degree-video related metadata according to an embodiment of the present invention.

The 360-degree-video related metadata may include various metadata for the 360-degree video. Depending on the context, the 360-degree-video related metadata may be called 360-degree-video related signaling information. The 360-degree-video related metadata may be transmitted while being included in a separate signaling table, or may be transmitted while being included in DASH MPD, or may be transmitted while being included in the form of a box in a file format of ISOBMFF. In the case where the 360-degree-video related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

According to an embodiment of the 360-degree-video related metadata, the 360-degree-video related metadata may include basic metadata about projection schemes, stereoscopy related metadata, initial-view/initial-viewport related metadata, ROI related metadata, field-of-view (FOV) related metadata, and/or cropped-region related metadata. In some embodiments, the 360-degree-video related metadata may further include metadata other than the above metadata.

Embodiments of the 360-degree-video related metadata according to the present invention may include at least one of the basic metadata, the stereoscopy related metadata, the initial-view related metadata, the ROI related metadata, the FOV related metadata, the cropped-region related metadata, and/or additional possible metadata. Embodiments of the 360-degree-video related metadata according to the present invention may be variously configured depending on possible number of metadata included therein. In some embodiments, the 360-degree-video related metadata may further include additional information.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively.

In the left-right layout, 2D images on which a left image/a right image are projected may be located at the left/right side on an image frame. In the top-bottom layout, 2D images on which a left image/a right image are projected may be located at the top/bottom side on the image frame. In the case where the field has additional values, the values may be reserved for future use.

The initial-view related metadata may include information about the time at which a user views the 360-degree video when the 360-degree video is reproduced first (an initial viewport). The initial-view related metadata may include an initial_view_yaw_degree field, an initial_view_pitch_degree field, and/or an initial_view_roll_degree field. In some embodiments, the initial-view related metadata may further include additional information.

The initial_view_yaw_degree field, the initial_view_pitch_degree field, and the initial_view_roll_degree field may indicate an initial viewport when the 360-degree video is reproduced. That is, the very center point of the viewport that is viewed first at the time of reproduction may be indicated by these three fields. Specifically, the initial_view_yaw_degree field may indicate a yaw value at the initial viewpoint. That is, the initial_view_yaw_degree field may indicate the rotational direction (symbol) and the extent of rotation direction (angle) in which the position of the very center point is rotated about the yaw axis. In addition, the initial_view_pitch_degree field may indicate a pitch value at the initial viewpoint. That is, the initial_view_pitch_degree field may indicate the rotational direction (symbol) and the extent of rotation (angle) in which the position of the very center point is rotated about the pitch axis. In addition, the initial_view_roll_degree field may indicate a roll value at the initial viewpoint. That is, the initial_view_roll_degree field may indicate the rotational direction (symbol) and the extent of rotation (angle) in which the position of the very center point is rotated about the roll axis. The initial viewpoint at the time of reproduction of the corresponding 360-degree video, that is, the very center point of the view point that is viewed first at the time of reproduction may be indicated based on the initial_view_yaw_degree field, the initial view_pitch_degree field, and the initial_view_roll_degree field. In doing so, a specific area of the 360-degree video may be displayed at the initial viewpoint for a user. In addition, the horizontal length and the vertical length (width and height) of an initial viewport based on the indicated initial viewport through the FOV may be determined. That is, the 360-degree video reception apparatus may provide a user with a predetermined area of the 360-degree video as an initial viewport using these three fields and the FOV information.

In some embodiments, the initial viewport indicated by the initial-view related metadata may be changed for each scene. That is, the scenes of the 360-degree video may be changed over time of 360 content. An initial viewport or an initial viewport at which the user views the video first may be changed for every scene of the 360-degree video. In this case, the initial-view related metadata may indicate the initial viewport for each scene. To this end, the initial-view related metadata may further include a scene identifier identifying the scene to which the initial viewport is applied. In addition, the FOV may be changed for each scene. The initial-view related metadata may further include scene-wise FOV information indicating the FOV corresponding to the scene.

The ROI related metadata may include information related to the ROI. The ROI related metadata may a 2d_roi_range_flag field and/or a 3d_roi_range_flag field. Each of the two fields may indicate whether the ROI related metadata includes fields expressing the ROI based on the 2D image or whether the ROI related metadata includes fields expressing the ROI based on the 3D space. In some embodiments, the ROI related metadata may further include additional information, such as differential encoding information based on the ROI and differential transmission processing information based on the ROI.

In the case where the ROI related metadata includes fields expressing the ROI based on the 2D image, the ROI related metadata may include a min_top_left_x field, a max_top_left_x field, a min_top_left_y field, a max_top_left_y field, a min width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. That is, these fields may indicate the minimum x coordinate, the maximum x coordinate, the minimum y coordinate, and the maximum y coordinate of the left top end, respectively.

The min width field, the max_width field, the min_height field, and the max_height field may indicate the minimum/maximum values of the horizontal size (width) and the vertical size (height) of the ROI. That is, these fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. That is, these fields may indicate the minimum x coordinate, the maximum x coordinate, the minimum y coordinate, and the maximum y coordinate of the coordinates in the ROI, respectively. These fields may be omitted.

In the case where the ROI related metadata includes fields expressing the ROI based on the coordinates in the 3D rendering space, the ROI related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV related metadata, a description of which will follow.

The FOV related metadata may include the above information related to the FOV. The FOV related metadata may include a content_fov_flag field and/or a content_fov field. In some embodiments, the FOV related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360 video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case where the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region related metadata may include an is_cropped_region field, a cr_region_left_top_x field, a cr_region_left_top_y field, a cr_region_width field, and/or a cr_region_height field. In some embodiments, the cropped-region related metadata may further include additional information.

The is_cropped_region field may be a flag indicating whether the entire area of the image frame is used by the 360-degree video reception apparatus or the VR display. Here, an area to which 360-video data is mapped or an area seen on the VR display may be called an active video area. This field may indicate whether the entire image frame is the active video area. In the case where only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

The 360-video-based VR system may provide a user with visual/audible experience in a different viewing orientation from a position of the user with respect to 360 video based on the above-described 360 video processing. The VR system, which provides a user with visual/audible experience in different viewing orientation from a fixed position of the user with respect to 360 video, may be called a three degree of freedom (3DoF)-based VR system. Meanwhile, the VR system capable of providing visual/audible experience in different viewing orientations from different viewing positions at different viewpoints may be called a 3DoF+ or 3DoF plus-based VR system.

Figure 12:
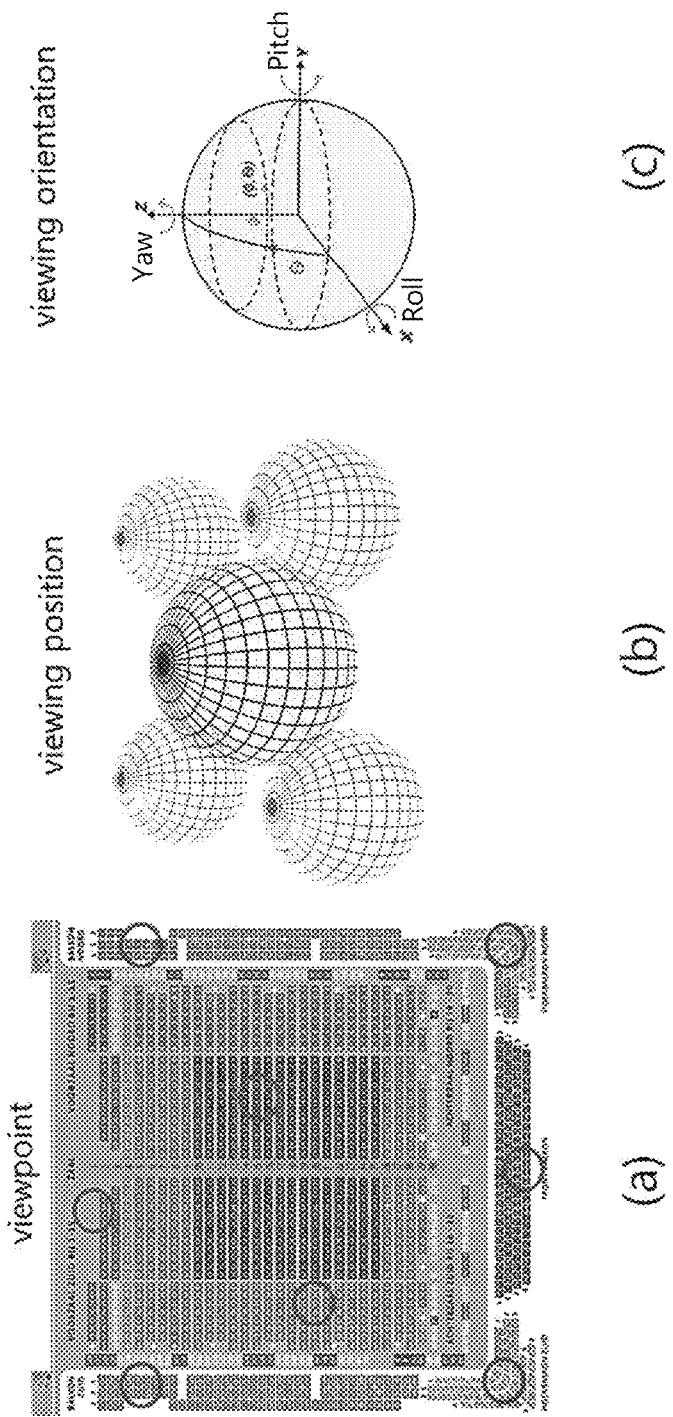
FIG. 12 schematically shows concepts of a view point, a viewing position, and a viewing orientation.

FIG. 12 schematically shows concepts of a view point, a viewing position, and a viewing orientation.

Referring to FIG. 12, on the assumption of a space (e.g., a theater) as in (a), each marked circle may indicate a different view point. An image/voice provided at each view point in the same space may be associated with each other in the same time zone. In this case, different visual/audible experience may be provided to a user depending on a change in a gaze direction or head movement (e.g., head motion) of the user at a specific viewpoint. That is, a sphere of various viewing positions at a specific viewpoint may be assumed, as shown in (b), and image/voice/text information which has taken into consideration of a relative location of each viewing position may be provided.

Meanwhile, as shown in (c), visual/audible information from various directions as in legacy 3DoF may be delivered from a specific viewing position at a specific viewpoint. At this point, not just a main source (e.g., an image/voice/text) but also other various sources combined with the main source may be provided, and, in this case, information associated with or independent of a user's viewing orientation may be delivered.

Figure 13:
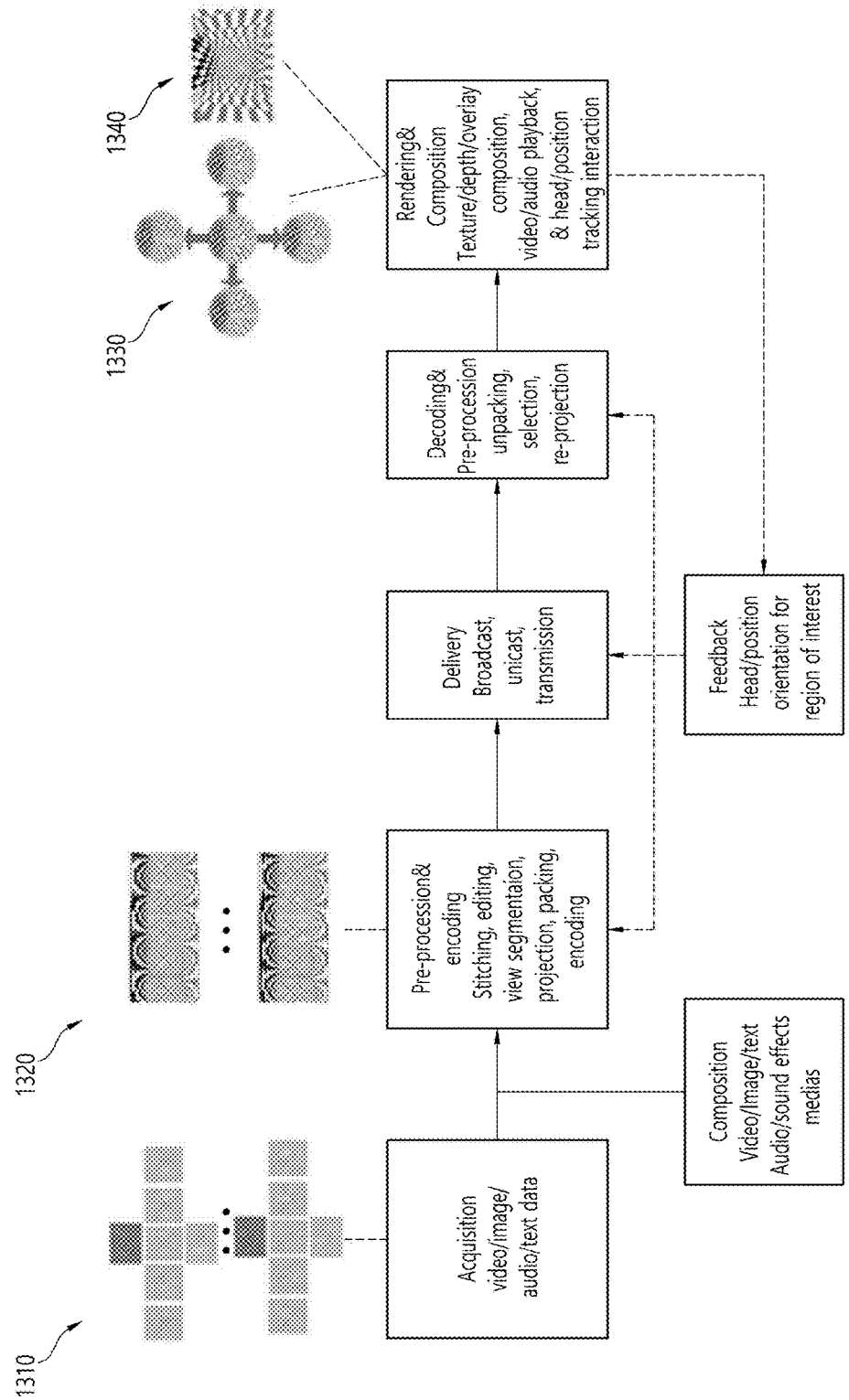
FIG. 13 is a diagram schematically showing an example of architecture for providing 3DoF+video according to an embodiment of the present invention.

FIG. 13 is a diagram schematically showing an example of architecture for providing 3DoF+video according to an embodiment of the present invention.

FIG. 13 may show a flowchart of a 3DoF+end-to-end system including an acquisition process, a pre-processing process, a transmission process, a (post-)processing process, a rendering process, and a feedback process of 3DoF+.

Referring to FIG. 13, the acquisition process may refer to a process of acquiring 360 video through capturing, composition, or generating the 360 video. Through the acquisition process, a plurality of image/voice information items may be acquired according to change of a viewing direction (e.g., a head motion) for a plurality of positions. In this case, the image may include not just visual information (e.g., texture) but also depth information. In this case, as shown in an example of image information indicated by reference numeral 1310, a plurality of information items for different viewing positions with different viewpoints may be acquired.

The composition process may a procedure and a method for performing composition in order to include, user experience, not just information acquired by an image/voice input device, but also an image (video/image, etc.), a voice (audio/sound effect, etc.), a text (subtitle, etc.) from an external media.

The pre-processing process is a process of preparing (pre-processing) transmission/delivery of acquired 360 video, and may include the above-described stitching, projection, region-wise packing, and/or encoding processes. That is, the pre-processing process may include a pre-processing process and an encoding process to change/make up for data of image/voice/text information according to intention of a person who made the information. For example, the process of pre-processing an image may include: a step of mapping (stitching) acquired visual information on a 360 sphere; a step of performing calibration (editing) to remove a region boundary, reduce difference in color/brightness, or apply visual effects to an image; a (view segmentation) step of segmenting an image by viewpoints; a (projection) step of mapping an image on a 360 sphere into a 2D image; a (region-wise packing) step of performing region-wise packing of an image; and a step of encoding image information. As shown in an example of a video side indicated by reference numeral 1320, a plurality of projection images from different viewing positions according to different viewpoints may be generated.

The transmission process may refer to a process of processing and transmitting image/voice data and metadata having undergone a preparation process (a pre-processing process). In order to deliver a plurality of items of image/voice data from different viewing positions according to different viewpoints and metadata related thereto, a communication network may be used or a unidirectional transmission may be utilized, as described above.

The post-processing and composition processes may refer to a post-processing process for decoding received/stored video/audio/text data and reproduce the same. For example, the post-processing process may include an unpacking process of unpacking packed images, and a re-projection process of restoring a 2D projected image into a 3D spherical image.

The rendering process may refer to a process of rendering image/video data re-projected in a 3D space and display the rendered data. In this course, an image/voice signal may be reconfigured into a form suitable to be output. It is possible to track a viewing orientation in which a region of interest for a user is present, a viewing position/head position of the ROI, and a view point of the ROI, and necessary image/voice/text information only may be selectively used based on the information. In this case, an image signal may be selected with a different viewing position according to a user's ROI, and, as a result, an image of a specific direction from a specific viewing position at a specific viewpoint may be output.

Figure 14A:
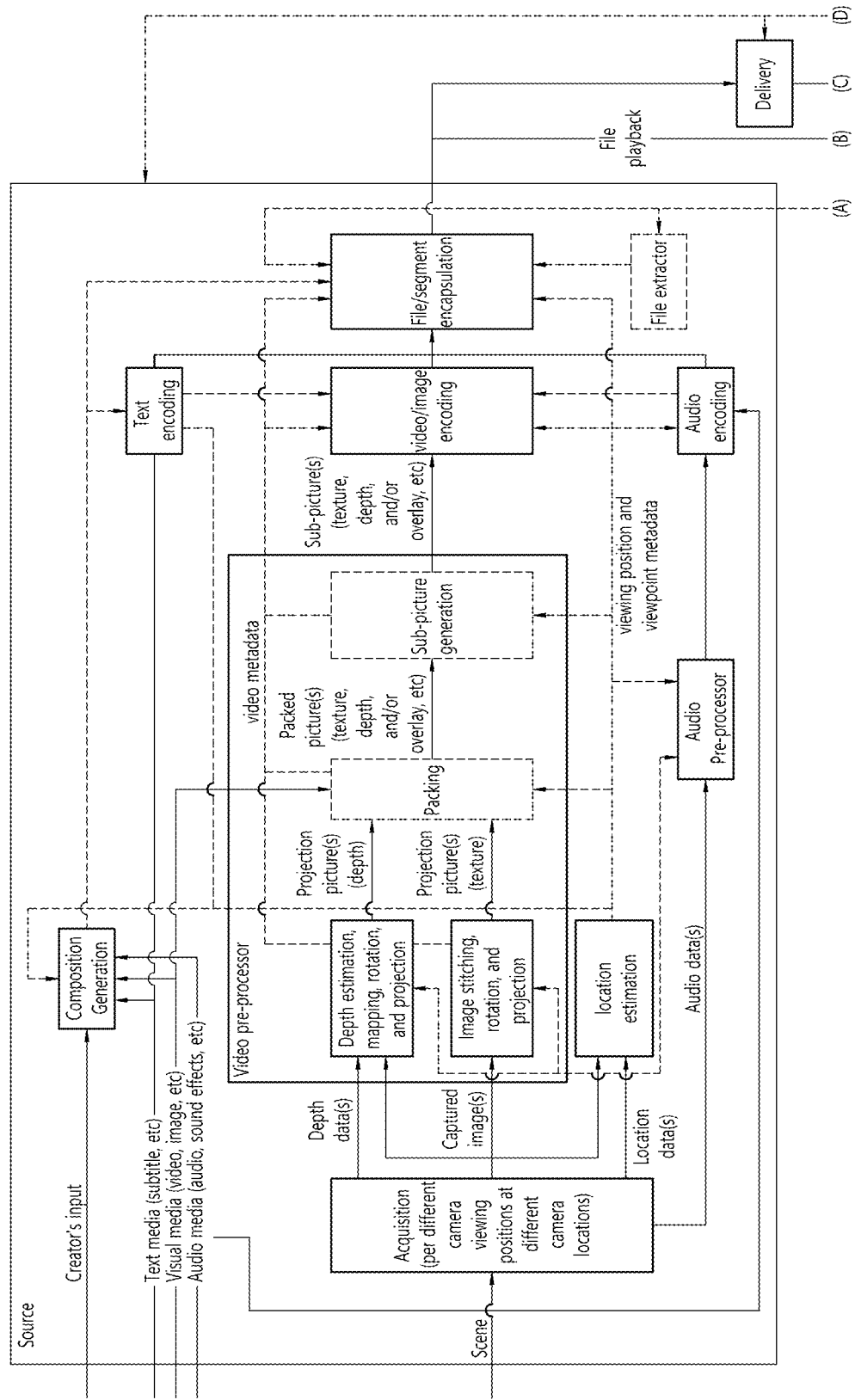
FIGS. 14A and 14B are diagrams showing an example of architecture of a three Degrees of Freedom Plus (3DoF+) end-to-end system.
Figure 14B:
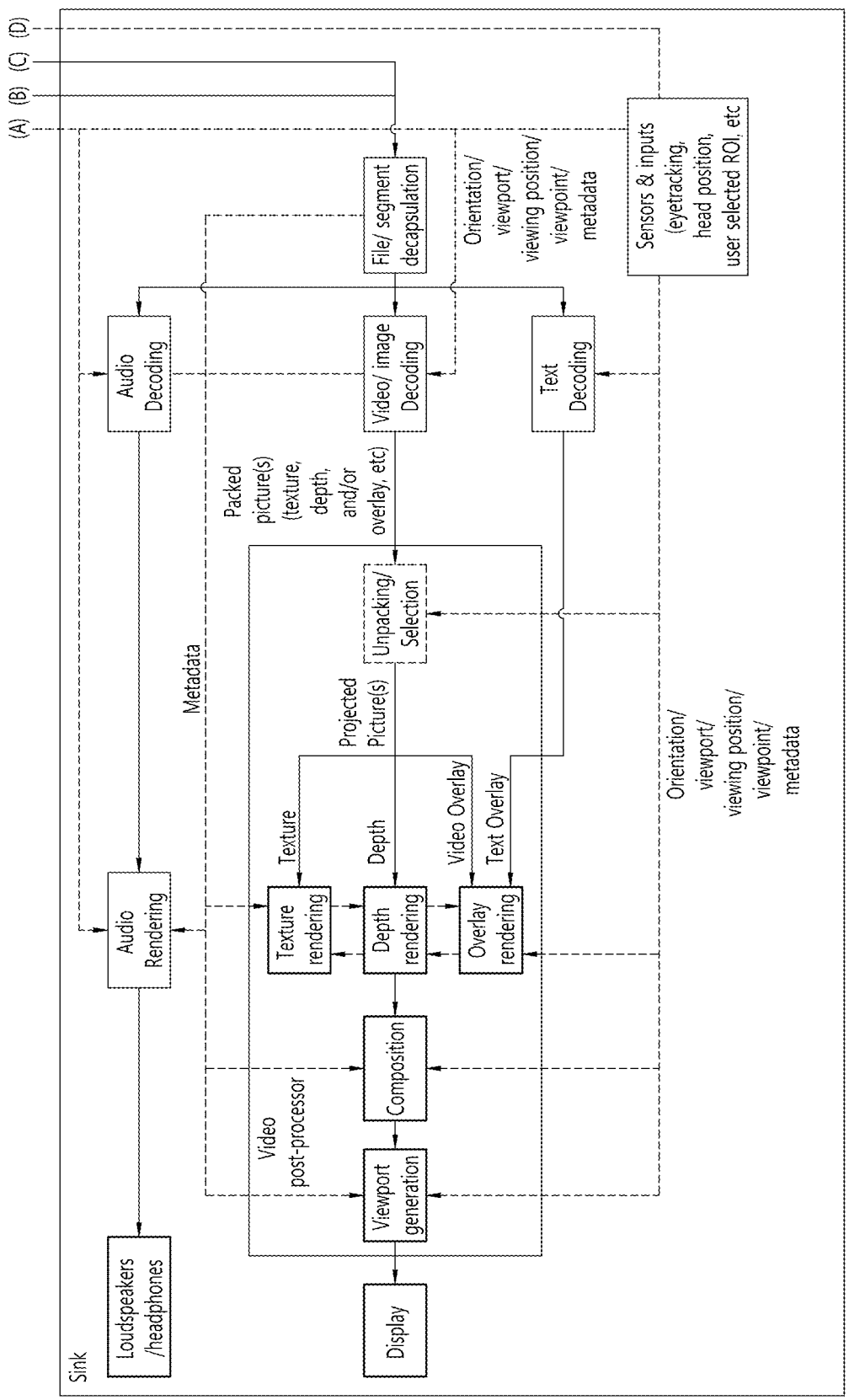

FIGS. 14A and 14B are an example of architecture of a 3DoF+end-to-end system.

According to the architecture shown in FIGS. 14A and 14B, the above-described 3DoF+360 content may be provided.

Referring to FIG. 14A, a 360 video transmission apparatus (transmission point) may be composed largely of: a part (an acquisition unit) for acquiring 360 video (image)/audio data; a part (a video/audio pre-processor) for processing the acquired data; a part (a composition generation unit) for compositing additional information; a part (an encoding unit) for encoding text, audio, and projected 360 video; and a part (an encapsulation unit) for encapsulating the encoded data. As described above, the encoded data may be output in a bitstream form, and the encoded data may be encapsulated into a file format such as ISOBMFF and CFF or may be processed into the form of other DASH segment or the like. The encoded data may be delivered to a 360 video reception apparatus through a digital storage medium, or, although explicitly illustrated, the encoded data may undergo a process necessary for transmission by a transmission processor, as described above, and then transmitted through a broadcast network or a broadband.

In the data acquisition part, different information items may be acquired simultaneously or continuously according to a sensor orientation (a viewing orientation in an image), a sensor position (or a viewing position in an image), and a location at which a sensor acquires information (or a viewpoint in an image), and, in this case, video, image, audio, viewpoint information, etc. may be acquired.

In the case of image data, texture information and depth information may be acquired, and different video pre-processing may be performed according to characteristics of each component. For example, in the case of texture information, a 360 omnidirectional image may be constructed using images of different viewing orientations from the same viewing position at the same viewpoint based on image sensor viewpoint information, and, to this end, a stitching process may be performed. In addition, projection and/or region-wise packing may be performed to change an image to a format to be encoded. For example, a depth image may be acquired usually by a depth camera, and, in this case, the depth image may be made in the form of texture. Alternatively, depth data may be generated based on additionally measured data. After each component image is generated, additional conversion (packing) is performed on a corresponding component into a video format for efficient compression or sub-picture generation is performed to reconfigure a corresponding component into actually necessary portions by partitioning the same. Information on image configuration used in a video pre-processing step is delivered through video metadata.

In the case where image/voice/text information given in addition to acquired data (or data to be primarily serviced) is provided, it is necessary to provide information to composite the information and the data at a final reproduction time. The composition generation unit generates information, which is used to composite externally generated media data (video/image for an image, audio/effect sound for a voice, subtitle for a text, etc.) at a final reproduction step, according to intention of a producer, and the generated information is delivered through composition metadata.

Image/voice/text information having underwent respective corresponding processes is compressed using corresponding respective encoders, and encapsulated by an application on the basis of a file/or segment unit. In this case, according to a file or segment configuration method, it is possible to extract only necessary information (by a file extractor).

In addition, information necessary to reconfigure each data in a receiver is delivered on a codec level or a file format/system level, and, in this case, the data includes video/audio metadata for reconfiguring video/audio, composition metadata for overlay, viewing position and viewpoint metadata on video/audio reproduction-allowed viewpoints and a viewing position dependent on each viewpoint, etc. Such information may be processed by an additional metadata processor.

Referring to FIG. 14B, a 360 video reception apparatus (a reception point) may be composed largely of: a part (a file/segment decapsulation unit) for decapsulating a received file or segment; a part (a decoding unit) for generating image/voice/text information based on a bit stream; a part (a post-processor) for reconfiguring image/voice text; a part (a tracking unit) for tracking a user's ROI; and a display which is a display device.

Bit streams generated through decapsulation may be partitioned into image/voice/text according to a type of data and then individually decoded into a reproducible format.

In the tracking part, information on a viewpoint of a user's ROI, a viewing position at the corresponding viewpoint, and a viewing orientation from the corresponding viewing position may be generated based on information of a sensor and information of a user input, and the generated information may be used to select or extract the ROI in each module of the 360 video reception apparatus or to perform post-processing to highlight the ROI. In addition, if the generated information is delivered to a 360 video transmission apparatus, the generated information may be used in various image reconfiguration methods (viewport/viewing position/viewpoint dependent processing) for efficient bandwidth use.

A method for processing a decoded image signal may vary according to any of various processing methods depending on an image configuration method. When image packing is performed in the 360 video transmission apparatus, a process of reconfiguring an image based on information delivered through metadata is necessary. In this case, video metadata generated by the 360 video transmission apparatus may be used. In addition, in the case where the decoded image includes images of multiple-viewpoints, multiple viewing positions, or multiple viewing orientations, information matching with a viewpoint, a viewing position, or viewing orientation of a user's ROI generated through tracking may be selected and processed. In this case, viewing position and viewpoint related metadata generated by the transmission point may be used. In addition, in the case where multiple components are delivered with respect to a specific viewpoint, viewing position, or viewing orientation or video information for overlay is delivered additionally, a rendering process for respective corresponding information may be included. Video data (texture, depth, overlay) having gone through the additional rendering process goes through a composition process, and, in this case, composition metadata generated by the transmission point may be used. As a result, information necessary to reproduce a viewport according to the user's ROI may be generated.

A decoded voice signal is used to generate a voice signal through an audio renderer and/or post-processing. In this case, information matching with the user's demand may be generated based on information on a user's ROI and metadata delivered to the 360 video reception apparatus.

A decoded text signal may be delivered to an overlay renderer to be processed into text-based overlay information such as subtitle. If necessary, an additional text post-processing process may be included.

Figure 15:
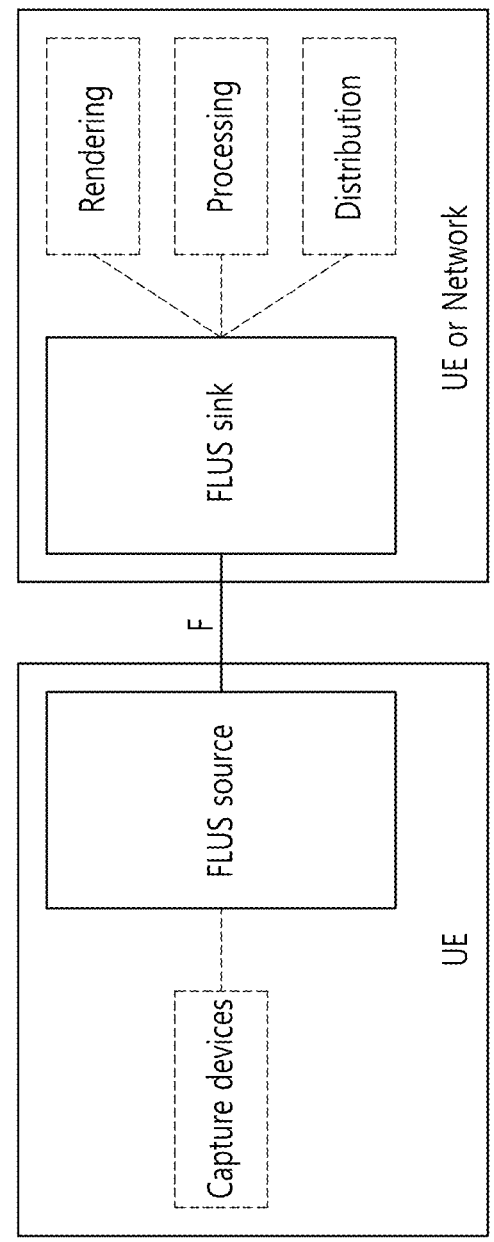
FIG. 15 is a diagram schematically showing an example of Framework for Live Uplink Streaming (FLUS) architecture.

FIG. 15 is a diagram schematically showing examples of FLUS architecture.

FIG. 15 shows an example in which a User Equipment (UE) or another UE or a network perform communication a wireless communication system based on Framework for Live Uplink Streaming (FLUS). An FLUS source and an FLUS sink may transmit and receive data to and from each other using an F reference point.

In the present specification, an "FLUS source" may indicate an apparatus that transmits data to a FLUS sink through the F reference point based on FLUS. However, the FLUS source does not always transmit data to a FLUS sink, and, in some cases, the FLUS source may receive data from the FLUS sink through the F reference point. The FLUS source may be construed to be identical/similar to an image transmission apparatus or 360 video transmission apparatus disclosed throughout the present specification, to include the image transmission apparatus or 360 video transmission apparatus, or to be included in the image transmission apparatus or 360 video transmission apparatus. The FLUS source may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sources. Examples of the FLUS source are not limited thereto.

In the present specification, an "FLUS sink" may indicate an apparatus that receives data from an FLUS sink through a F reference point based on FLUS. However, the FLUS source does not always receive data from the FLUS sink, and, in some cases, the FLUS sink may transmit data to the FLUS sink through the F reference point. The FLUS sink may be construed to be identical/similar to an image reception apparatus or 360 video reception apparatus disclosed throughout the present specification, to include the image reception apparatus or 360 video reception apparatus, or to be included in the image reception apparatus or 360 video reception apparatus. The FLUS sink may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sinks. Examples of the FLUS sink are not limited thereto.

Referring to FIG. 15, it is illustrated that an FLUS source and capture devices compose one UE, but exemplary embodiments of the present invention are not limited thereto. The FLUS source may include capture devices, and the FLUS source itself including the capture devices may be a UE. Alternatively, the capture devices may be not included in the UE and may transmit media information to a UE. The number of capture devices may be one or more.

Referring to FIG. 15, it is illustrated that an FLUS sink, a rendering module (or unit), a processing module (or unit), and a distribution module (or unit) compose one UE or network, but exemplary embodiments of the present invention are not limited thereto. The FLUS sink may include at least one of the rendering module, the processing module, or the distribution module, and the FLUS sink itself including the rendering module, the processing module, and the distribution module may be a UE or network. Alternatively, at least one of the rendering module, the processing module, or the distribution module may be not included in a UE or network, and the FLUS sink may transmit media information to at least one of the rendering module, the processing module, or the distribution module. The number of rendering modules, the number of processing modules, and the number of distribution modules may be at least one, and, in some cases, some of them may not exist.

In one example, the FLUS sink may operate as a Media Gateway Function (MGW) and/or an Application Function (AF).

In FIG. 15, the F reference point connecting the FLUS source and the FLUS sink may allow the FLUS source to establish and control a single FLUS session. In addition, the F reference point may enable the FLUS sink to authenticate and authorize the FLUS source.

In addition, the F reference point may support a function of protecting security of the FLUS control plane (F-C) and the FLUS user plane (F-U).

In one embodiment, each of the FLUS source and the FLUS sink may include an FLUS ctrl module, and the respective FLUS ctrl modules of the FLUS source and the FLUs sink may be connected through the F-C. The FLUS ctrl module and the F-C may provide a function of performing downstream distribution on a media in which the FLUs sink is uploaded, provide media instantiation selection, and support configuration of static metadata for a session. In one example, when the FLUS sink is only capable of rendering, the F-C may not exist.

In one embodiment, the F-C may be used to establish and control an FLUS session. The F-C may be used to allow the FLUS source to select a FLUS media instantiation such as MTSI, provide static metadata associated with a media session, and select and configure the processing and distribution functions.

The FLUS media instance may be defined as part of the FLUS session. The F-U may, in some cases, contain media stream establishment procedures, and a plurality of media streams may be generated for one FLUS session.

A media stream may include media components of a single content type such as audio, video, and text, and may include media components of different content types such as audio and video. The FLUS session may be composed of a plurality of identical content types. For example, the FLUS session may be composed of a plurality of media streams for video.

In addition, in one embodiment, each of the FLUS source and the FLUS sink may include an FLUS media module, and the respective FLUS media modules of the FLUS source and the FLUs sink may be connected through the F-U. The FLUS media module and the F-U may provide a function of generating one or more media sessions and a function of transmitting media data through a media stream. In some cases, a media session establishment protocol (e.g., IMS session set-up for MTSI-based FLUS).

Figure 16:
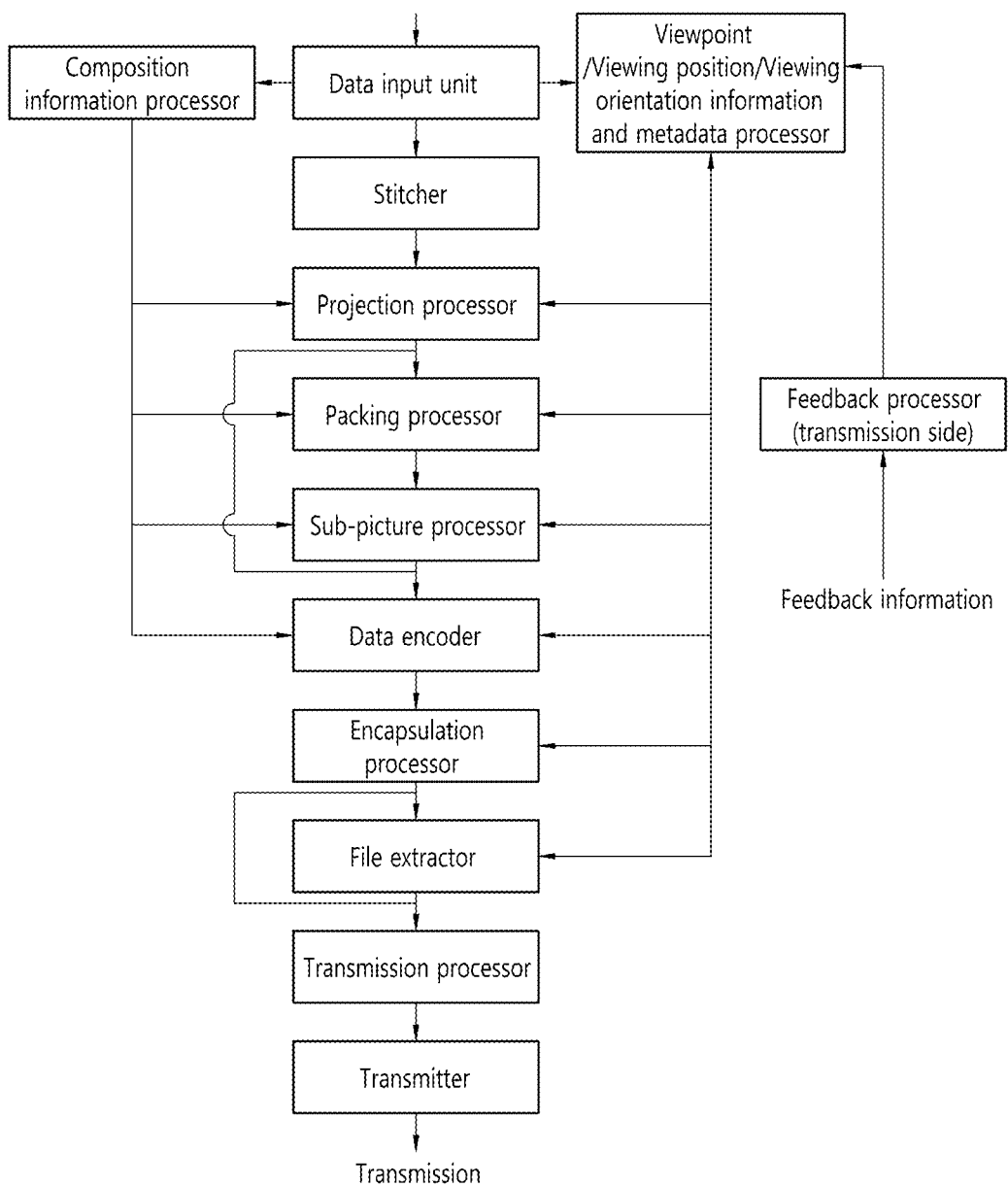
FIG. 16 is a diagram schematically showing an example of configuration of a 3DoF+transmission point.

FIG. 16 is a diagram schematically showing an example of configuration of a 3DoF+transmission point.

Referring to FIG. 16, if input data is an image output from a camera, a transmission point (a 360 video transmission apparatus) may perform a stitching process for each viewpoint/viewing position/component to reconfigure a sphere image. When a sphere image for each viewpoint/viewing position/component is configured, the image may be projected into a 2D image for coding. According to an application, a packing process may be performed to pack multiple images into an integrated image or an image may be partitioned into sub-pictures of detailed regions. As described above, region-wise packing may be an optional process and thus may not be performed, and, in this case, a packing processor may be omitted. If the input data is image/voice/text additional information, a method for adding the information to a central image to be displayed may be informed, and additional data may be transmitted together. An encoding process of generating a compressed image and added data into a bit stream, and an encapsulation process of transforming the bit stream into a file format for transmission or storage may be performed. In this case, depending on a demand from an application or system, a process of extracting a file necessary for a receiver may be performed. The generated bit stream may be transformed into a transmission format by a transmission processor and then transmitted. In this case, a transmission-side feedback processor may process viewpoint/viewing position/viewing orientation information and necessary metadata based on information received from the reception point so that the transmitter can process the information and the metadata.

Figure 17:
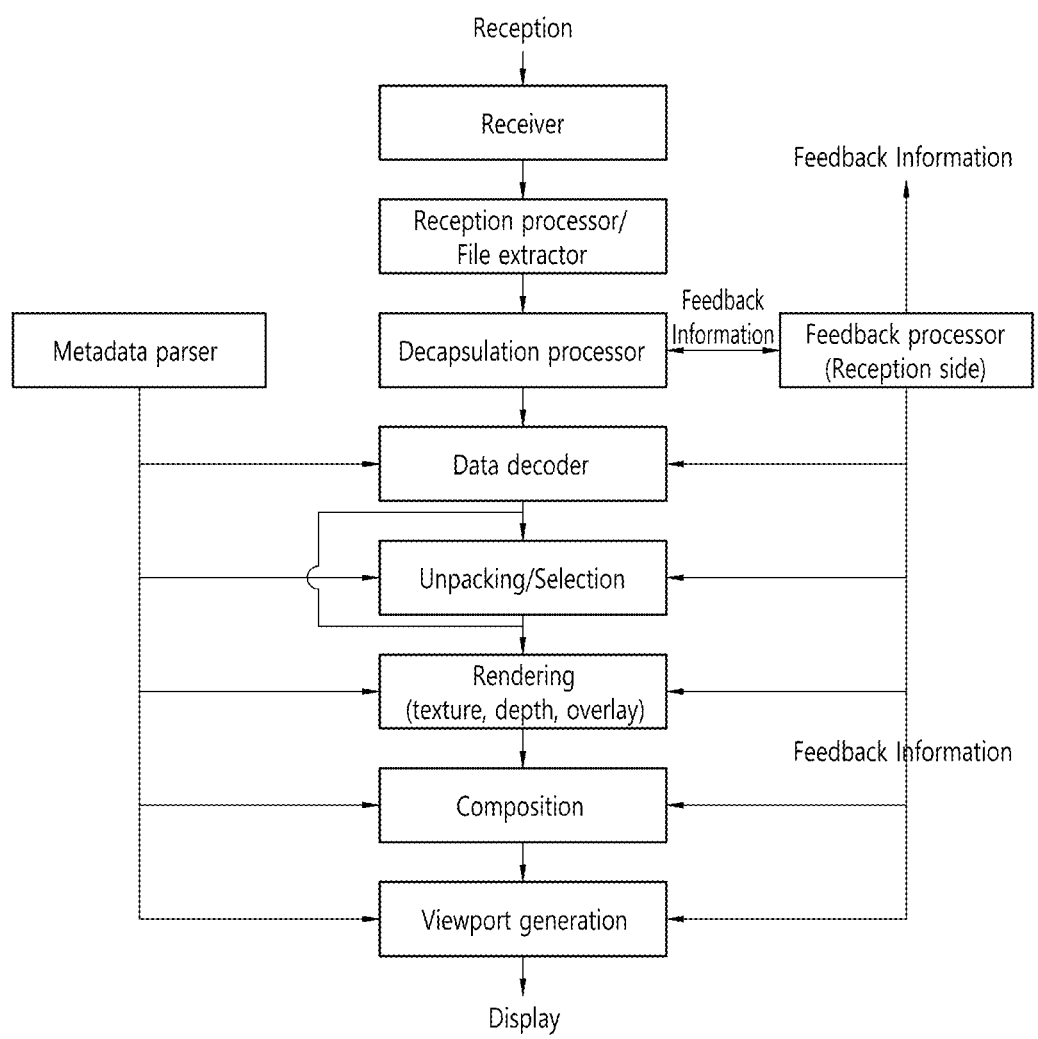
FIG. 17 is a diagram schematically showing an example of configuration of a 3DoF+reception point.

FIG. 17 is a diagram schematically showing an example of configuration of a 3DoF+receiver.

Referring to FIG. 17, a reception point (a 360 video reception apparatus) may receive a bit stream transmitted from a transmission point, and extract a necessary file from the bit stream. It is possible to select an image stream in a generated file format using viewpoint/viewing position/viewing orientation information and video metadata delivered from a feedback processor, and to reconfigure the selected bit stream into image information using a decoder. Packed images may be unpacked based on packing information transmitted through metadata. If the packing process is omitted in the transmission point, unpacking in the reception point may be omitted as well. In addition, as necessary, it is possible to perform a process of selecting an image suitable for a viewpoint/viewing position/viewing orientation delivered from the feedback processor and a necessary component. It is possible to perform a rendering process of reconfiguring an image into a format suitable to reproduce texture, depth, overlay information of the image. Before generating a final image, a composition process may be performed to integrate information of different layers, and an image suitable for a display viewport may be generated and reproduced.

The present disclosure may provide a method for processing 360 video data on the basis of a subpicture. In other words, an embodiment of the present invention may support a user viewpoint dependent processing in a 360 image processing system. An embodiment of the present invention may correspond to some functions of decoding and post-processing in a 3DoF+end-to-end system, and may correspond to some functions of a 3DoF+end-to-end system architecture of FIG. 14B and/or some functions of unpacking/selection of a 3DoF+receiver of FIG. 17.

Figure 18:
FIG. 18 shows an overlay metadata signal on overlay media track.

FIG. 18 illustrates overlay metadata signaling on an overlay media track.

According to an embodiment of the present invention, a method for configuring an overlay media packing in a VR media file and a signaling method for the packing may be proposed. Hereinafter, a VR media file may be referred to as a file or a media file.

In one embodiment, a file may include a VR media (including a 360 video), a media (video, image, text, graphics, and audio) to be overlaid on the corresponding media (video, etc.), and related metadata. Hereinafter, a media to be overlaid on a VR media may be referred to as an overlay media.

In one embodiment, a VR media track may include an entire or part of one media (e.g., a VR video). For example, the track may be a sub-picture track, and one sub-picture track may include only a video corresponding to a partial region of an entire 360 video. That is, one VR media may be included in one or more media tracks.

Referring to FIG. 18, in the case of File #1, a file may include one or more VR media tracks, one or more overlay media tracks, and one or more metadata tracks, etc. Alternatively, in the case of File #2, a file may include one or more VR media tracks and one or more metadata tracks, etc., and one or more overlay media track may be included and packed in one VR media track. A method for configuring an overlay track in a VR media file may support the above two.

A metadata track may include one or more items of metadata items. Alternatively, a metadata track may include one or more items of metadata related to with an overlay media track. For example, a metadata may include metadata associated with a VR media (e.g., an initial viewing orientation or a recommended viewpoint of the VR media), or metadata associated with an overlay media (e.g., an overlay location of the overlay media and a property thereof). That is, an overlay metadata track may include information on an overlay location, a size, and a property (opacity and interaction) which are necessary for overlay rendering. Hereinafter, metadata associated with an overlay media may be referred to as an overlay metadata. Here, an overlay related track may include an overlay media track and an overlay related metadata track.

In addition, a VR media track may include an entire or part of a VR media and may include an overlay media. In this case, a metadata track may include metadata items associated with a VR media or an overlay media. In other words, the overlay media track may include overlay media projection information, defult rendering information, etc., and the metadata track may include information for overlay rendering (a location, a size, opacity, etc.).

Figure 19:
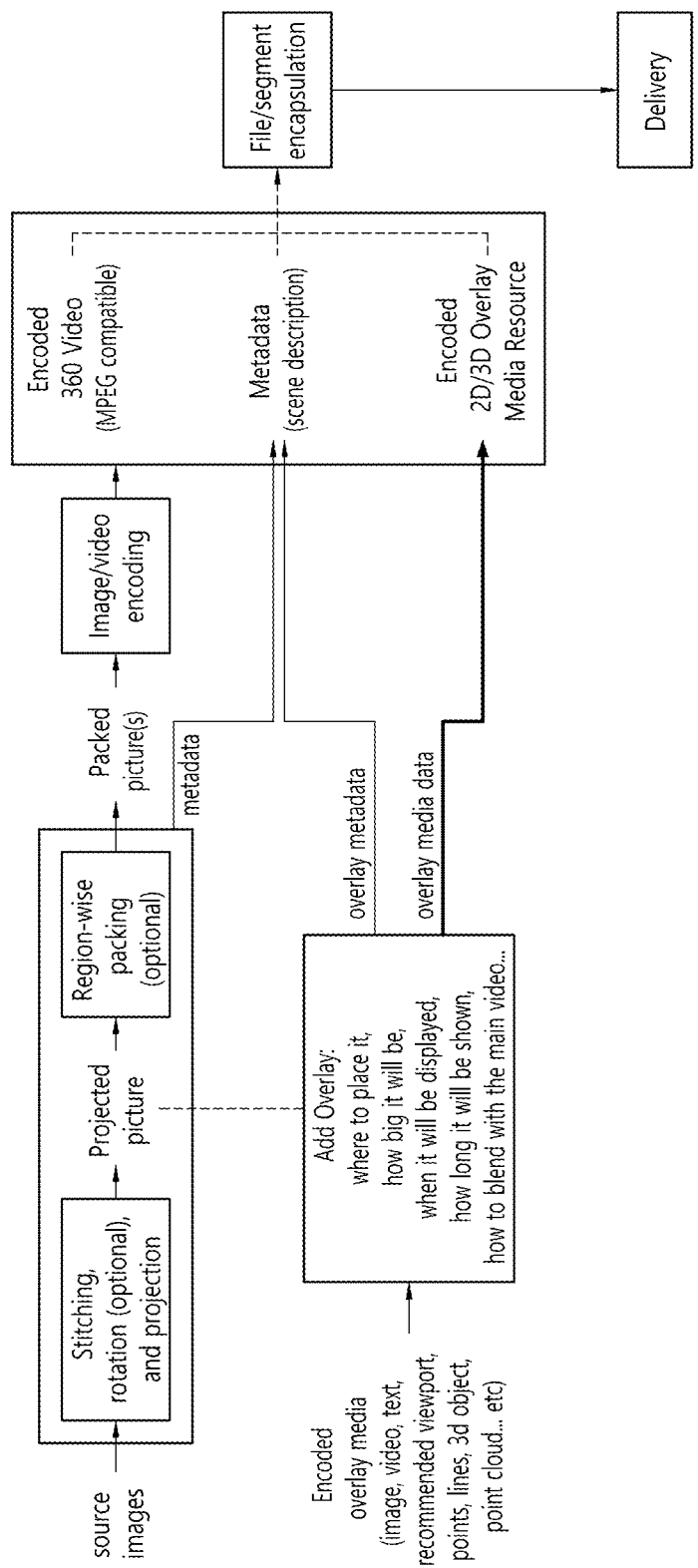
FIG. 19 shows an example of packing an overlay media in a VR media file.

FIG. 19 shows an example of a process of packing an overlay media in a VR media file.

Referring to FIG. 19, an embodiment may obtain a projected picture from source images through a stictching process and a projection process. Here, the source images may refer to captured images/videos, the stiching process may be a process of connecting at least one captured image/video, the projection process may be a process of mapping a stiched image/video into a 2D image, and the projected picture may be a picture mapped into a 2D image. A detailed description thereof is already mentioned above. In addition, a rotation process may be optionally further included herein.

An embodiment may optionally obtain a packed picture from the projected picture through a region-wise packing process, and obtain an encoded 360 video by encoding the packed picture. Alternatively if the region-wise packing process is not performed, an encoded 360 video may be obtained by encoding the projected picture. Here, the region-wise packing process may refer to a process of individually processing a video data projected on a 2D image for each region, the encoding may be performed using an existing or next-generation codect, and the encoded 360 video may be compatible with an MPEG format. A detailed description thereof is already provided above.

An embodiment may obtain metadata from each aforementioned process, and the metadata may be delivered after going through fine/segmentation emcapsulation process together with overlay metadata described below and the aforementioned encoded 360 video. Here, the file/segmentation encapsulation process may refer to a process of encalsupation into an encoded 360 video and/or metadata file or segment format, and a detailed description thereof is already provided above.

An overlay metadata may be obtained from an encoded overlay media through an add-overlay process. Here, the add-overlay process may be a process of generating information on a location of an overlay media to be overlaid, a size of the overlay media, when the overlay media is to be displayed, how long the overlay media is to last, how the overlay media is to blends with a main video, etc., and the overlay media may include, for example, information on a recommended viewport, points, lines, a 3D object, a point cloud, etc.

An overlay media generated in the add-overlay process according to an embodiment may be regarded as an encoded 2D/3D overlay media resource and delivered after going through a file/segmentation encapsulation process together with the aforementioned metadata, overlay metadata, and encoded 360 video.

That is, an unprojected overlay media may be delivered as one track, and an overlay media may be packed as a VR media, as indicated by a thick arrow in FIG. 19. Alternatively, the overlay media track may be included and packed in a VR media track.

Figure 20:
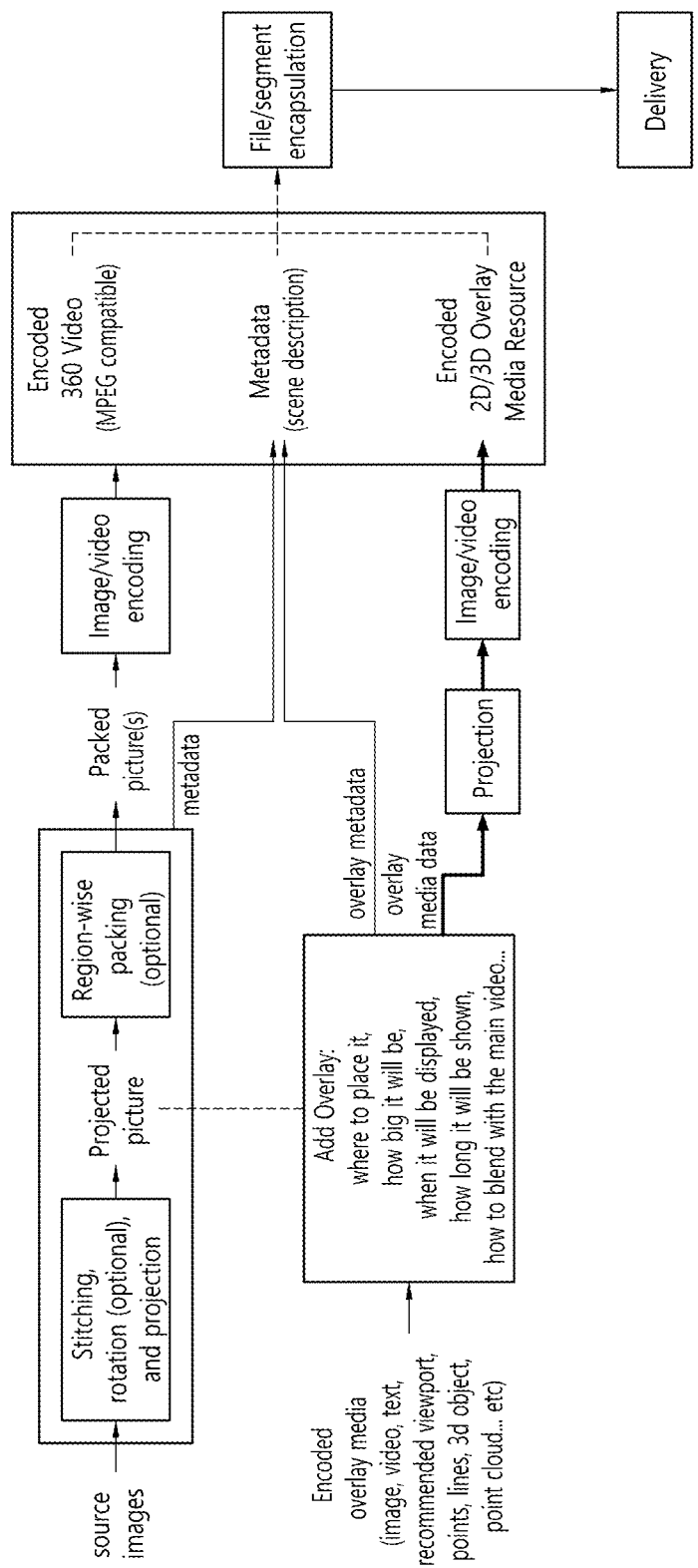
FIG. 20 shows another example of packing an overlay media in a VR media file.

FIG. 20 shows another example of a process of packing an overlay media in an VR media file.

Referring to FIG. 20, an embodiment may pack an overlay media in a VR media file through a process similar in FIG. 19, and thus, a description about an overlay media data different from as described in FIG. 19 will be provided below and a description about a process identical to as described in FIG. 19 will be omitted.

An overlay media data generated in an add-overlay process according to an embodiment may further go through a projection process and an encoding process, and accordingly, an encoded 2D/3D media resource may be obtained.

Thereafter, the encoded 2D/3D media resource may be delivered after going through a file/segment encapsulation process together with the aforementioned metadata, overlay metadata, and encoded 360 video.

That is, a projected overlay media may be delivered as one track, and an overlay media may be packed as a VR media through a process indicated by thick arrows in FIG. 20. Alternatively, the overlay media track may be included and packed in a VR media track.

Figure 21:
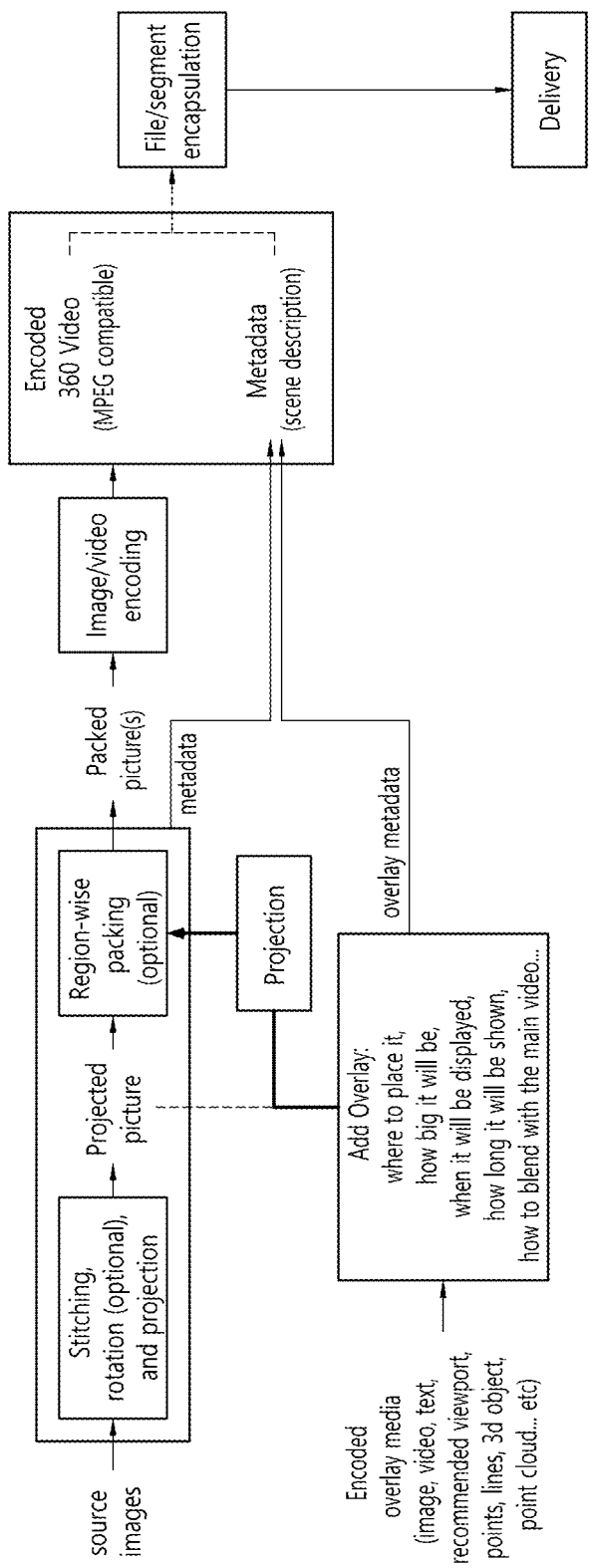
FIG. 21 shows yet another example of packing an overlay media in a VR media file.

FIG. 21 shows yet another example of a process of packing an overlay media in a VR media file.

Referring to FIG. 21, an embodiment is capable of packing an overlay media in a VR media file through a process similar as shown in FIG. 19, and thus, a description about an overlay media data different from as described in FIG. 19 will be provided below and a description about a process identical to as described in FIG. 19 will be omitted.

An overlay media data generated in an add-overlay process according to an embodiment may go through a region-wise packing process together with the aforementioned projected picture through a projection process, and accordingly, the overlay media data may be included in a packed picture. In addition, the packed picture containing the overlay media data may be encoded to thereby obtain an encoded 360 video, and the encoded 360 video may be delivered after going through a file/segment encapsulation process together with the aforementioned metadata and overlay metadata.

That is, a projected overlay media may be transmitted while packed in a VR track, and the overlay media may be packed in a VR media through a process indicated by thick arrows in FIG. 21. Alternatively, the overlay media track may be included and packed in the VR media track.

Figure 22:
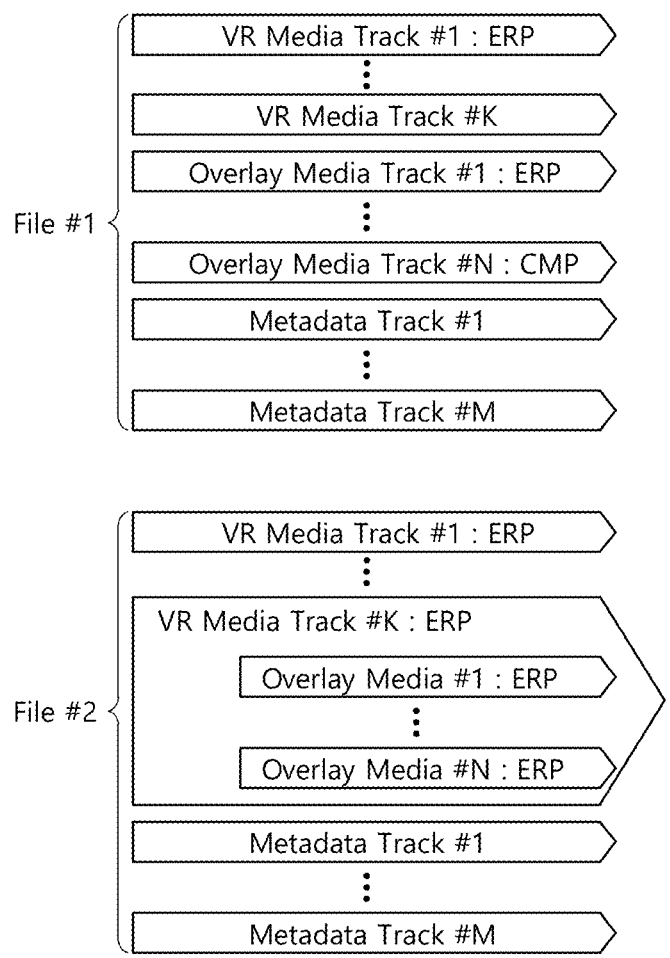
FIG. 22 shows an example of a projection scheme of an overlay media track.

FIG. 22 shows an example of a projection scheme for an overlay media track.

For example, in order to describe a projection scheme for an overlay media track, it is assumed that projection of a VR media is capable of supporting an Equirectangular (ERP) scheme and a cubemap (CMP) scheme. In this case, it may be necessary to consider the same projection even for an overlay media track.

In the case of File #1, that is, in the case where an overlay media track is separated from a VR media track, a projection scheme applied to the VR media track and a projection scheme applied to the overlay media track may be identical or different. Inconsistent projection schemes may re-project overlays according to the VR media track, and this process may be performed by a renderer of a player. For example, if a projection scheme for a VR media track #1 is ERP, a projection scheme for an overlay media track may be ERP or CMP.

In the case of File #2, that is, in the case where an overlay media track is included in a VR media track, a projection scheme applied to the corresponding VR media track and a projection scheme applied to the overlay media track may be identical. In other words, a projection scheme for a VR media track including an overlay media track is ERP, all projection schemes for one or more overlay media tracks included in the corresponding VR media track may be ERP.

Figure 23A:
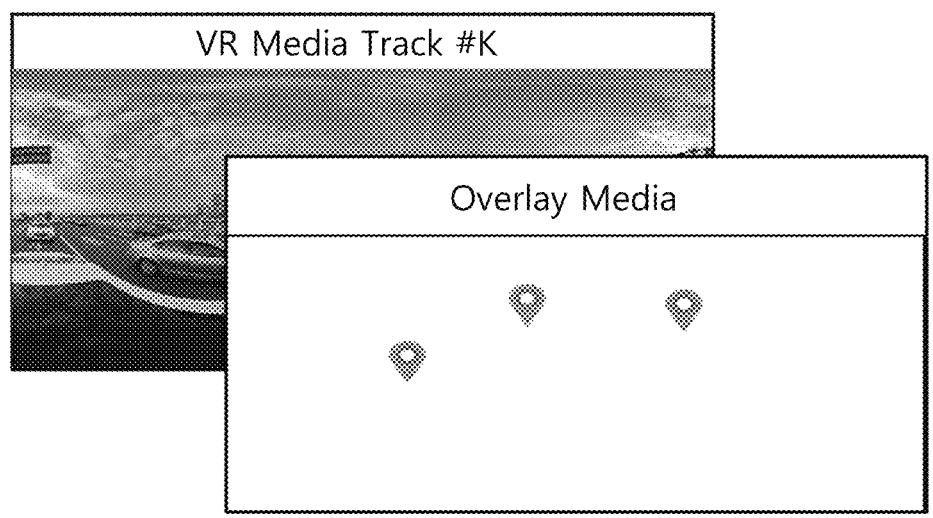
FIGS. 23A and 23B are examples of an overlay media packed in a VR media track.
Figure 23B:
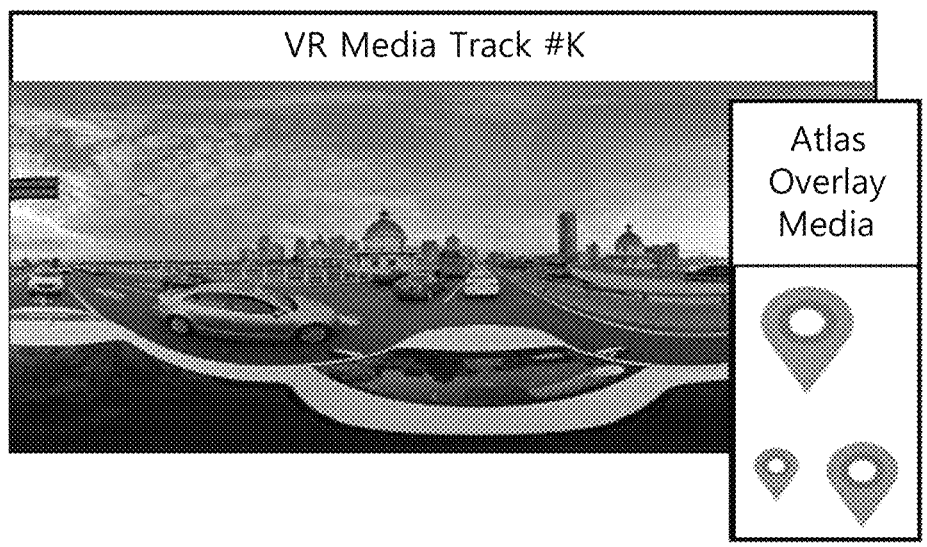

FIGS. 23A and 23B are examples of an overlay media to be paked in a VR media track.

In an embodiment, if a VR media track is a 360 video, the VR media track may be projected according to a projection type or scheme for the 360 image and the projected VR media track may be referred to as a projected image. The projected image may be subject to a region-wise packing process and may be packed by applying a different resolution for each region. That is, in order to store a region currently viewed by a user with a high resolution, location/region information about an image in which the corresponding region is projected, and location/region information about an image in which the corresponding region is packed. That is, location/region information about the corresponding region in the projected image, and location/region information about the corresponding region in the packed image may be stored.

Likewise to the VR media, an overlay media may be packed in the VR media through the projection and region-wise packing, and two methods may be herein used.

Referring to FIG. 23A, a first method may place an entire overlay media connected to a VR media track in a space and generate a projected overlay image by applying projection in accordance with projection for the VR media track. Hereinafter, the projected overlay image may be referred to as an overlay projection image. In addition, the generated projection image goes through a region-wise packing in the same manner as does the same VR media track. In this case, a width and a height of a projection image of the VR media may be identical to a width and a height of an overlay projection image. That is, as shown in FIG. 23A, in the case where an overlay media is included in a VR media track #K, an entire overaly media may be placed in a space in size identical to a size of a space for a VR media of the VR media track, and the same region-wise packing process for the VR media may be applied. In other words, one or more overlay media may be projected to generate one image, and the one image may be delivered to deliver the entire overlay media. Here, the one image may an overlay media in which locations are reflected on the VR media.

Referring to FIG. 23B, a second method may arranging each overlay media connected to a VR media track in a space, and generate a projected overlay image for each overlay by applying projection according to a projection scheme for the VR media track. Therefore, each overlay may have projection images, each of which is projected in consideration of a location thereof. In addition, the respective generated overlay projection images may be packed into one by appling atlas method.

Here, a region-wise packing syntax may be used but may imply a different meaning. This is a method for packing without leaving any non-overlay region as possible as it can, because there is a possibility that no overlay exists in all 360-degree regions. In addition, an overlay resolution may be maintained. In this case, the width and height of the projection image of the VR media do not need to be identical to the width and height of the entire overlay projection images to which the Atals method has been applied, and thus, the width and height of the projection image of the VR media may be different from the width and height of the entire overlay projection images.

That is, as shown in FIG. 23B, each overlay media may be projected, each projected overlay media may be included in a single image through the atlas method, and every overlay media may be delivered by deliverying the single image. Here, an overlay media may be placed in such a way to minimize a region having no overlay media in an image. In this case, each overlay media may additionally obtain location information to be connected to a VR media.

In an embodiment, an overlay metadata is referred to as an overlay related metadata, an overlay media metadata, a metadata for packing an overlay media in a VR media track, etc, and may be included in OverlayPackingConfigBox. OverlayPackingConfigBox may include, for example, the following as in Table 1.

TABLE 1

```
Class OverlayPackingConfigBox extends FullBox( 'ovcb' ) {
    unsigned int(8) num_overlays;
    for (i = 0; i < num_overlays; i++) {
        unsigned int(1) region_wise_packing_flag[i];
        if(region_wise_packing_flag[i]) {
            unsigned int(8) overlay_layer_index[i];
            unsigned int(8) num_regions[i];
            unsigned int(32) proj_picture_width[i];
            unsigned int(32) proj_picture_height[i];
            unsigned int(16) packed_picture_width[i];
            unsigned int(16) packed_picture_height[i];
            for (i = 0; i < num_regions[i]; i++) {
                unsigned int(4) packing_type[i][j];
                if (packing_type[i][j] == 0) {
                    unsigned int(32) proj_reg_width[i][j];
                    unsigned int(32) proj_reg_height[i][j]
                    unsigned int(32) proj_reg_top[i][j];
                    unsigned int(32) proj_reg_left[i][j];
                    unsigned int(3) transform_type[i][j];
                    unsigned int(16) packed_reg_width[i][j];
                    unsigned int(16) packed_reg_height[i][j];
                    unsigned int(16) packed_reg_top[i][j];
                    unsigned int(16) packed_reg_left[i][j];
                }
            }
        }
    }
}
```

In Table 1, a num_overlays field may indicate the number of overlays packed in a track, and a region_wise_packing_flag field may be a flag indicative of whether region-wise packing has been applied. Herein, if the region_wise_packing_flag field has a value of 1, it may indicate that a plurality of overlays is included in a single picture. However, the corresponding flag may be indicated additionally as overlay type information.

Here, in the case where the region-wise packing has been applied, an overlay_layer_index field may indicate an indez of a layer including an overlay among packed image layers, and a num_regions field may indicate the number of packed regions. In addition, a proj_picture_width field and a proj_picture_height field may indicate a width value and a height value of a projected image, respectively, and a packed_picture_width field and a packed_picture_height field may indicate a width value and a height value of a packed image, respectively.

In addition, a packing type field may indicate a type of the region-wise packing. For eample, if the packing type field has a value of 0, it may indicate rectangular region-wise packing. A proj_reg_width field, a proj_reg_height field, a proj_reg_top field and aproj_reg_left field may indicate location/size information of a corresponding overlay in a projected image. That is, the respective fields may indicate a width value, a height value, a top point location value, a left point location value of the corresponding overlay.

A transform type field may indicate whether to apply rotation or mirroring, and, the transform_type field having a value of 0 may indicate non application (no change), the transform_type field having a value of 1 may indicate mirroring horizontally, the transform_type field having a value of 2 may indicate rotation by 180 degrees, the transform_type field having a value of 3 may indicate rotation by 180 degrees before mirroring horizontally, the transform_type field having a value of 4 may indicate rotation by 90 degrees before mirroring horizontally, the transform_type field having a value of 5 may by 90 degrees, the transform_type field having a value of 6 may indicate rotation by 270 degrees before mirroring horizontally, and the transform_type field having a value of 7 may indicate rotation by 270 degrees. In addition, the packed_reg_width field, the packed_reg_height field, the packed_reg_top field and the packed_reg_left field may indicate location/size information of a corresponding overlay in a packed image. That is, these fields may indicate a width value, a height value, a top point location value, and a left point location value of the corresponding overlay.

In addition, metadata may include the case of applying the atlas method similarly to the camse of the above-described method of applying region-wise packing.

Figure 24:
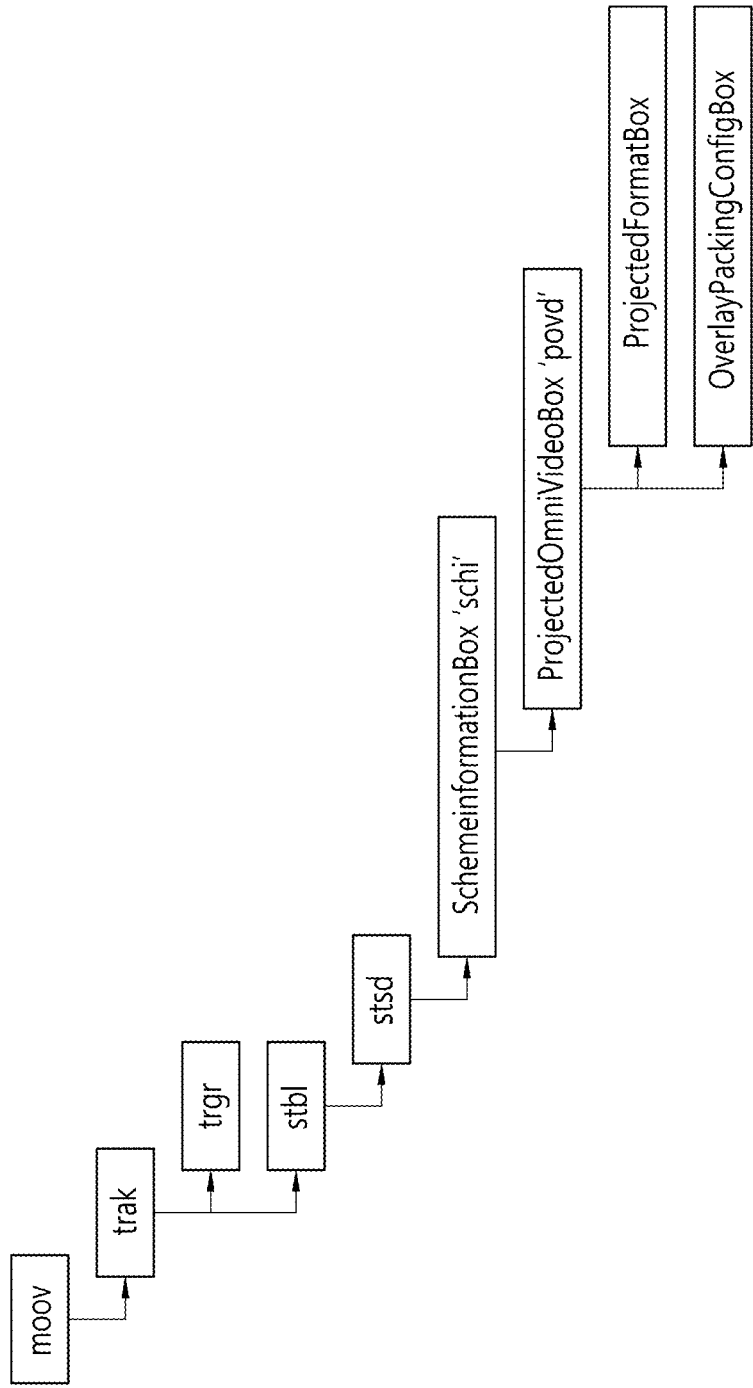
FIG. 24 is an example of a location of OverlayPackingConfigBox in a structure of a media file.

FIG. 24 is an example of a location of OverlayPackingConfigBox in a structure of a media file.

Referring to FIG. 24, OverlayPackingConfigBox of FIG. 1 may be included in ProjectedOmniVideobox. However, in the case where OverlayPackingConfigBox does not exist in ProjectedOmniVideobox, this may indicate that a corresponding track does not have a packed overlay. That is, OverlayPackingConfigBox may be optionally included in ProjectedOmniVideoBox.

In other words, a moov box in a media file structure may include a trak box, and the trak box may include a trgr box and a stbl box. In addition, the stbl box may include a stsd box, and the stsd box may include SchemeinformationBox. The SchemeinformationBox may include the aforementioned ProjectedOmniVideoBox, and ProjectedOmniVideoBox may include ProjectedFormatBox and may optionally include OverlayPackingConfigBox. A detailed description about other boxes has been described above with reference to FIGS. 2 and 3 and thus herein omitted.

In an embodiment, in the case where one track includes an overlay media, information about grouping and a projection type (scheme) may be signaled, and this information may be included in TrackGroupTypeBox. That is, a Track_group_type field in TrackGroupTypeBox has a value of ovgr, TrackGroupTypeBox may indicate a track group including a VR media and an overlay media. This may indicate a track group capable of being rendered together with an overlay and the like in a 360 scene, and may indicate that tracks having the same track_group_id are capable of being rendered with an overlay and the like in a 360 scene. TrackGroupTypeBox may include, for example, the following as in Table 2.

TABLE 2

Aligned(8) class OverlayVideoGroubBox extends
TrackGroupTypeBox( 'ovgr ' ) {
    unsigned int(5) media_type;
    unsigned int(8) projection_type;
    unsigned int(1) main_media_flag;
    unsigned int(1) overlay_media_flag;
    if ((media_type == 1 )|| (overlay_media_flag)){
        unsigned int(1) overlay_essential_flag;
    }else
        bit(1) reserved = 0;
}

In Table 2, a media_type field may indicate a type of a media in a track group. For example, the media_type field having a value of 0 may indicate that a corresponding track is a main media, and the media_type field having a value of 1 may indicate that the corresponding track is an overlay media. A projection type field may indicate a projection type or scheme applied to a corresponding media. For example, the projection type field having a value of 0 may indicate CMP, the projection_type field having a value of 1 may indicate ERP, and the projection type field having a value of 2 may indicate None. A main media flag field may be a flag indicative of whether a corresponding media is a main media, and an overlay_media_flag field may be a flag indicating whether a corresponding media is an overlay media. An overlay_essential_flag field may be a flag indicative of whether an overlay media is mandatory to be overlaied. Here, in one embodiment, in the case where an overlay media mandatory to be overlaied is included, a player not supporting overlay may not reproduce a main media in the same group. A related operation thereof will be described below with reference to FIGS. 25A and 25B.

Figure 25A:
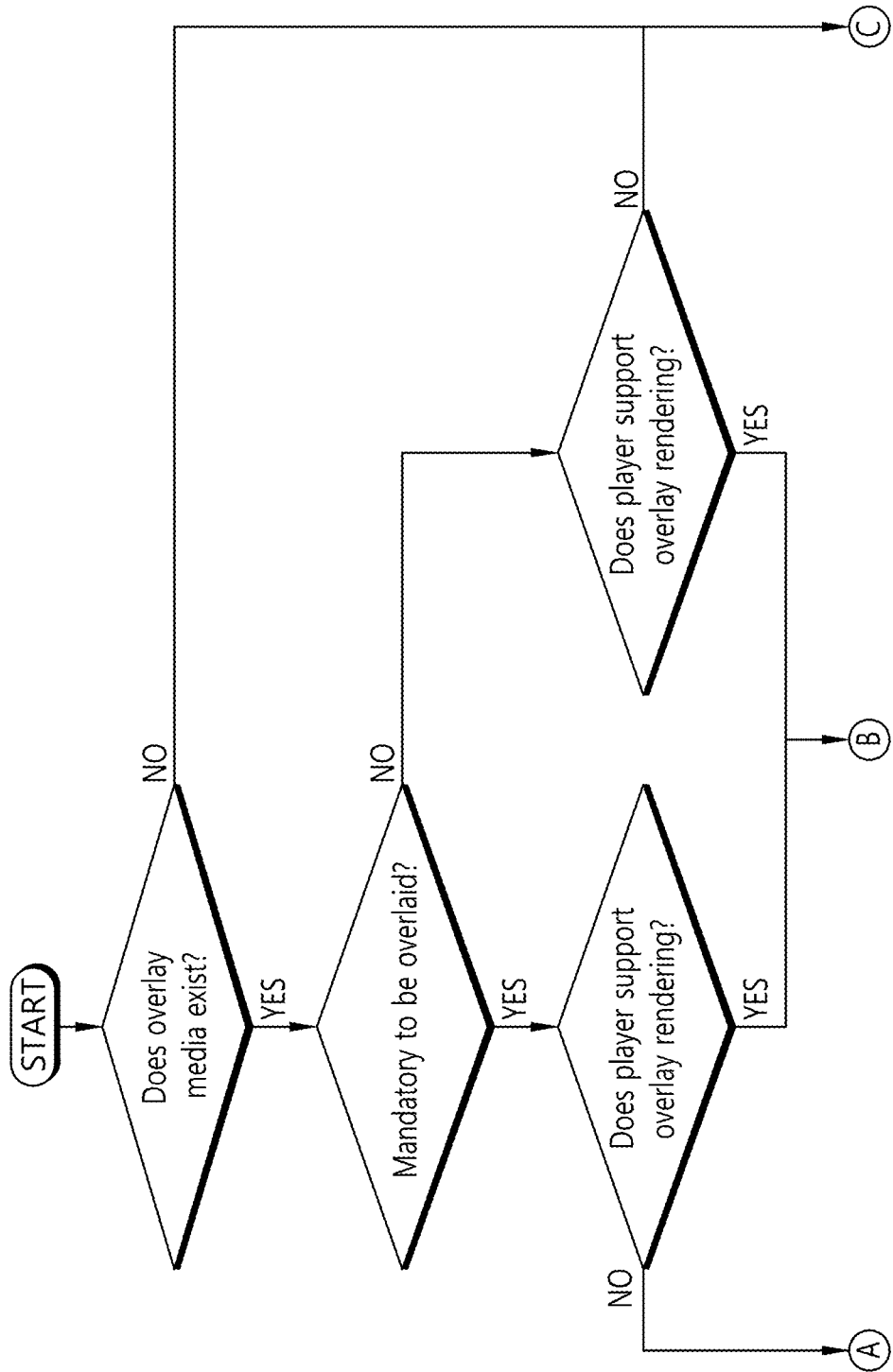
FIG. 25A and FIG. 25B are examples illustrating an operation of receiving a 360 video in consideration of an overlay media.
Figure 25B:
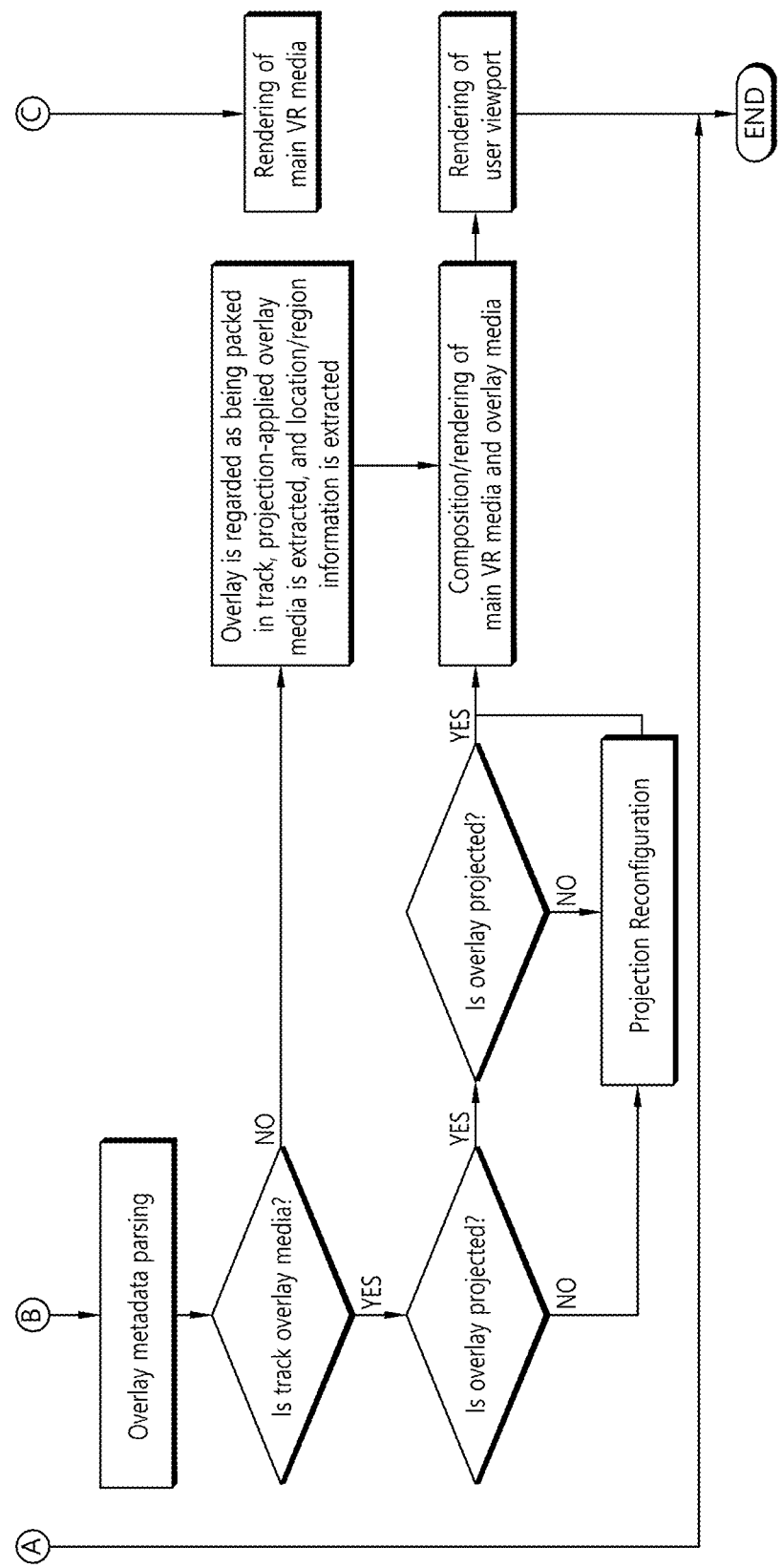

FIGS. 25A and 25B are examples of an operation of receiving a 360 video in consideration of an overlay media.

FIGS. 25A and 25B are may be a single flowchart, and A, B, and C in FIG. 25A may be connected to A, B, and C in FIG. 25B. Referring to FIGS. 25A and 25B, a 360 video reception apparatus according to an embodiment may first determine whether an overlay media exists. That is, it may be conformed as to whether an overlay media track exists in a file or the overlay media track is included in a VR media track. Here, in the case where the overlay media does not exist, the 360 video reception apparatus may render a main VR media and render a user viewport. However, in the case where the overlay media exists, the 360 video reception apparatus may determine whether the overlay media is mandatory to be overlaied. That is, it may be determined as to whether the corresponding overlay media is an overlay media mandatory to be overlaid.

In the case where the overlay media is an overlay mandatory to be overlaied, the 360 video reception apparatus may determine whether a player supports overlay rendering, and, if the player does not support overlay rendering, the 360 video reception apparatus may terminate a process without rendering even a main VR media. However, If the player supports overlay rendering, the 360 video reception apparatus may parse overlay metadata.

In the case where the overlay media is not an overlay media necesarly to be overlaid, the 360 video reception apparatus may determine whether the player supports overlay rendering, and, if the player supports overlay rendering, the 360 video reception apparatus may render the main VR media and render a user viewport. However, in the case where the player supports overlay rendering, the 360 video reception apparatus may parse overlay metadata.

The 360 video reception apparatus may parse the overlay metadata to determine whether a corresponding track is an overlay media. Here, in the case where the corresponding track is not an overlay media (or an overlay media track), the 360 video reception apparatus may consider that an overlay is packed in the track and thus may extract a projected overlay media and extract location/region information of the overlay media. Then, the 360 video reception apparatus may composite the main VR media and the overlay media, render the same, and render user viewport.

In the case the corresponding track is an overlay media (or an overlay media track), the 360 video reception apparatus may determine whether an overlay is projected. Here, if the overlay is not projected, the 360 video reception apparatus may re-configure projection. In doing so, the main VR media and the overlay media may be combined and rendered, and a user viewport may be rendered. However, in the case where the overlay is projected, the 360 video reception apparatus may determine whether the overlay matches with projection of the main VR media. That is, it may be determined as to whether a projection scheme for the main VR media and a projection scheme for the overlay media match each other.

In the case where the overlay matches with projection of the main VR media, the 360 video reception apparatus may combine the main VR media and the overlay media, render the same, and render a user's viewport. However, in the case where the overlay does not match with projection of the main VR media, the 360 video reception apparatus may re-configure projection and, in dong so, combine the main VR media and the overlay media, render the same, and render the user viewport.

FIG. 26 is an example of an overlay of a 360 video.

An embodiment of the present invention relates to an overlay method for a VR media service and a signaling method therefor, and an editor which produces a 360 video may place overlays on the 360 video.

In an embodiment, metadata may be generated based on information about the placed overlays, and the information may be delivered to a data input unit of a 3DoF+transmission terminal, delivered to a data encoder or an encapsulation processor through a metadata processor, and thereby delivered to a 3DoF+reception terminal. The 3DoF+reception terminal may extract a necessary file from a received bit stream, extract overlay related metadata through a decapsulation processor and a metadata parser, and deliver the extracted overlay related metadata to a renderer, render the overlay related metadata through the renderer, and output the overlay related metadata to a screen through a composition process. On the entire architecture, an input by a producer may be delivered to an input unit together with an overlaid media (text, visual, audio, etc.), and overlay location/size/rendering property related metadata may be generated through composition generation. A media may be packed, file/agement encalsulated through a video/image encoding process, and delivered to a reception terminal, a text may be text-encoded, and an audio may be audio-encoded, file/segment encapsulated through a video/image encoding process, and delivered to a reception terminal. A receiving unit may extract a necessary file from a delivered bit stream, extract an overlay related metadata through a file/segment decapsulation prcessor and a metadata parser, and decode a media to be overlaid through a vide/image, text, and audio decoder. The extracted overlay related metadata and media data may be delivered to an overlay renderer to so that an overlay is rendered and a user'w viewport is rendered through a composition process to thereby output the overlay related metadata and media data on a screen.

According to an embodiment, in order to provide an overlay in a VR media service, the overlay may be extended in consideration of the following cases due to differences from an existing general video service. Here, the overlay may include, but not limited to, at least one of graphic, image, scalable vector graphic (SVG), timed text (Tagged Text Markup Language (TTML)), Web Video Text Tracks (WebVTT), Internet Media Subtitles and Captions 1.0.1 (IMCS1), European Broadcasting Union Timed Text part D (EBU-TT-D), bitmap subtitle data, etc.

Thus, an embodiment may provide an overlay media track configuration about where and how data information of an overlay media is stored, overlay media packing information about how the overlay media is packed, overlay media projection information about whether projection is applied to the overlay media, overlay media projection information about whether projection is applied to the overlay media, overlay media projection and packing information signaling, a method of linking the overlay media track and a VR media track, overlay rendering location/size information about when an overlay is located at which location with which size when the VR media is played, overlay rendering property information about whether to make an overlay appear transparent or how to blend the overlay, overlay miscellaneous information about providing other functions of which overlay rendering, overlay interaction information about whether interaction with the overlay is possible in which range, dynamic overlay metadata signaling, a method for linking an overlay metadata track and the overlay media track, and a method of signaling overlay metadata related to the overlay media track.

Figure 27:
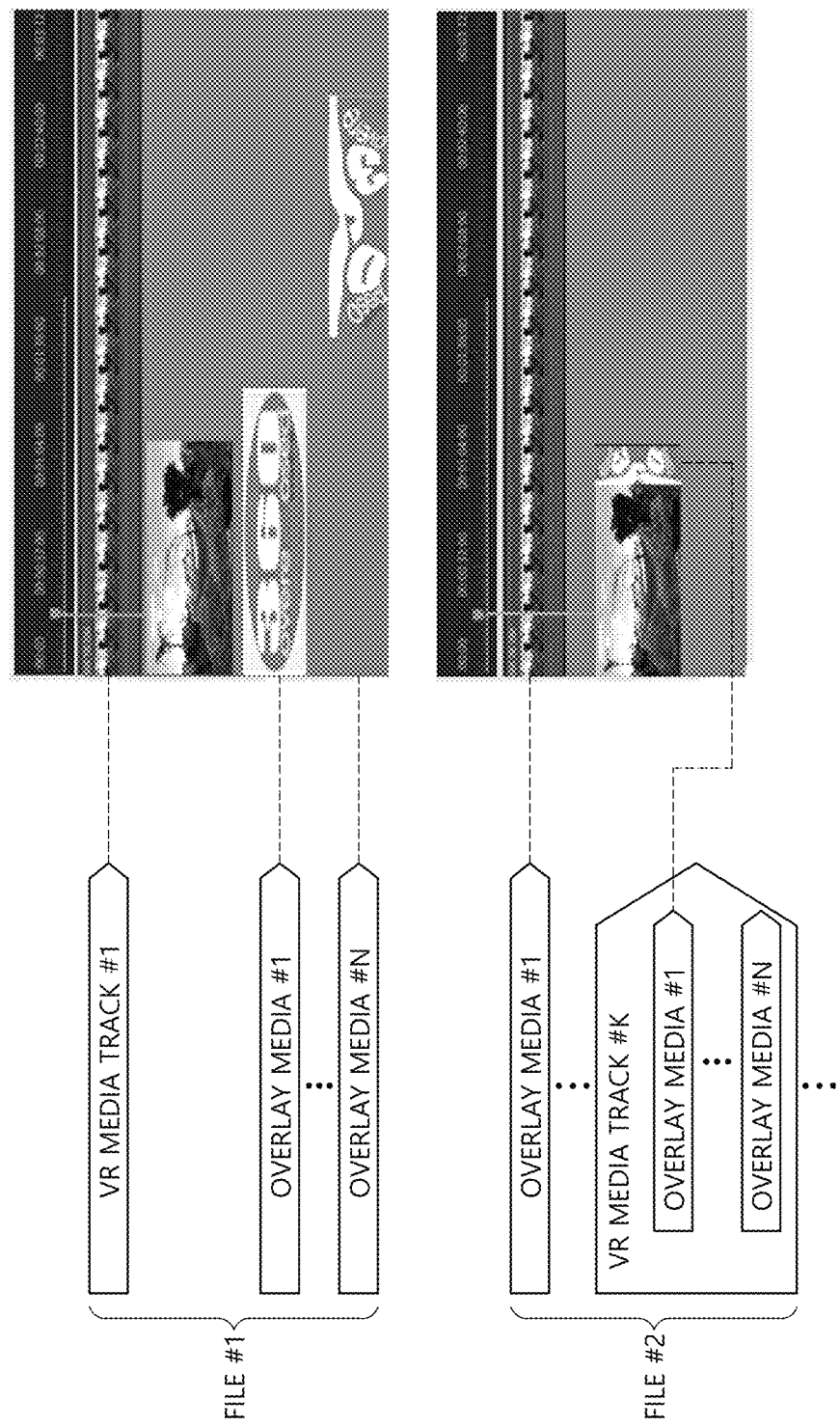
FIG. 27 shows an example of a configuration of an overlay track in a VR media file.

FIG. 27 is an example of configurations of an overlay track in a VR media file.

Referring to FIG. 27, File #1 may be in a format in which a VR media and an overlay media are separated into individual tracks. That is, an image corresponding to the overlay media may be separated from the VR media. File #2 may be in a format in which a VR media and an overlay media are packed together in a VR media track. That is, an image corresponding to the overlay image may be included in the VR media.

Referring back again FIG. 18, in the case of File #1, an overlay media track may include projection information and packing information of an overlay media. In the case of Fi.e #2, an overlay media may be included in a VR media track. Here, information about how the overlay media is packed may be necessary, as in File #1. However, the overlay projection information may support the following two, unlike as in File #1.

Firstly, the overlay media may share projection information of the VR media track. That is, it may be necessary to assume that every overlay media included in the VR media track is stored with projection applied thereto, the projection which is applied to the VR media track. Secondly, projection information about individually packed overlays may be included additionally, as shown in File #1. In this case, overlays included in the VR media track may have different projection types and do not necessarily coincide with the projection for the VR media.

FIG. 28 is an example of four possible overlay media packing configurations of File #1.

In the case of File #1, an overlay media can be packed in one overlay media track as in the following four options. In FIG. 28, an image may indicate an overlay media. Referring to FIG. 28, a first case (Case 1) may be the case where one overlay is packed as one overlay media. That is, one overlay may be included in one media. A second case (Case 2) may be the case where N number of overlays is packed as N number of overlay media. That is, one overlay may be included in one image and a plurality of images may be used. This case may be referred to as a sub sample case. A third case (Case 3) may be the case where N number of overlays is packed as one overlay media. That is, a plurality of overlays may be included in one image and this case may be referred to as an integrated packing case. A fourth case (Case 4) may be the case where N number of overlays is packed as M number of overlay media. That is, it may be the case where a plurality of overlays can be included in one image and a plurality of images can be used. Such a case may be referred to as an integrated packing+sub sample case. Here, N and M may be natural numbers greater than 1 and may be different from each other.

Figure 29:
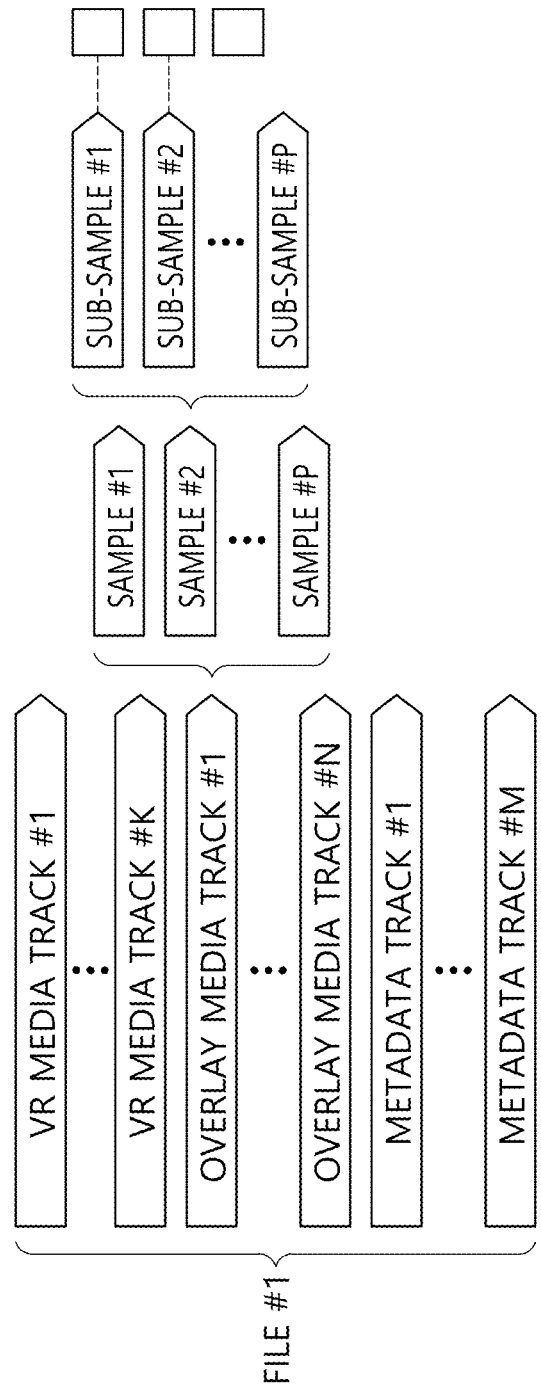
FIG. 29 is an example of a structure of a track in File #1.

FIG. 29 is an example of a structure inside a track of File #1.

Referring to FIG. 29, in one embodiment, a track may include a sample. In the case where a media is a video, the sample may be a data on one frame of a specific time, and, in the case where a media is an image, the sample may be an image data of a specific time. Here, the sample may be configured as a sub sample. The sab sample may be configured in the case where muitple items of data for a specific time exist at the same time.

Here, integrated packing may refer to a method of packing multiple overlay medias into one integrated form so that one track is configured as one sample or sub-sample, and this may refer to the aforementioned third case.

In one embodiment, a method for integratedly packing multiple overlayers in one overlay media track may utilize the following two methods.

The first method may be a texture atlas method for packing overlay medias into one texture, regardless of rendered locations. The second method may be a rewion-wise packing method in which an overlay is rendered to a specific location in advance by a transmitter and a projected picture of the overlay projected according to a projection type is packed on the basis of a region.

In an embodiment, each overlay media track may be a media track including one overlay media, may be a track including multiple overlay medias through sub-samples, or may be a media track in which multiple overlays are integrated into one sample. Such various types of overlay media tracks may coexist in one file.

In an embodiment, the texture atlas method may be applied for overlay media packing. In realtime computer graphics, texture atlas may refer to a method of packing small textures into one large texture, and the large combined texture itself may be referred to as a texure atlas. The texture atlas may be composed of sub-textures in the same size and may be composed of textures in various sizes. Alternatively, the texture atlas may be composed to maintain a resolution of an overlay media. Each sub texture may extract a content using a packed location information value.

Figure 30:
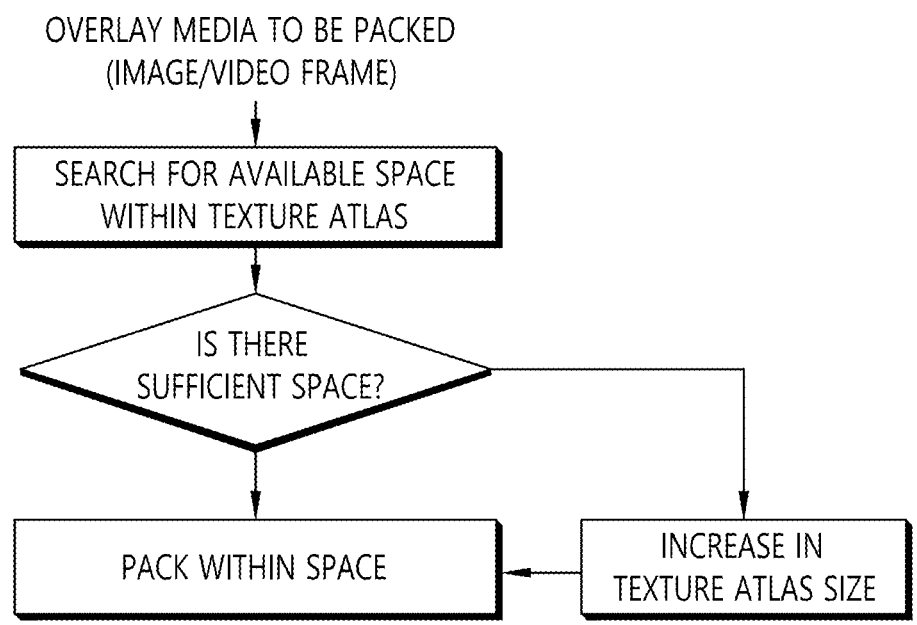
FIG. 30 is an example of a flowchart of a method for generating texture atlas.

FIG. 30 is an example of a flowchart of a method for generating a texture atlas.

Referring to FIG. 30, a method for generating a texture atlas may include, if there is an overlay media (image/video frame) to be packed, searching for an available space within a texture atlas. Here, whether the space is large enough may be determined based on a space that can be used with an overlay media, and thus, if the space is large enough, the overlay media may be packed in the space, and, if not, the texture atlas size may be increased and then the overlay media may be packed in the space.

Figure 31:
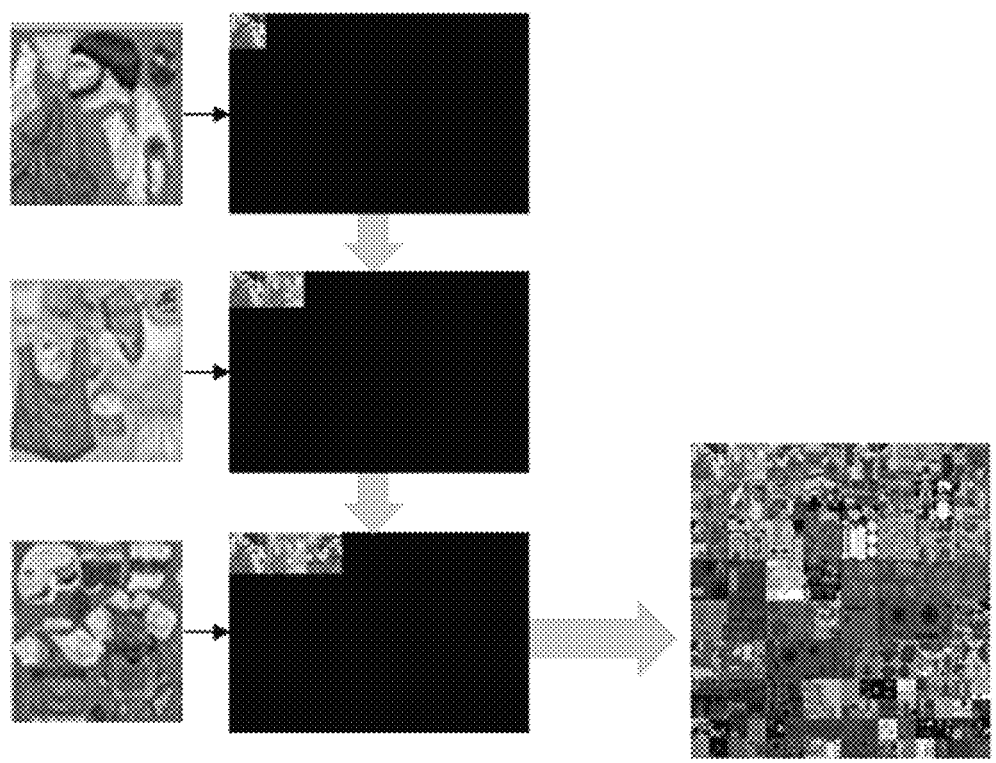
FIG. 31 is an example of generating texture atlas.

FIG. 31 shows an example of generating a texture atlas.

The above-described process can be illustrated as in FIG. 31. That is, an overlay media is added to an available space to generate one image, and this process is repeated so that multiple overlay medias can be included in one image. Here, the available space may refer to a space where any overlay media is not included in one image.

In the case of performing packing as described above, it is possible to reduce the number of decoders in a receiver and to improve performance due to proximity to a memory reference upon rendering. In addition, according to performance of the receiver, a size of a sub-texture to be included in a texture atlas may be adjusted. In addition, in order to prevent negative factors possibly occurring in mipmapping and texture compression processes, a guard band may be constructed between textures. Here, the guard band may specify the number of surrounding empty pixels by leaving some surrounding pixels empty when packing each overlay media.

Figure 32:
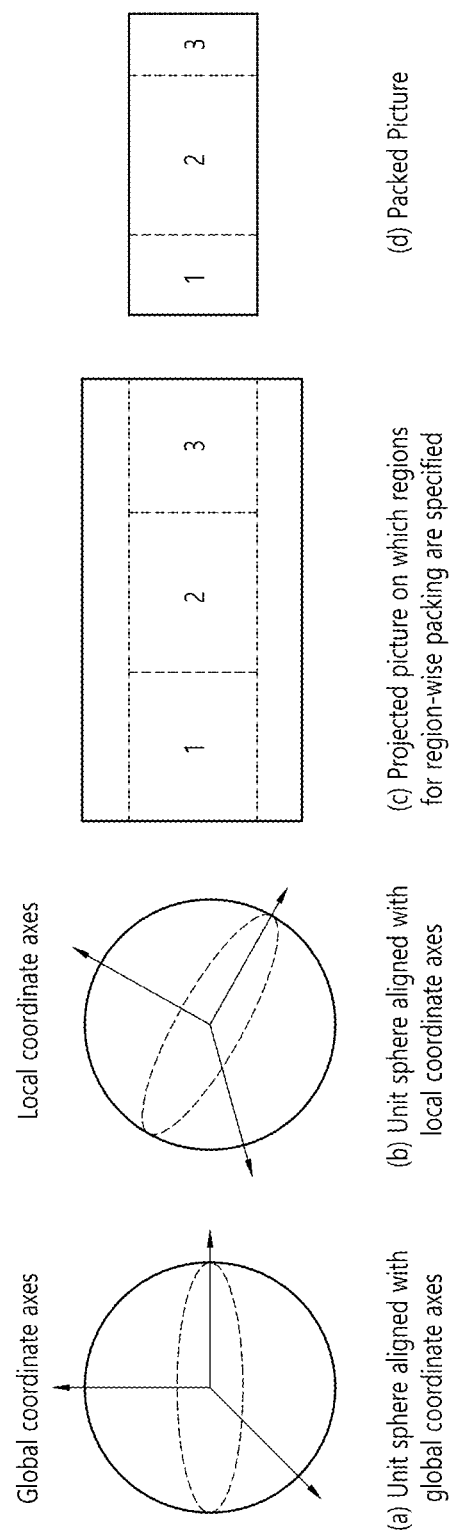
FIG. 32 is a diagram for explaining region-wise packing of a VR media.

FIG. 32 is a diagram for explaining region-wise packing of a VR media.

In an embodiment, a region-wise packing method may be applied for overlay media packing. The region-wise packing method may divide the entire area of a projected picture, which is a VR media (or 360 media) with projection applied, into regions and pack the respective regions with different resolutions according to significance. Here, the significance may be, for example, determined according to a user's viewport region. That is, referring to FIG. 32, a packed picture d may be generated by packing regions 1, 2, and 3 in a projected picture c.

Region-wise packing for an overlay may be a method of configuring an overlay media according to a result pre-rendered or projected by a transmitter. In other words, an overlay media may be reconfigured in a form in which a rendering location, a size, and projection are applied. This method may be referred to as a burn-in method. This burn-in method has a drawback in that flexibility can be deteriorated, but has an advantage in that a renderer of a receiver can be simplified.

In an embodiment, a 360 overlay media in the same form of a 360 media projected at all 360 degrees may be generated, and region-wise packing may be performed on an overlay media result according to significance of a region or according to the presence of a media.

Here, the form of the projected overlay media may not be necessarily rectangular, and a packed location value may be specified in consideration of the form of the projected overlay. Regarding this, the following two methods may be supported in an embodiment.

Firstly, the smallest 2D bounding box surrounding a projected overlay media may be set as an overlay media region, and a location in a projected picture (a location and a size to be rendered) may be adjusted again. That is, a location in the projected picture may be adjusted again in consideration of the location and size to be rendered. Secondly, a polygonal shape may be represented. In this case, a region may be horizontally/vertically divided, and information on each location point may be specified.

Figure 33:
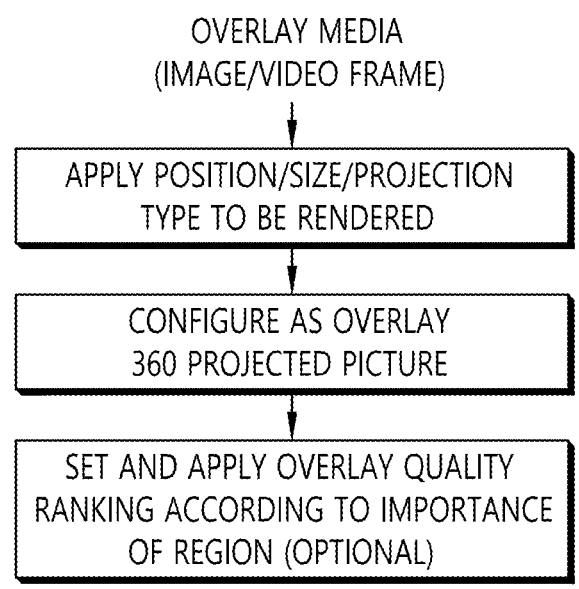
FIG. 33 is an example of a flowchart of a region-wise packing method of an overlay media.

FIG. 33 is an example showing a flowchart of a method of region-wise packing for an overlay media.

Referring to FIG. 33, a region-wise packing method for an overlay media may be, when overlay medias (images/video frames) exist, applying a rendering location/size/projection type thereto to be thereby configured as an overlay 360 projected picture. Thereafter, overlay quality raking may be optionally set and applied according to significance of each region.

Figure 34:
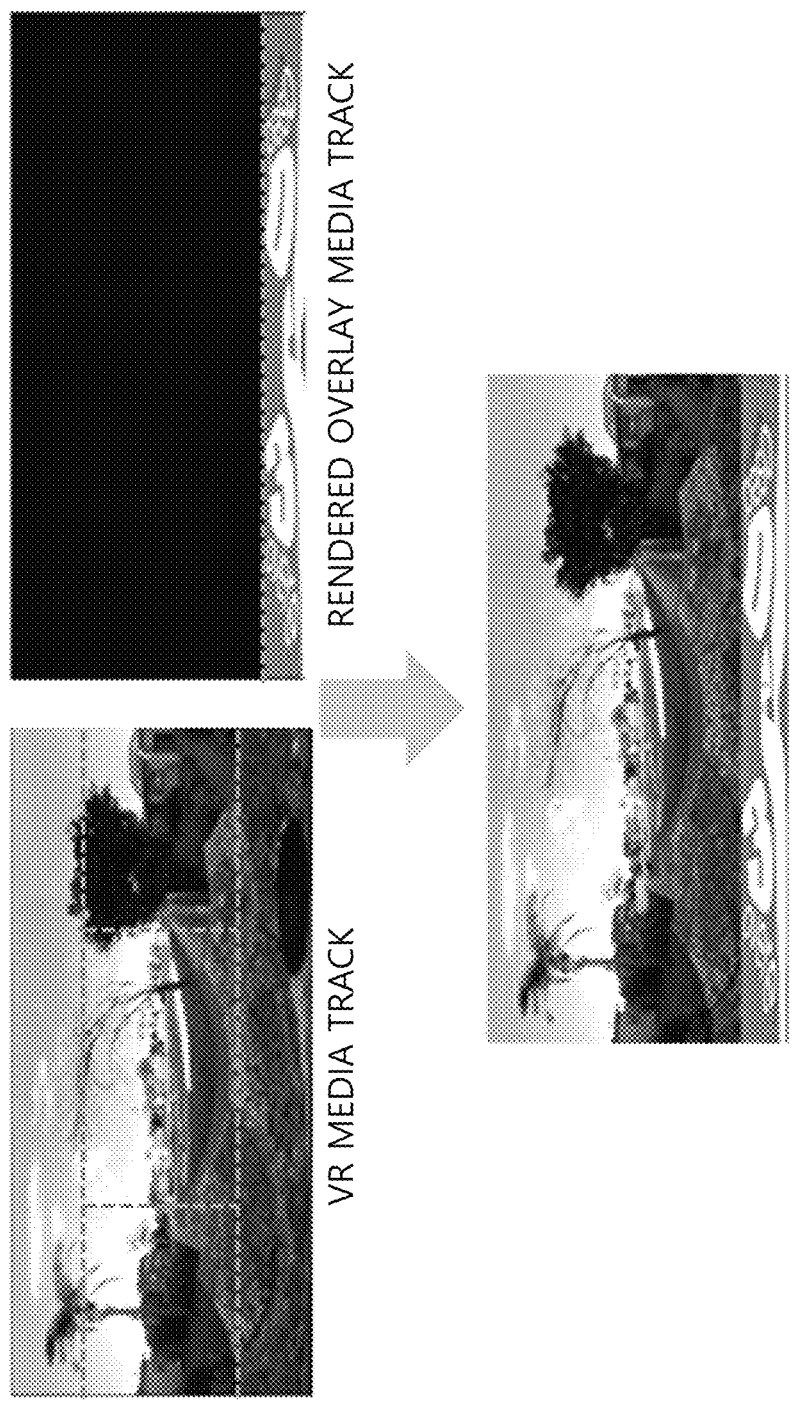
FIG. 34 is an example of region-wise packing of an overlay media.

FIG. 34 is an example of region-wise packing for an overlay media.

The above-described process may be represented as in FIG. 34. That is, a rendered overlay media track, which is an overlay 360 projected picture, may be generated by applying a rendering location/size/projection type to overlay medias and may be packed together with a VR media track.

Figure 35:
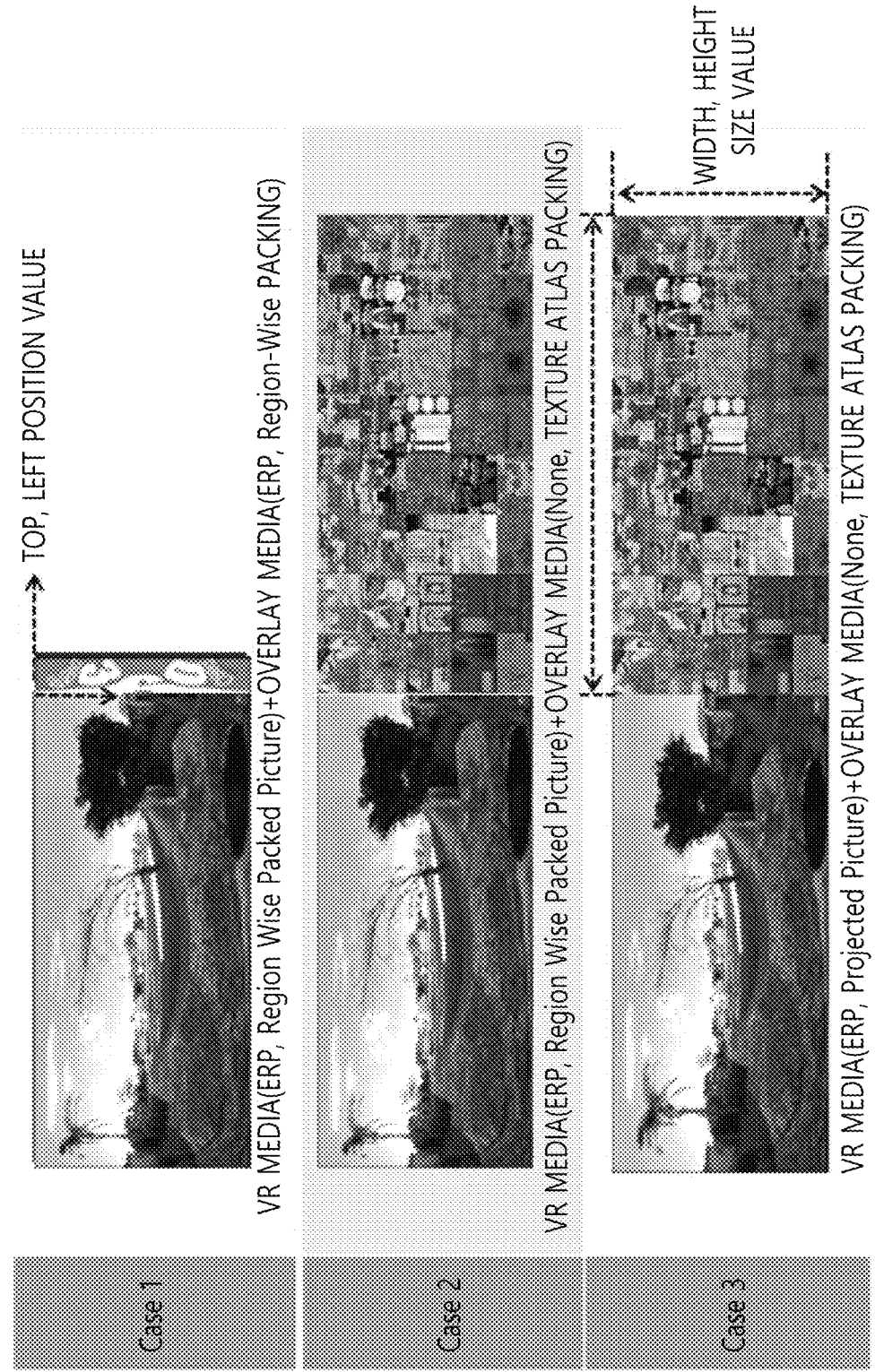
FIG. 35 is an example showing a configuration of overlay media packing of File #2.

FIG. 35 is an example showing configurations of overlay media packing in the case of File #2.

In the case of File #2, multiple overlay medias in a VR media track may be packed as in three cases as shown in FIG. 35. The first case (Case 1) may be a case where a VR media has a projection scheme of ERP and is a region-wise packed picture, while an overlay media has a projection scheme of ERP and region-wise packed. A second case (Case 2) may be a case where a VR media has a projection scheme of ERP and is a region-wise packed picture while an overlay media is not projected (None) and is texture-atlas packed. A third case (Case 3) may be a case where a VR media has a projection scheme of ERP and is a projected picture while an overlay media is not projected and is texture-atlas packed.

That is, a VR media and overlay medias may exist at the same time in a packed picture or projected picture of a VR media track. In this case, information about a region containing the overlay medias in the entire picture may be specified. The information about the region may include at least one of a left point location value, a top point location value, a width value, or a height value.

Figure 36:
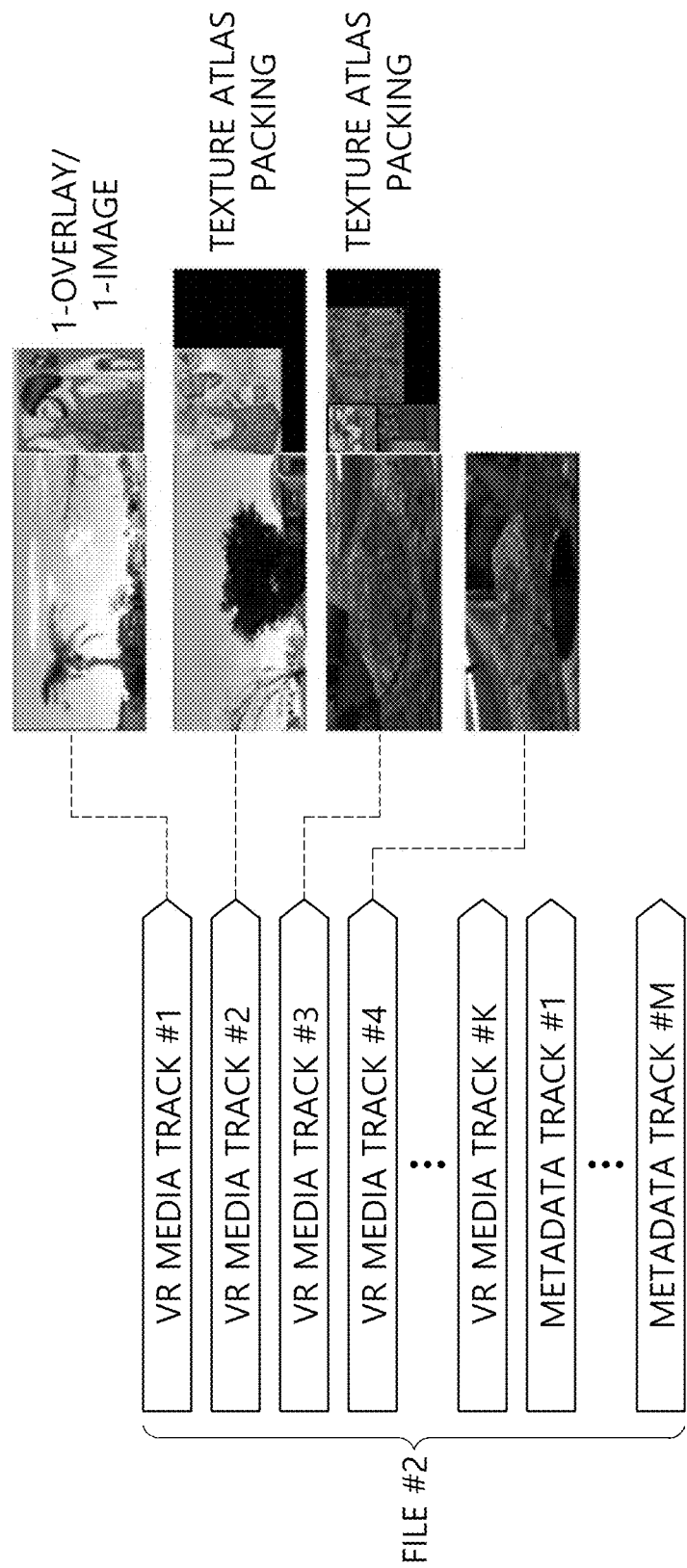
FIG. 36 is an example in which a VR media track is packed together with a part of a VR media as an overlay media.

FIG. 36 is an example in which a VR media track is packed with a part of a VR media as an overlay media in File #2.

In an embodiment, in the case where a VR media may be divided and stored in tracks and overlay medias are stored in respective VR media tracks, each overlay media may be packed in a corresponding VR media track according to a location at which an overlay is to be displayed. That is, it may correspond to a case where an overlay is packed together in a VR media track to be displayed, to which the overlay belongs. Alternatively, it may correspond to a case where an overlay is packed together in a VR media track to be displayed.

Referring to FIG. 36, a VR media track may include a part of a VR media and an overlay media. Alternatively, each overlay media may be packed together with a part of entire VR medias, which is to be displayed. Here, a different packing method may be applied to each track. For example, one overlay may be included and packed in one image in the case of VR media track #1, and at least one overlay may be packed by a texture atlas packing method in the case of VR media track #2 and #3.

Figure 37:
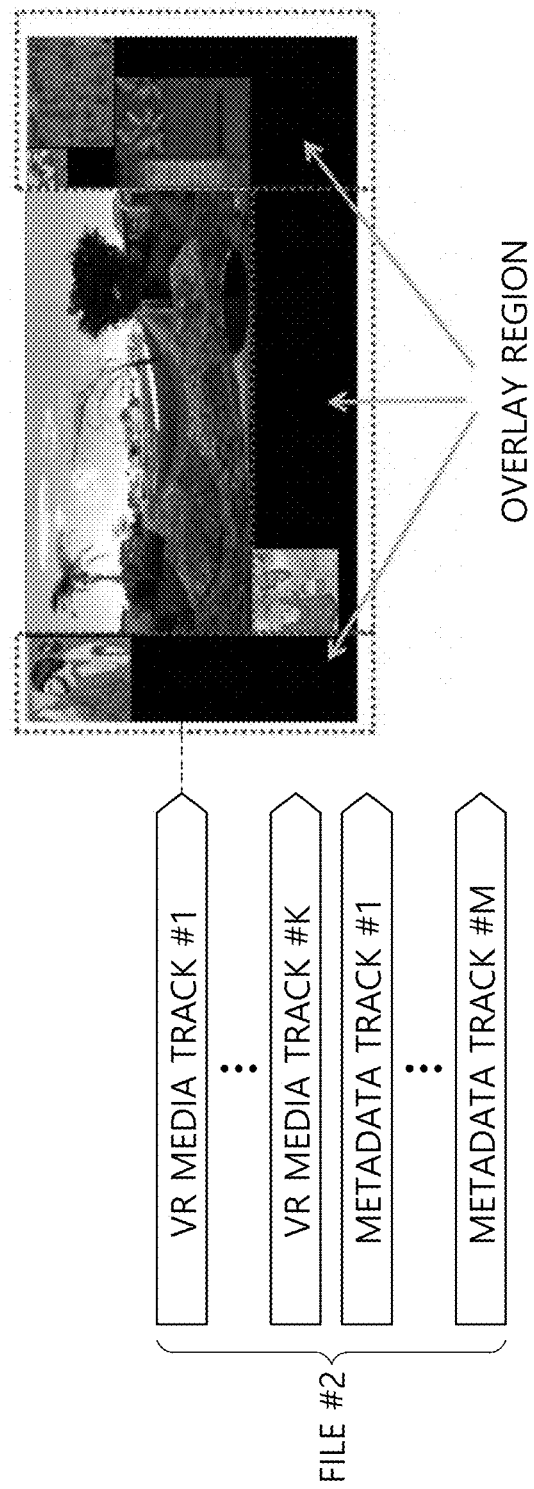
FIG. 37 is an example in which a VR media track is packed with a VR media as an overlay in the case of File #2.

FIG. 37 is an example in which a VR media track is packed with a VR media as an overlay media in the case of File #2.

In an embodiment, in the case where an overlay is packed together in a VR media track, the overlay may be configured as shown in FIG. 37. Here, a region where an overlay media is stored is not necessary on the right side of a VR media but may be at any of various locations, as shown in FIG. 37. For example, the region where the overlay media is stored may exist on the right side, on the left side, and below the VR media. However, these locations may be specified.

Figure 38:
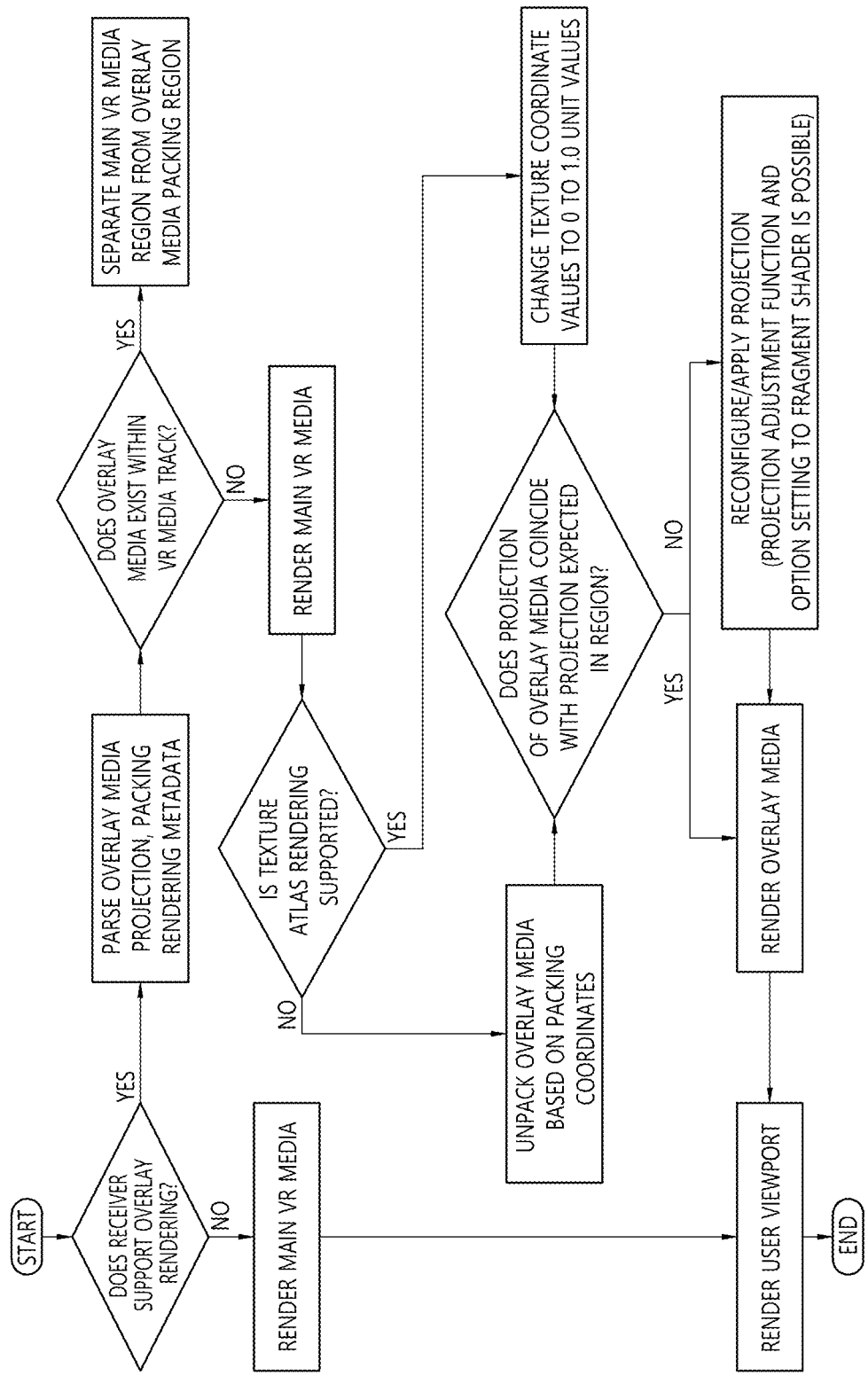
FIG. 38 is an example of a flowchart for explaining an overlay projection supporting method.

FIG. 38 is an example of a flowchart for explaining an overlay projection supporting method.

In an embodiment, an overlay media track may include projection information that has been applied to each overlay. In addition, in a case where multiple overlays are packed in the overlay media track, projection information about each overlay may be specified. Here, projection applicable to an overlay may be one of None, EquiRectangular Projection (ERP), and CubeMap Projection (CMP). However, CMP may be supported only when region-wise packing is applied, and CMP and None may be applied in other cases.

In addition, overlay media projection information and region information specified by metadata may not match each other. For example, although an overlay media is ERP-projected, if a rendering location is set to render the corresponding overlay media on a viewport, a receiver may perform rendering by unprojecting the ERP-projected overlay media.

Referring to FIG. 38, an embodiment may determine whether a receiver supports overlay rendering and, if the receiver does not support overlay rendering, may render a main VR media and render a user viewport.

However, if the receiver supports overlay rendering, metadata related to projection, packing, and rendering of an overlay media may be parsed and whether the overlay media exists in a VR media track may be determined. Here, if the overlay media exists in the VR media track, a region of a main VR media and a packing region of an overlay media may be separated and the main VR media may be rendered. However, if the overlay media does not exist in the VR media track, the main VR media may be rendered with the separation process omitted.

Thereafter, an embodiment may determine whether texture atlas rendering is supported. Here, if the texture atlas rendering is supported, texture coordinate values may be changed to a unit value of 0 to 10, and, if the texture atlas rendering is not supported, an overlay media content may be unpacked based on packing coordinates.

An embodiment may determine whether projection of an overlay media and projection expected upon rendering in a region match each other. Here, if the two projections match, the overlay media may be rendered, and if the two projections do not match, the overlay media may be rendered after performing projection reconfiguration and application. Here, at a time of projection reconfiguration and application, a projection adjustment function and option setting may be allowed for a fragment shader. Thereafter, a user viewport may be rendered.

In an embodiment, overlay media packing and projection information may be referred to as overlay media packing and projection related information and may be signaled as metadata and therefore referred to as metadata. Alternatively, the overlay media packing and projection information may be included in OverlayMediaPackingStruct within metadata, Here, a structure of the overlay media packing and projection information may be referred to as metadata structure. OverlayMediaPackingStruct may include, for example, the following in Table 3.

TABLE 3

```
aligned(8) class OverlayMediaPackingStruct( ) {
    unsigned int(16) num_overlays;
    unsigned int(5) num_regions;
    for(i = 0; i < num_regions; i++) {
        unsigne int(8) overlay_region_id[i];
        unsigned int(16) overlay_region_width[i];
        unsigned int(16) overlay_region_height[i];
        unsigned int(16) overlay_region_top[i];
        unsigned int(16) overlay_region_left[i];
    }
    for (i = 0; i < num_overlays; i++) {
        unsigned int(16) overlay_source_id[i];
        unsigned int(5) projection_type[i];
        unsigned int(3) packing_type;
        unsigned int(8) overlay_region_id[i];
        if(packing_type != 0) {
            unsigned int(1) guard_band_flag[i];
            if (packing_type == 1)
                TextureAtlasPacking(i);
            else if (packing_type == 2)
                RectRegionPacking(i);
            else if (packing_type == 3)
                PolygonRegionPacking(i);
            if (guard_band_flag[i])
                GaurdBand(i);
        }
    }
}
```

In Table 3, a num_overlays field may indicate the number of overlays included or packed in an overlay media, and a packing type field may indicate an overlay media packing type. Here, the packing_type field having a value of 0 may indicate that integrated packing is not applied (none), the packing_type field having a value of 1 may indicate that texture atlas packing is applied, the packing_type field having a value of 2 may indicate that rectangular region-wise packing is applied, and the packing type field having a value of 3 may indicate that polygonal region-wise packing is applied.

In addition, the num_regions may indicate the number of regions in which overlays are packed, and an overlay_region_id field may indicate identifier of a packing region. In addition, a overlay_region_width field, an overlay_region_height field, an overlay_region_left field, and an overlay_region_top field may indicate size and location information of a packing region. That is, The respective fields may indicate a width value, a height value, a left point location value, and a top point location value of a packing region.

In addition, anoverlay_source_id field may indicate identifier of a corresponding overlay media, and a projection_type field may indicate a projection type applied to the corresponding overlay media. Here, the projection_type field having a value of 0 may indicate that projection is not applied (none), the projection_type field having a value of 1 may indicate that Equirectangular projection (ERP) is applied, and the projection_type field may indicate that Cubemap projection (CMP) is applied.

In Table 3, an overlay_region_id field in the second for phrase may indicate identifier of a packing region, as the same as described above, but may be used to specify which overlay packing region an overlay media is stored in.

In addition, a guard_band_flag field may indicate whether a sub texture guard band exists when packing is applied.

In Table 3, TextureAtlasPacking may include information or metadata related totexture atlas packing and may be included when the packing_type field has a value of 1 (packing_type==1). TextureAtlasPacking may include the following as in Table 4.

TABLE 4

```
aligned(8) class TextureAtlasPacking(i) {
    unsigned int(16) width[i];
    unsigned int(16) height[i];
    unsigned int(16) top[i];
    unsigned int(16) left[i];
    unsigned int(3) transform_type[i];
    bit(5) reserved = 0;
}
```

In Table 4, a width field, a height field, the top field and a left field may indicate location and size information in texture atlas. Alternatively, the respective fields may indicate location and size information of an overlay media in texture atlas. That is, the respective fields may indicate a width value, a height value, a top point location value, and a left point location value of an overlay media in atlas.

In addition, a transform_type field may indicate a rotation value in texture atlas. Alternativelyl, the transform_type field may indicate a rotation value in an overlay media. Here, the transform_type field having a value of 0 may indicate no rotation, the transform_type field having a value of 1 may indicate mirroring horizontally, the transform_type field having a value of 2 may indicate rotation by 180 degrees, the transform_type field having a value of 3 may indicate rotation by 180 degrees and mirroring horizontally, the transform_type field having a value of 4 may indicate rotation by 90 degrees and mirroring horizontally, the transform_type field having a value of 5 may indicate rotation by 90 degrees, the transform_type field having a value of 6 may indicate rotation by 270 degrees and mirroring horizontally, and the transform_type field having a value of 7 may indicate rotation by 270 degrees. Here, the rotation may be in a colockwise direction or in a counter-clockwise direction.

In the above-described Table 3, RectRegionPacking may include information or metadata related to rectangular region-wise packing and may be included when the packing_type field has a value of 2 (packing_type=2). RectRegionPacking may include the following as in Table 5.

TABLE 5

```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

In Table 5, a proj_reg_width field, a proj_reg_height field, a proj_reg_top field, and a proj_reg_left field may indicate location and size information in a projected picture. That is, the respective fields may indicate a width value, a height value, a top point location value, and a left point location alue of an overlay media in a projected picture. The transform_type field may indicate a rotation alue in a projected picture and, what the transform_type field indicates according to a value thereof may be identical to or different from what is shown in Table 4.

In addition, a packed_reg_width field, a packed_reg_height field, a packed_reg_top field, and a packed_reg_left field may indicate location and size information in a packed picture. That is, the respective fields may indicate a width value, a height value, a top point location value, and a left point location value of an overlay media in a packed picture.

In the above-described Table 3, PolygonRegionPacking may include information or metadata related to pologonal region-wise packing and may be included when the packing_type field has a value of 3 (packing_type=3). An embodiment may specify a polygonal packing region when a projected overlay is not in a rectangular form.

TABLE 6

```
aligned(8) class PolygonRegionPacking(i) {
    unsigned int(8) num_rings;
    unsigned int(8) num_sectors;
    for (i = 0; i < num_rings; i++) {
        for (j =0; j < num_sectors; j++) {
            unsigned int(16) proj_points_x[i][j];
            unsigned int(16) proj_points_y[i][j];
        }
    }
    unsigned int(3) transform_type[i];
    bit(5) reserved = 0;
    for (i = 0; i < num_rings; i++) {
        for (j =0; j < num_sectors; j++) {
            unsigned int(16) packed_points_x[i][j];
            unsigned int(16) packed_points_y[i][j];
        }
    }
}
```

In Table 6, a num_rings field may indicate the number of regions horizontally divided from a projected picture, and anum_sectors field may indicate the number of regions vertically divided from the projected picture. A proj_points_x field and a proj_points_y field may indicate location values of each division point in the projected picture. That is, the respective fields may indicate a location vakue of an X-axis point (or an X-axis coordinate) and a location value of a Y-axis point (or a Y-axis coordinate) of each division point in the projected picture. In addition, a transform_type field may indicate a rotation value in the projected picture, and, what the transform_type field indicates according to a value thereof may be identical to or different from what is shown in Table 4.

A packed_points_x field and a packed_points_y field may indicate location values of each division point in a packed picture. That is, the respective fields may indicate a location vakue of an X-axis point (or an X-axis coordinate) and a location value of a Y-axis point (or a Y-axis coordinate) of each division point in the packed picture.

An embodiment may generate an overlay surface on a sphere, and, in this case, a surface mesh may be generated in consideration of the number of divisions of a horizontal region and the number of division of a vertical region.

In the above-described Table 3, GuardBand may include information or metadata related to a guardband and may be included when a guard_band_flag field has a value of 1 (guard_band_flag=1). GuardBand may include the following as in Table 7.

TABLE 7

```
aligned(8) class GuardBand(i) {
    unsigned int(8) left_gb_width[i];
    unsigned int(8) right_gb_width[i];
    unsigned int(8) top_gb_height[i];
    unsigned int(8) bottom_gb_height[i];
}
```

In Table 7, a left_gb_width field, and a right_gb_width field, a top_gb_height field, and a bottom_gb_height field may indicate information on left, right, top, and bottom gaps for setting a guard band around overlay texture. That is, the respective fields may indicate a width value of a left gap of the overlay texture, a width value of a right gap of the overlay texture, a height value of a top gap of the overlay texture, and a height value of a bottom gap of the overlay texture.

Figure 39:
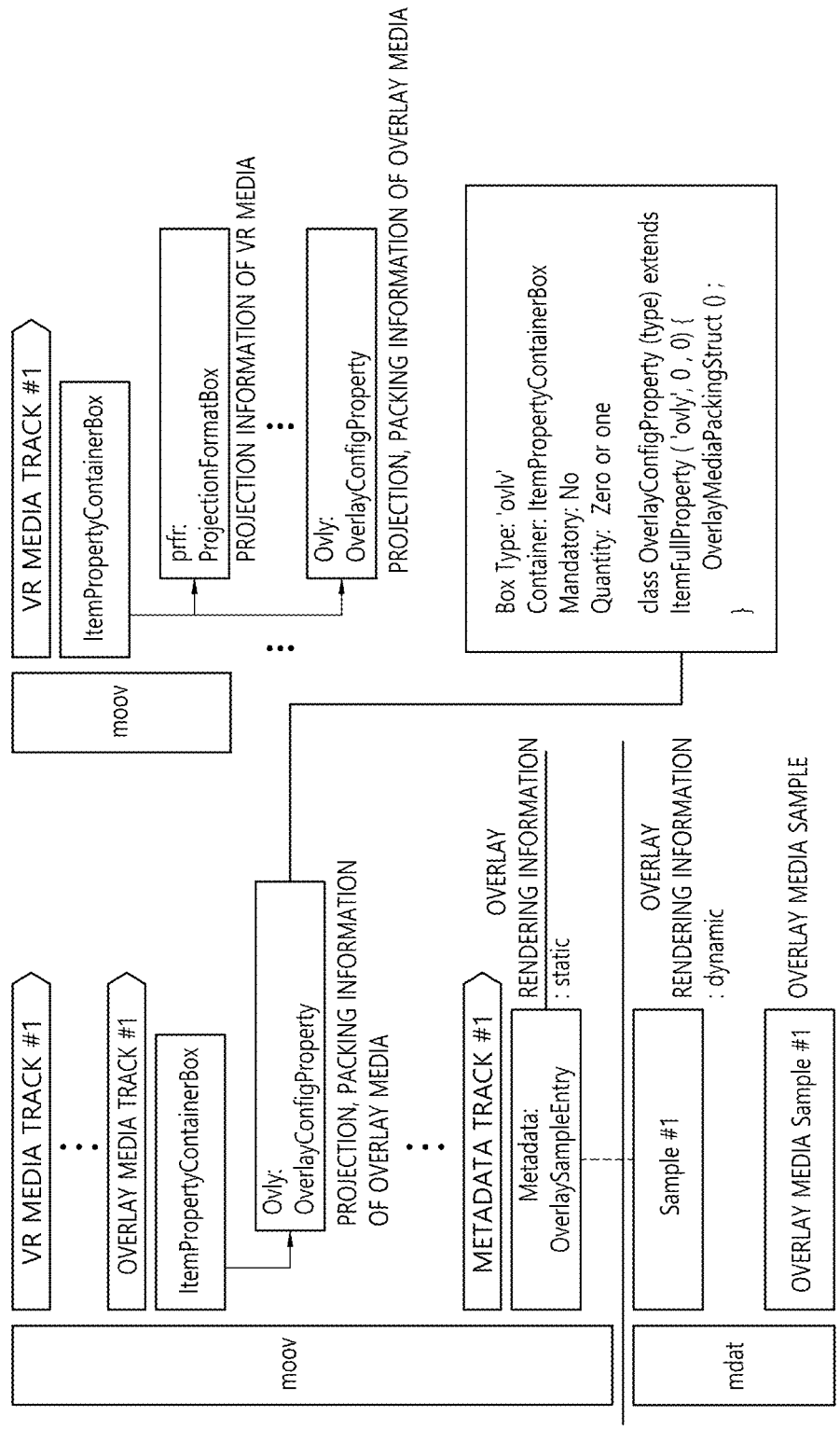
FIG. 39 shows an example of overlay media packing and projection related metadata signaling.

FIG. 39 shows an example of overlay media packing and projection related metadata signaling FIG. 39 may show a case where an overlay media track is an image. Referring to FIG. 39, in an embodiment, in the case of File #1 and in the case where an overlay media track is an image, an overlay media track in the moov box may include an ItemPropertyContainerBox and the ItemPropertyContainerBox may include OverlayConfigProperty. Here, the OverlayConfigProperty may include projection and packing information of the overlay media. Alternatively, OverlayMediaPackingStruct( ) including the projection and packing information of the overlay media may be included. Here, the OverlayMediaPackingStruct( ) may be the same as shown in Table 3.

In the case of File #2 and in the case where a VR media track is an image, the VR media trak may include an ItemPropertyContainerBox, and the ItemPropertyContainerBox may include OverlayConfigProperty. Here, the ItemPropertyContainerBox may include a ProjectionFormatBox and the like. The OverlayConfigProperty may include projection and packing information of an overlay media. Alternatively, OverlayMediaPackingStruct( ) including the projection and packing information of the overlay media may be included. Here, the OverlayMediaPackingStruct( ) may be the same as shown in Table 3.

The above-described OverlayConfigProperty may have properties shown in Table 39 and may include, for example, the following as in Table 8.

TABLE 8

```
class OverlayConfigProperty (type) extends ItemFullProperty ('ovly',
0, 0) {
    OverlayMediaPackingStruct( );
}
```

That is, a box type of the OverlayConfigProperty may be ovly, a container of the OverlayConfigProperty may be the ItempropertycontainerBox and may not be mandatory (No,), and a quantity of the OverlayConfigProperty may be 0 or 1. In addition, the OverlayMediaPackingStruct( ) may include the projection and packing information of the overlay media and may be the same as shown in Table 3.

Figure 40:
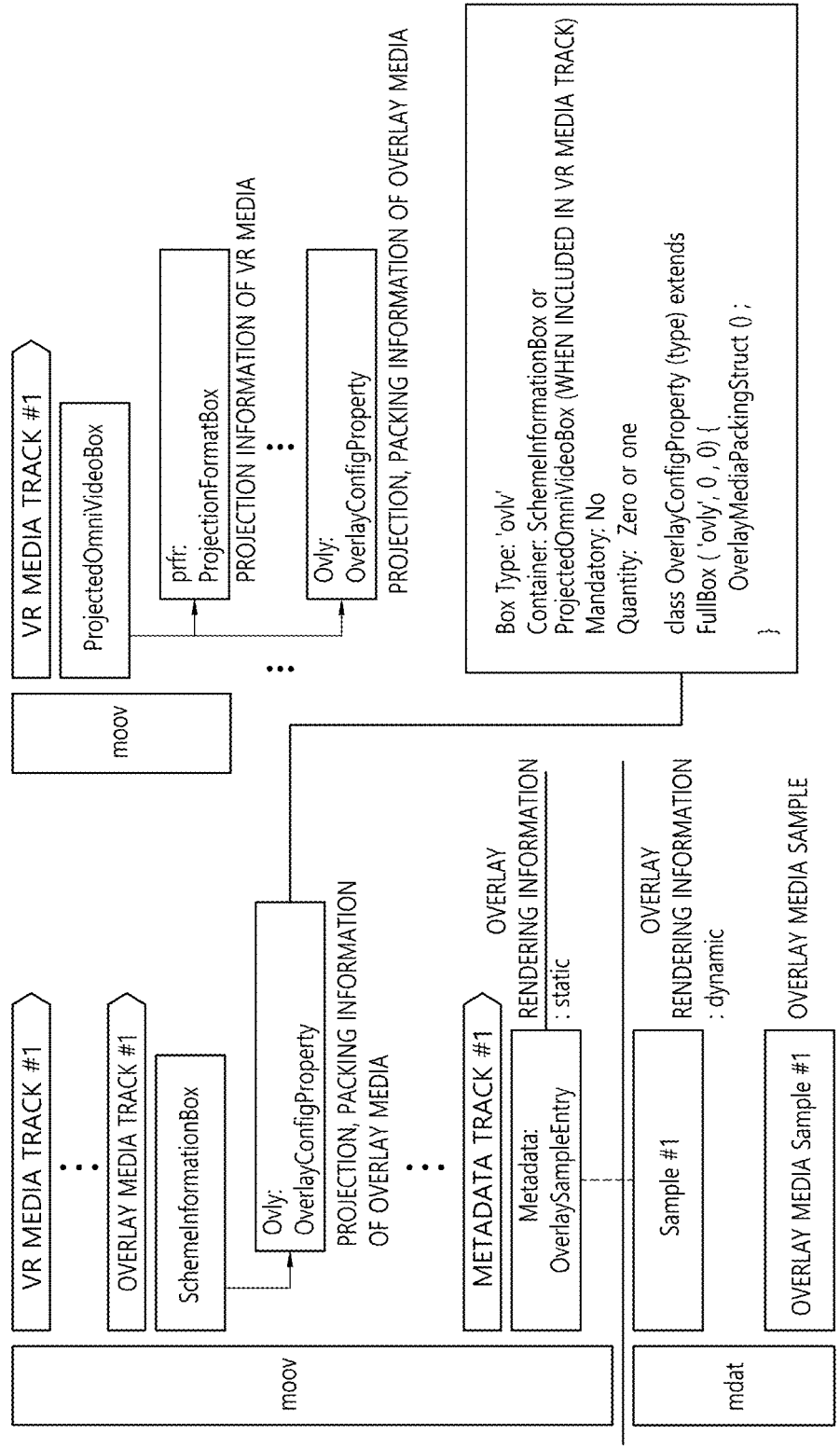
FIG. 40 shows another example of overlay media packing and projection related metadata signaling.

FIG. 40 shows another example of overlay media packing and projection related metadata signaling.

FIG. 40 may show a case where an overlay media track is a video. Referring to FIG. 40, in an embodiment, in the case of File #1 and in the case where an overlay media track is a video, the overlay media track may include a SchemeInformationBox, and the SchemeInformationBox may include an OverlayConfigBox. Here, the OverlayConfigBox may include projection and packing information of the overlay media. Alternatively, OverlayMediaPackingStruct( ) including the projection and packing information of the overlay media may be included.

In the case of File #2 and in the case where a VR media track is a video, the VR media track may include a ProjectedOmniVideoBox, and the ProjectedOmniVideoBox may include an OverlayConfigBox. Here, the OverlayConfigBox may include projection and packing information of an overlay media. Alternatively, OverlayMediaPackingStruct( ) including the projection and packing information of the overlay media may be included.

The above-described OverlayConfigProperty may have properties shown in Table 40 and may include, for example, the following as in Table 9.

TABLE 9

```
class OverlayConfigProperty (type) extends ItemFullProperty ('ovly',
0, 0) {
    OverlayMediaPackingStruct( );
}
```

That is, a box type of the OverlayConfigProperty may be ovly, a container of the OverlayConfigProperty may be a SchemeInformationBox or, when the VR media track is included, a ProjectedOmniVideoBox and may not be mandatory (No,), and a quantity of the OverlayConfigProperty may be 0 or 1. In addition, the OverlayMediaPackingStruct( ) may include the projection and packing information of the overlay media and may be the same as shown in Table 3.

Hereinafter, a method for grouping and/or linking a main VR media track and an overlay media track may be proposed in an embodiment of the present invention.

Figure 41A:
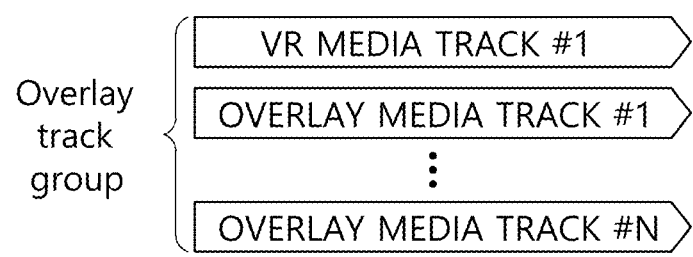
FIG. 41A and FIG. 41B shows an example of grouping and linking of a VR media track and an overlay media track.
Figure 41B:
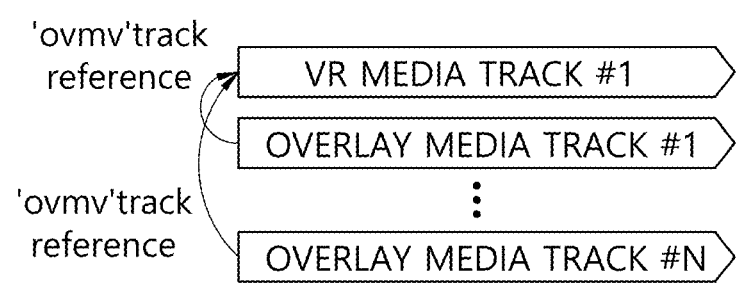

FIG. 41A and FIG. 41B show an example of grouping and linking of a VR media track and an overlay media track.

Referring to FIG. 41A, just like File #1 according to an embodiment, in a case where a main VR media and an overlay media are included in separate tracks, a TrackGroupTypeBox of which a track_group_type field has a value of "ovgr" may indicate a track group including the main VR media and the overlay media. This may indicate a track group that can be rendered with an overlay and the like in a 360 scene. That is, this may indicate that tracks having the same value in a track_group_id field may be rendered with an overlay and the like in a 360 scene. Thus, in doing so, a player is capable of conveniently retrieving the main media and the overlay media.

Referring to FIG. 41A, VR media track #1 and overlay media tracks #1 to #N may belong to an overlay track group, and these tracks may have the same value of the track_group_id field and may be rendered together.

Here, a TrackGroupTypeBox of which the track_group_type field has a value of "ovgr" may include an OverlayVideoGroupBox, and the OverlayVideoGroupBox may include, for example, the following as in Table 10.

TABLE 10

```
aligned(8) class OverlayVideoGroupBox extends
TrackGroupTypeBox( 'ovgr ') {
    unsigned int(5) media_type;
    unsigned int(1) main_media_flag;
    unsigned int(1) overlay_media_flag;
    if ((media_type == 1 )|| (overlay_media_flag)){
        unsigned int(1) overlay_essential_flag;
    }
    bit(1) reserved = 0;
}
```

In Table 10, a media_type field may indicate a media type in a track group. For example, the media_type field having a value of 0 may indicate a main media, and the media_type field having a value of 2 may indicate an overlay media. In addition, a main_media_flag field may be a flag indicative of whether or not a corresponding media is a main media, and an overlay_media_flag field may be a flag indicative of whether or not a corresponding media is an overlay media. An overlay_essential_flag field may be a flag indicative of whether or not an overlay media is mandatory to be overlaid. Here, if the overlay media is mandatory to be overlaid, a player not supporting overlay may not reproduce the main media in the same group.

Referring to FIG. 41B, in an embodiment, if a main VR media and an overlay media are included in a file as separate tracks, the main VR media to be overlaid by the overlay media may be indicated using a TrackReferenceTypeBox of the overlay media track. To this end, as a new reference type is added, that is, as a reference_type field has a value of "ovmv" and one or main VR media track IDs or one or more track group IDs are indicated in a track_IDs field (in the case where the main VR media is delivered through one or more tracks), it is possible to indicate the main media which is a target to be overlaid by the overlay media. In other words, tracks indicated through "ovmv" and the track_IDs field may be tracks of a main media which is currently overlaied by an overlay media.

Referring to FIG. 41B, overlay media tracks #1 to #N may indicate VR media track #1 to be overlaied, based on 'ovmv' track reference.

A TrackReferenceBox and a TrackReferenceTypeBox may include, for example, the following as in Table 11.

TABLE 11

```
aligned(8) class TrackReferenceBox extends Box( 'tref' ) {
}
aligned(8) class TrackReferenceTypeBox (unsigned int(32)
```

TABLE 11-continued

```
reference_type)
    extends Box {
        unsigned int(32) track_IDs[ ];
}
```

In Table 11, a track_ID field may be an integer that provides reference from a containing track to another track in the presentation, and the track IDs field cannot be reused and may not have a value of 0. In addition, the reference_type field may be indicated or specified as described above and may be set to one of the following values.

In File #2 according to an embodiment, in the case where a main VR media and an overlay media are included in the same track, the corresponding track may include a SampleToGroupBox of which a grouping_type field has a value "ovmv". The SampleToGroupBox may indicate samples that need to be rendered (including overlay) among samples included in the corresponding track. In the case where the SampleToGroupBox with the grouping_type field having a value of "ovmv" exists in the corresponding track, a SampleGroupDescriptionBox with the grouping_type field having a value of "ovmv" may exist. This may include information commonly applied to samples to be rendered (overlaied). Alternatively, OverlayEntry may be included. The OverlayEntry may indicate a sample group entry of which the grouping_type field having a value of "ovmv", and the OverlayEntry may include, formexample, the following as in Table 12.

TABLE 12

```
class OverlayEntry( ) extends SampleGroupDescriptionEntry(' ovmv' ) {
    unsigned int(32) overlay_essential_flag;
}
```

In Table 12, anoverlay_essential_flag field may be a flag indicative of whether an overlay media is mandatory to be overlaid. Here, if the overlay is mandatory to be overlaid, a player not supporting overlay may not reproduce the main media in the same group.

In an embodiment, a VR media and an overlay media may be included in one sample. In this case, one sample may be divided into sub-samples, and each sub-sample may include a VR media or an overlay media. In addition, a box including sub-sample related information may include an indicator as to whether a corresponding sub-sample includes an overlay media or a main VR media, a flag indicative of whether an overlay media is mandatory to be overlaid, etc.

Figure 42:
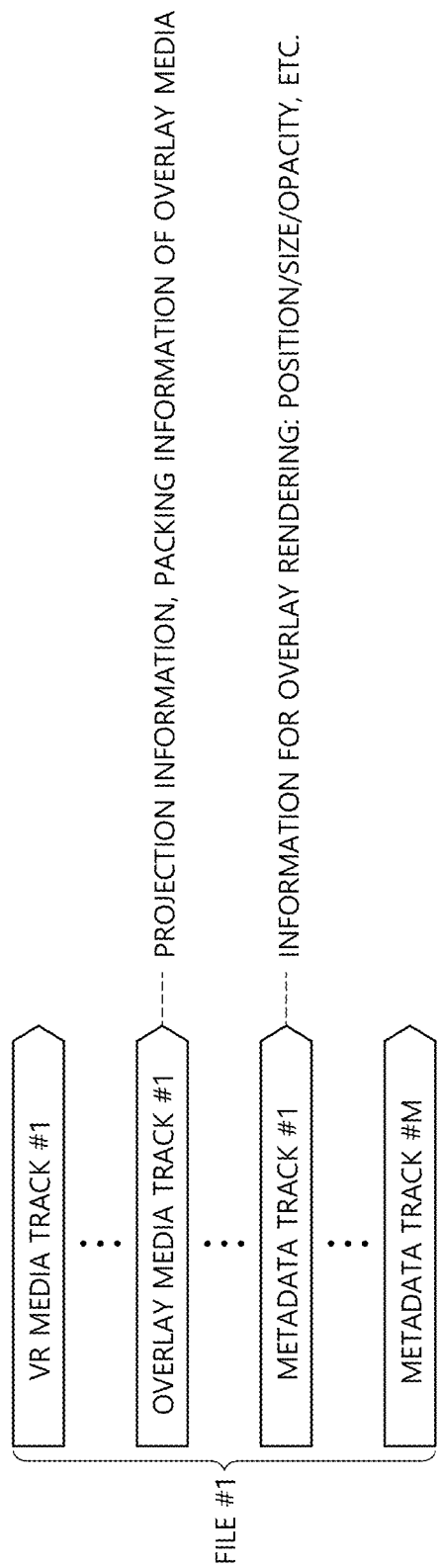
FIG. 42 is an example of an overlay metadata track in File #1.

FIG. 42 is am example of an overly metadata track in File #1.

In an embodiment, an overlay metadata track may include overlay location, size, and property related information (opacity, interaction, etc.) for overlay rendering. Rendering metadata of an overlay may change over time. Thus, the rendering metadata of an overlay may be stored as time metadata. That is, an overlay may change in size or location over time, and metadata changeable over time may be referred to as rendering metadata of the overlay or may be stored as time metadata. That is, metadata changeable over time may be stored in a sample but static metadata unchangeable over time may be stored in a sample entry.

Figure 43A:
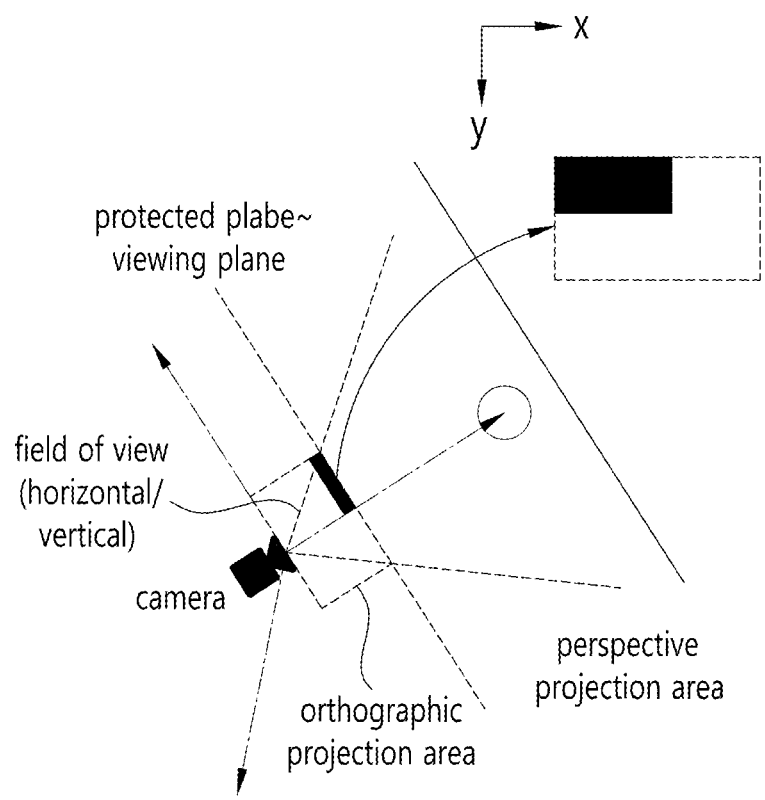
FIGS. 43A, 43B, and 43C are examples showing a location where to place an overlay.
Figure 43B:
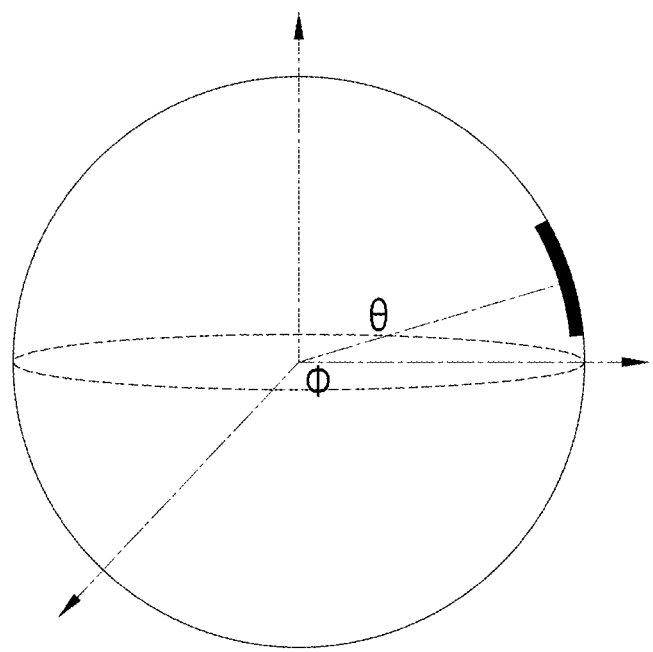
Figure 43C:
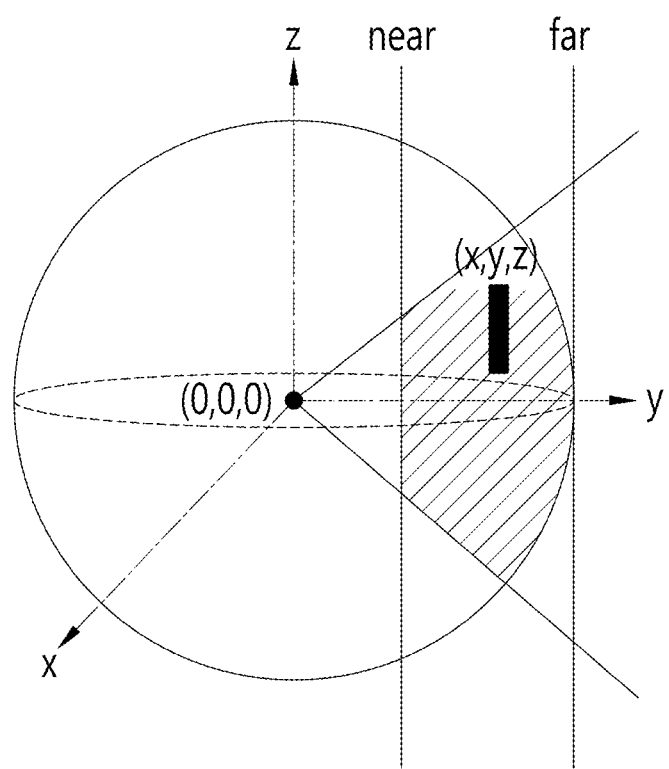

FIGS. 43A, 43B, and 43C are examples of a location at which an overlay is to be placed.

In an embodiment, an overlay rendering location may be classified into three cases according to a location at which an overlay is to be placed.

Referring to FIG. 43A, a first case may be a case where an overlay is located at a user's current viewport. In this case, location and size information to be drawn on the viewport may be specified as a percentage to a display size. In addition, in order to consider a case where overlays overlap each other, a drawing order may be specified. Here, the location and size information may include X-axis point location information (or location information of a left point), Y-axis point location information (or location information of a top point), width information, and height information.

Referring to FIG. 43B, a second case (Case 2) may be a case where an overlay is located on a sphere. In this case, a central point may be specified on the basis of elevation information, and size of an overlay may be specified by setting an azimuth range and an elevation range. However, only a rotation about a vector from a central point of an overlay to the origin of a sphere may be supported. Alternatively, it may be defined as information or representation of a location within projection of region-wise packing that takes projection into account. Here, the overlay is located on the sphere, and a player may process the overlay as a curved surface or a rectangular surface.

Referring to FIG. 43C, a third case (Case 3) may be a case where an overlay exists inside a sphere. In this case, the overlay may exist in a near plane or inside the sphere, and the plane may be assumed to be in a rectangular shape and a size of the place may be specified through width information and height information of points of a plane based on the Y-axis and the Z-axis. In addition, after the size of the plane is determined, the overlay may be moved based on X-axis reference location information, Y-axis reference location information, and Z-axis reference location information in a sphere coordinate system. Alternatively, the overlay may be moved to (x, y, z) coordinates in the sphere coordinate system. Here, rotation centered on a central point of an overlay about each axis in an overlay coordinates coordinate system parallel to each axis of sphere may be supported.

In an embodiment, information on a location at which an overlay media is to be overlaid may be included in overlay related metadata and may be included in Overlay-PosStruct( ). The OverlayPosStruct( ) may include, for example, the following as in Table 13.

TABLE 13

```
aligned(8) class OverlayPosStruct( ) {
    unsigned int(8) region_type;
    if(region_type == 0) {
        ViewportOverlayRegion( );
    } else if (region_type == 1) {
        SphereOverlayRegion( );
    } else if (region_type == 2) {
        3DOverlayRegion( );
    }
}
```

In Table 13, a region_type field may indicate information on a location at which an overlay is to be placed. Here, the region_type field having a value of 0 may indicate that the overlay is located at a user viewport. This may correspond to the above-described first case, and ViewportOverlayRegion( ) may be called. The region type field having a value of 1 may indicate that the overlay is bated on the sphere. This may correspond to the above-described second case, and SphereOverlayRegion( ) may be called. The region_type field having a value of 2 may indicate that the overlay is located in a 3D space. This may correspond to the above-described third case and 3DOverlayRegion( ) may be called.

Figure 44:
FIG. 44 is an example in which an overlay is placed on a viewport.

FIG. 44 is an example in which an overlay is rannged at a viewport.

Referring to FIG. 44, an overlay may be located at a user's viewport. To this end, location related information of the overlay placed at the user's viewport may be signaled and may be included in the above-described ViewportOverlayRegion( ) The ViewportOverlayRegion( ) may include, for examppe, the following as in Table 14.

TABLE 14

```
aligned(8) class ViewportOverlayRedion( ) {
    unsigned int(16) rect_left_percent;
    unsigned int(16) rect_top_percent;
    unsigned int(16) rect_width_percent;
    unsigned int(16) rect_height_precent;
    unsigned int(16) order;
    unsigned int(1) stereoscopic_flag;
    bit(7) reserved=0;
    if (stereoscopic_flag == 1) {
        unsigned int(1) relative_disparity_flag;
        if (relative_disparity_flag == 1) {
            signed int(16) disparity_in_percent;
        } else {
            signed int(16) disparity _in_pixels;
        }
    }
}
```

In Table 14, a rect_left_percent field, a rect_top_percent field, a rect_width_percent field, and a rect_height_percent field may indicate location and size information of an overlay that is a rectangular plane. That is, the respective fields may indicate left point location information, top point location information, width information, and a height information of the overlay, and may differ depending on a display size and thus specified as a percentage.

In addition, an order field may indicate the order of drawing a corresponding overlay when the corresponding overlay overlaps other overlays. Alternatively, the order field may indicate the order of overlays. Using the order field, a receiver may adjust a rendering order or adjust placement values upon rendering.

In addition, a stereoscopic_flag field may be a flag indicative of whether an overlay support sterero, a relative_disparity_flag field may be a flag indicative of whether the overlay has a relative disparity value upon providing sterero, and a disparity_in_percent field and a disparity_in_pixels field may indicate a relative disparity value and a disparity value per pixel unit, respectively.

Figure 45:
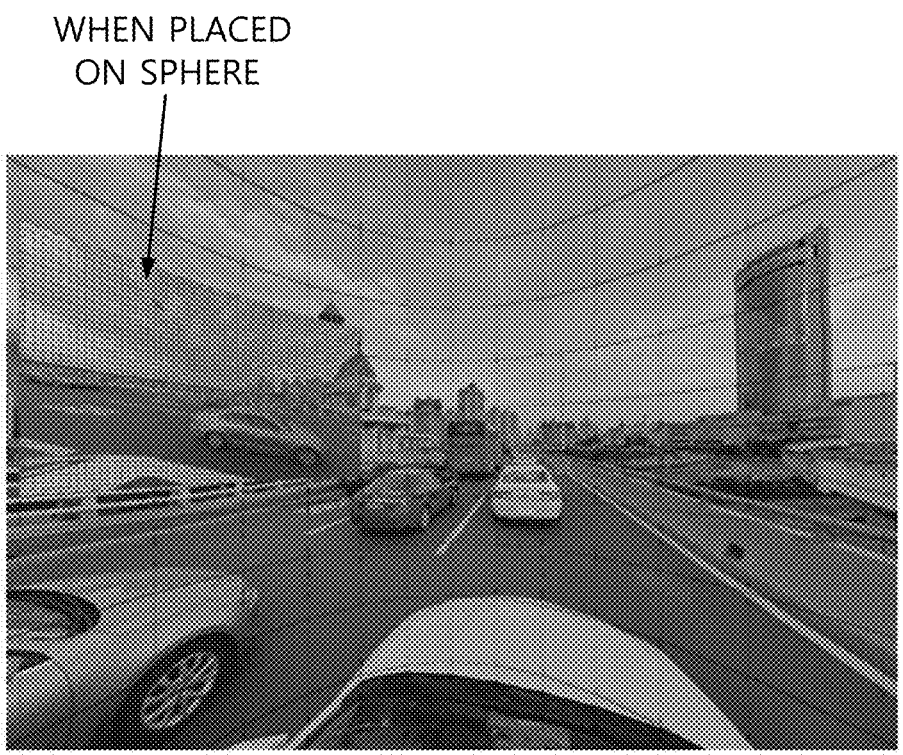
FIG. 45 is an example in which an overlay is placed on a sphere.

FIG. 45 is an example in which an overlay is placed on a sphere.

Referring to FIG. 45, an overlay may be arranged on a sphere. To this end, information related information of the overlay arranged on the sphere may be signaled and this may be included in the above-described SphereOverlayRegion( ) The SphereOverlayRegion( ) may include, for example, the following as in Table 15.

TABLE 15

```
aligned(8) class SphereOverlayRegion( ) {
    unsigned int(1) proj_shape=0;
    if (poj_shape == 1) {
        unsigned int(32) proj_reg_width_percent;
        unsigned int(32) proj_reg_height_percent;
        unsigned int(32) proj_reg_top_percent;
        unsigned int(32) proj_reg_left_percent;
    } else if (proj_shape == 2) {
        unsigned int(8) num_rings;
        unsigned int(8) num_sectors;
```

TABLE 15-continued

```
      for (i = 0; i < num_rings; i++) {
        for (j =0; j < num_sectors; j++) {
          unsigned int(16) proj_points_x[i][j];
          unsigned int(16) proj_points_y[i][j];
        }
      }
      unsigned int(3) transform_type[i];
      bit(5) reserved = 0;
      for (i = 0; i < num_rings; i++) {
        for (j =0; j < num_sectors; j++) {
          unsigned int(16) proj_points_x[i][j];
          unsigned int(16) proj_points_y[i][j];
        }
      }
    } else if (proj_shape ==0) {
      unsigned int(8) shape_type;
      signed int(32) centre_azimuth;
      signed int(32) centre_elevation;
      unsigned int(32) azimuth_range;
      unsigned int(32) elevation_range;
      signed int(32) centre_tilt;
    }
    unsigned int(1) interpolate;
    unsigned int(16) depth;
}
```

In Table 15, a proj_shape field may indicate a projected shape, and the proj_shape field having a value of 0 may indicate non-projection, the proj_shape field having a value of 1 may indicate projection in a rectangular shape, and the proj_shape field having a value of 2 may indicate projection in a polygonal shape.

If a projected shape is rectangular (proj_shape=1), aproj_reg_top_percent field, a proj_reg_left_percent field, the proj_reg_width_percent field, and a proj_reg_height_percent field may indicate location information of an overlay in a projected picture. That is, the respective fields may indicate top point location information, left point location information, width information, and height information of the overlay in the projected picture as percentages.

If a projected shape is polygonal (proj_shape=2), a num_rings field and a num_sectors field may indicate location information of an overlay in a projected picture. That is, the respective fields may indicate the number of regions horizontally divided from the projected picture and the number of regions vertically divided from the projected picture. In addition, a proj_points_x field and a proj_points_y field may indicate location information of each division point in the projected picture. That is, the respective fields may indicate a location value on the X-axis and a location value on the Y-axis in the projected picture. In addition, a packed_points_x field and a packed_points_y field may indicate location information of each division point in a packed picture. That is, the respective fields may indicate a location value on the X-axis and a location value on the Y-axis in the packed picture.

If projection is not performed (proj_shape==0), a shape_type field may indicate a location presentation type on a sphere. Here, if the shape_type field has a value of 0, four great circles may be configured, and if the shape_type field has a value of 1, two azimuth circles and two elevation circles may be configured. Here, a centre azimuth field and a centre_elevation field may indicate location information of an overlay central location. That is, the respective fields may indicate an azimuth value and an elevation value of the overlay central location. In addition, an azimuth_range field and a elevation range field may indicate size information of an overlay. That is, the respective fields may indicate an azimuth range and an elevation range of the overlay. In addition, a centre_tilt field may indicate a rotation value about a vector toward the origin of a sphere from the central point of the overlay.

In addition, an interpolate filed may be a flag for making smooth change by filling a value between changed values, and a depth field may indicate a value of distance from the origin to an overlay central point to set an order of an overlay to be preferentially shown when overlays overlap.

Figure 46:
FIG. 46 is an example in which an overlay is placed in a 3D space within a sphere.

FIG. 46 is an example in which an overlay is arranged in a 3D space within a sphere.

Referring to FIG. 46, an overlay may be placed in a 3D space within a sphere. To this end, location related information of the overlay placed in the 3D space within the sphere may be signaled, and this may be included in the above-described 3DOverlayRegion( ). The 3DOverlayRegion( ) may include, for example, the following as in Table 16.

TABLE 16

```
aligned(8) class Overlay3DPositionStruct( ) {
    signed int(32) overlay_pos_x;
    signed int(32) overlay_pos_y;
    signed int(32) overlay_pos_z;
}
aligned(8) class OverlayRotationStruct( ) {
    signed int(32) overlay_rot_yaw;
    signed int(32) overlay_rot_pitch;
    signed int(32) overlay_rot_roll;
}
aligned(8) class 3DOverlayRegion( ) {
    unsigned int(32) width;
    unsigned int(32) height;
    bit(7) reserved=0;
    unsigned int(1) interpolate;
    Overlay3DPositionStruct( );
    OverlayRotationStruct( );
}
```

In Table 16, a width field and a height field may indicate width information and height information with reference to a plane based on the Y-axis and the Z-axis, in the assumption that an overlay media is rectangular. Here, a size of a rectangular overlay media or overlay surface may be indicated or determined. In addition, an interpolate field may be a flag for making smooth change by filling a value between changed values, and 3DOverlayRegion( ) may include Overlay3DPositionStruct( ) and OverlayRotationStruct( ).

The Overlay3DPositionStruct( ) may include location information of the overlay media in a sphere coordinate system. Here, an overlay_pos_x field, an overlay_pos_y field, and an overlay_pos_z field may indicate an X-axis-based location value, a Y-axis-based location value, and a Z-axis-based location value of the overlay media in the sphere coordinate system, respectively, and the overlay media may move to the X-axis-based location value, the Y-axis-based location value, and the Z-axis-based location value of the overlay media in the sphere coordinate system. Alternatively, the overlay media may move to (x, y, z) coordinates in the sphere coordinate system.

The OverlayRotationStruct( ) may indicate information of rotation centered on the central point of the overlay about each axis with reference to an overlay coordinate system parallel to each of the sphere. Here, an overlay_rot_yaw field, an overlay_rot_pitch field, and an overlay_rot_roll field may indicate rotation information about a yaw axis, rotation information about a pitch axis, and rotation information about a roll axis. That is, an embodiment may support rotation centered on the central point of the overlay with reference to an overlay coordinate system parallel to each axis of the sphere.

Figure 47:
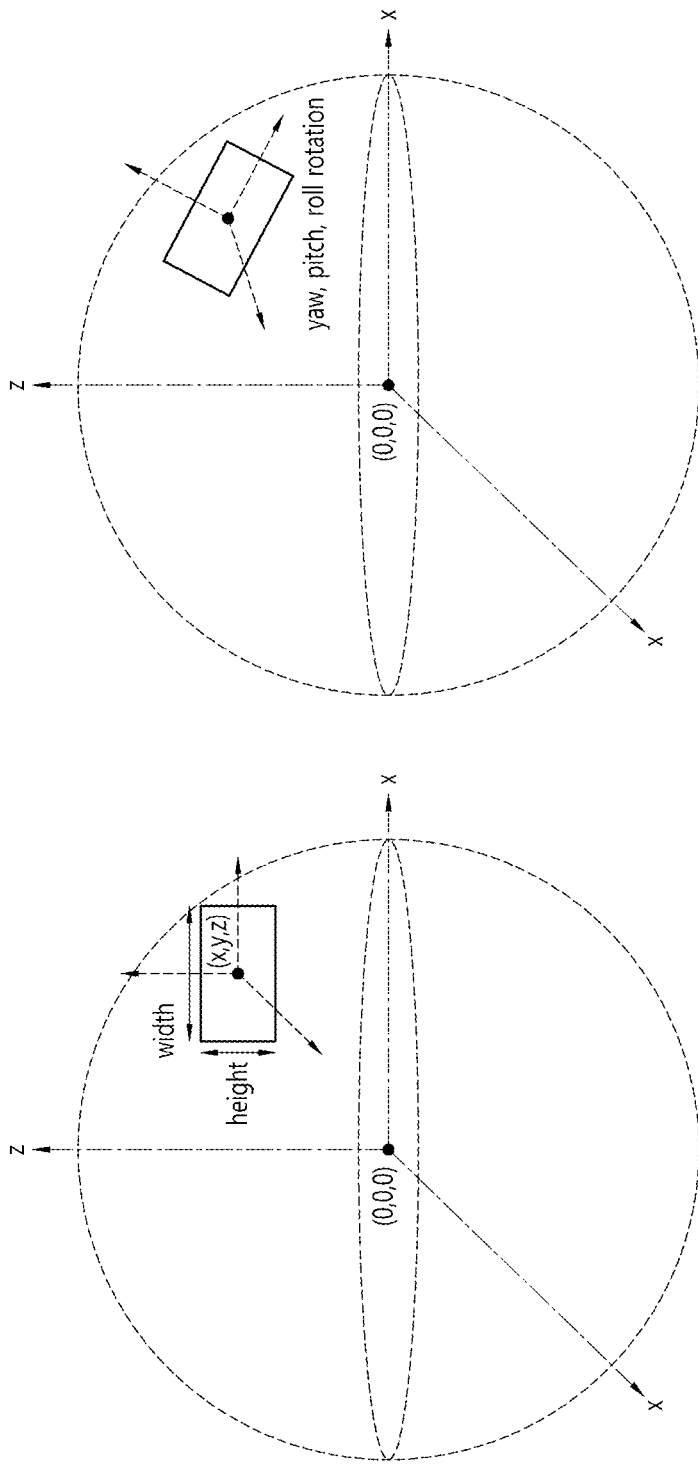
FIG. 47 shows a location/size/rotation of an overlay when the overlay exists in a 3D space within a sphere.

FIG. 47 illustrates location/size/rotation of an overlay when the overlay exists in a 3D space inside a sphere.

Referring to FIG. 47, information about a width, a height, and (x, y, z) coordinates in a left sphere may be indicated by the width field, the height field, the overlay_pos_x field, the overlay_pos_y field, and the overlay_pos_z field shown in FIG. 46.

In addition, information abour yaw-axis rotation, pitch-axis rotation, and roll-axis rotation in a left sphere may be indicated by the overlay_rot_yaw field, the overlay_rot_pitch field, and the overlay_rot_roll field shown in FIG. 46.

Figure 48:
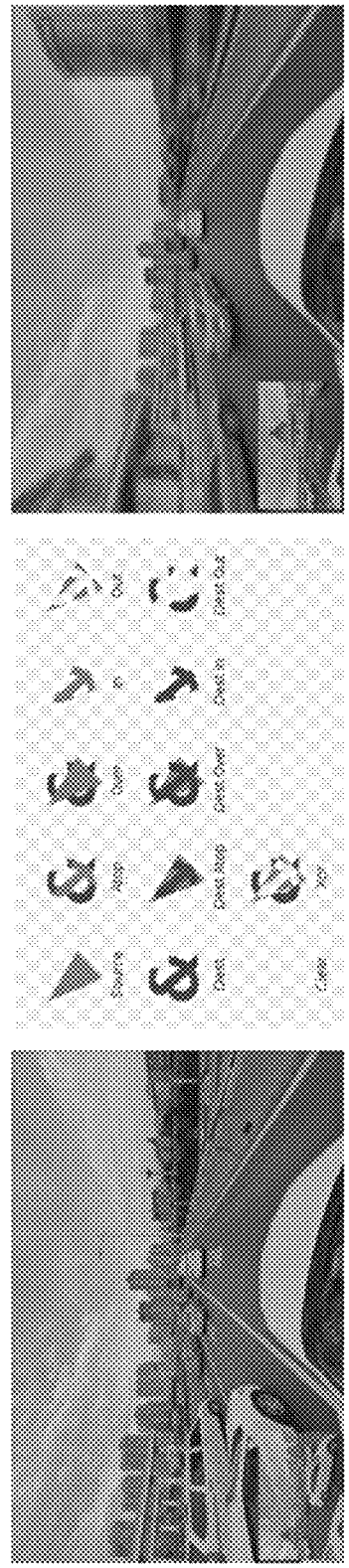
FIG. 48 shows an example of overlay rendering property

FIG. 48 shows an example of overlay rendering property.

In an embodiment, overlay metadata may include overlay rendering property information. The overlay rendering property information may include information about transparency of an overlay surface to be applied when rendering an overlay, a rendering option to be performed when blending an overlay on a VR media, a focus effect, etc., and the overlay rendering property information may be included in metadata and signaled. Here, the metadata may be referred to as overlay metadata, overlay related metadata, or overlay rendering related metadata. The overlay rendering property information may be referred to as rendering property information applicable when displaying/rendering an overlay media, and may be included in OverlayRenderStruct( ), and the OverlayRenderStruct( ) may include, for example, the following as in Table 17.

TABLE 17

```
aligned(8) class OverlayRenderStruct( ) {
   unsigned int(1) opacity_info_flag;
   unsigned int(1) blending_flag;
   unsigned int(1) focus_flag;
   unsigned int(5) reserve =0;
   if(opacity_info_flag == 1) {
      unsigned int(8) opacity;
   }
   if (blending_flag == 1) {
      unsigned int(8) blending_type=1;
   }
   if (focus_flag == 1) {
      unsigned int(8) focus;
   }
}
```

In Table 17, an opacity_info_flag field may be a flag indicative of whether entire transparency of an overlay surface is specified, and the opacity field may indicate information on a transparency level or a transparency level value. A blending_flag field may be a flag indicative of blending to be applied for overlay composition is specified. Here, the blending_type field having a value of 0 may indicate source_over, the blending_type field having a value of 2 may indicate source_atop, the blending_type field having a value of 3 may indicate source_in, the blending_type field having a value of 4 may indicate source_out, the blending_type field having a value of 5 may indicate dest_atop, the blending_type field having a value of 6 may indicate dest_over, the blending_type field having a value of 7 may indicate dest_in, the blending_type field having a value of 8 may indicate dest_out, the blending_type field having a value of 9 may indicate clear, and the blending_type field having a value of 10 may indicate xor, and a default setting may be source_over indicated when the blending_type field having a value of 1.

A focus_flag field may be a flag indicative of overlay focus, and the focus field may indicate information on a focus level or a vocus level value. Here, the focus level value may be within the range from 0 to 1.0. If focus is specified or indicated to an overlay, blurring may be applied to another overlay being rendered by a receiver and a VR media.

Figure 49:
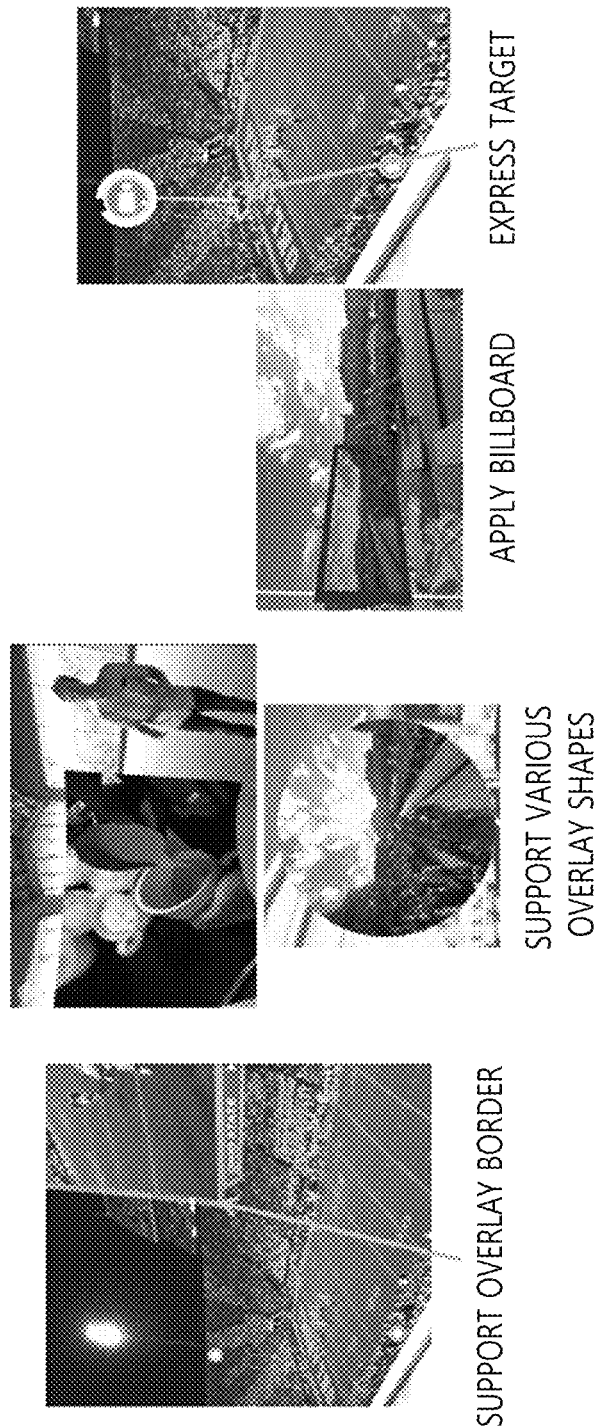
FIG. 49 shows an example of overlay miscellaneous.

FIG. 49 shows an example of overlay miscellaneous.

In an example, overlay metadata may include overlay miscellaneous information. Here, the overlay miscellaneous information may be referred to as overlay rendering other information. The overlay rendering other information may include information on supporting of an overlay border, information on supporting of various overlay shapes, information on supporting of billboard, and information indicating a specific point indicated by a location of an overlay due to difference in location between a target and the overlay. Here, the billboard may refer to a method of changing a rotation value of an overlay according to a user's viewing orientation.

The above-described overlay metadata may be signaled, and the overlay metadata may be referred to as metadata, overlay related metadata, overlay rendering other metadata, overlay rendering related metadata, or overlay miscellaneous related metadata. The overlay miscellaneous information may be referred to as other rendering information, which can be additionally set in regard to an overlay, and may be included in OverlayMiscStruct( ), and the OverlayMiscStruct( ) may include, for example, the following as in Table 18.

TABLE 18

```
aligned(8) class OverlayMiscStruct( ) {
   unsigned int(1) frame_flag;
   unsigned int(1) shape_flag;
   unsigned int(1) billboard_flag;
   unsigned int(1) target_flag;
   if (frame_flag == 1) {
      unsigned int(8) frame_border_width;
      unsigned int(32) frame_color[4];
   }
   if (shape_flag == 1) {
      unsigned int(8) shape_type;
      if (shape_type == 1) { // curve
         unsigned int(32) h_curvature;
         unsigned int(32) v_curvature;
      } else if (shape_type == 3) {
         unsigned int(8) num_vertices;
         unsigned int(32) scale;
         for (int i=0; i< num_vertices; i++) {
            unsigned int(32) xyz[3];
            unsigned int(32) st[2];
         }
      }
   }
   if (target_flag == 1) {
      signed int(32) target_azimuth;
      signed int(32) target_elevaton;
   }
}
```

In Table 18, a frame_flag_field may be a flag indicative of whether an overlay surface border is drawn, a frame_border_width field may indicate a border thickness when the border is drawn, and a frame_color field may indicate a RGBA color value including transparency of the border. An shape_flag field may be a flag indicative of whether the overlay surface is to be specified in a shape other than a rectangle. Here, the shape_flag field having a value of 1 may indicate a curve type, the shape_flag field having a value of 2 may indicate a circule type, and the shape_flag field having a value of 3 may indicate a type defined by a user, and other values may be kept preparatorily and may be defined according to a different setting.

Here, if the shape_flag field having a value of 1 (shape_flag==1), a h_curvature field and a v_curvature field may indicate a curved degree. That is, the respective fields may indicate a horizontal curvature value and a vertical curvature value.

In addition, if the shape_flag field having a value of 3 (shape_flag=3), a num_vertices field, a scale field, an xyz field, and an st field may indicate the number of apexes, scale information, (x, y, z) coordinate information or location information of each apex, and texture coordinate information, respectively.

A billboard_flag field may be a flag indicative of whether billboard is applied to an overlay surface, and a target_flag field may be a flag indicative of whether there is an overlay target. Here, in the case where the target_flag field indicates that there is a target, a target_azimuth field and a target_elevation field may indicate location information of the target. That is, the respective fields may indicate elevation information (or an elevation value) and azimuth information (or an azimuth value).

Figure 50:
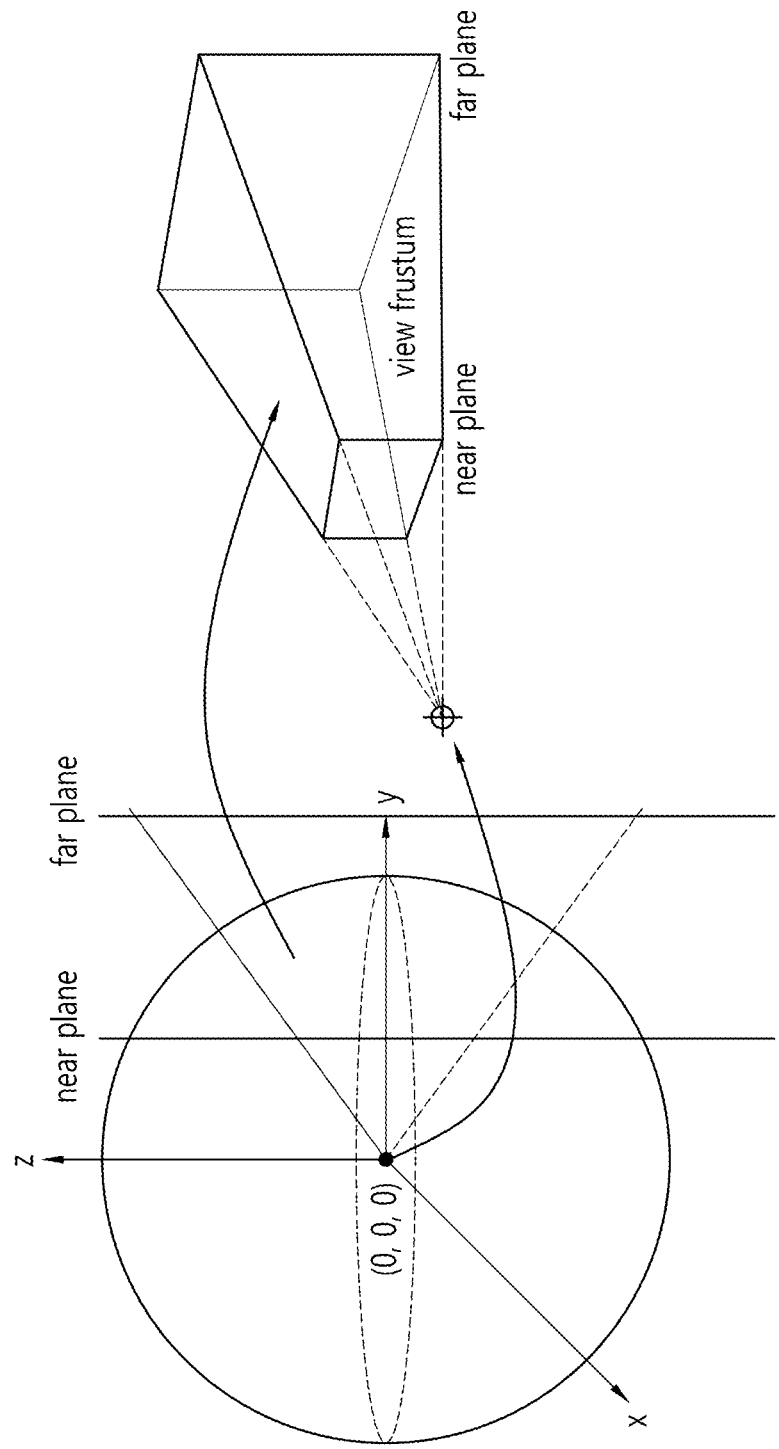
FIG. 50 is an example showing a movable space within a viewport.

FIG. 50 is an example showing a movable space within a viewport.

In an embodiment, the VR media may provide interaction to provide a sense of immersion. Alternatively, overlay interaction of the VR media may be provided. A basic interaction may be that, when a location and a viewing orientation of a user wearing a head mounted display (HMD) is changed, a picture is constructed by reflecting the change. In order to further add interaction, it is possible to interact with an overlay on the VR media. In this case, information as t whether a corresponding overlay is allowed to interact, and an interaction allowed range may be indicated.

Here, the interaction-allowed range may be divided into a movement-allowed space within a viewport and a space where movement of each overlay is allowed, and both of the two spaces can be defined.

In addition, it is possible to further control location/depth/rotation/scale information on each overlay capable of interacting. An overlay does not necessarily exist within a viewport region. Yet, a user can interact with an overlay existing at a viewport. Thus, an entire space for overlay media interaction may be a user's viewport region. If the user selects an interaction allowed overlay among overlays viewed at the current viewport, the user may change location, orientation, and scale of the corresponding overlay. A bound box surrounding the overlay may be updated in accordance with the change, and the updated bound box may exist within the user's viewport region.

Referring to FIG. 50, in order to indicate a movable space within a viewport region, a horizontal Field of View (FOV), azimuth information, a vertical FOV, elevation information, and a location value of a near plane may be used. Here, the horizontal FOV, the azimuth information, the vertical FOV, and the elevation information may be applied according to HMD and may be set in a player. In addition, even the location value of the near plane may be set in the player.

In an embodiment, viewing frustrum may be generated as the horizontal FOV, the location value of the near plane, and a location value of a far plane. Here, the location value of the far plane is a unit sphere and thus it may have a value of 1.

Figure 51:
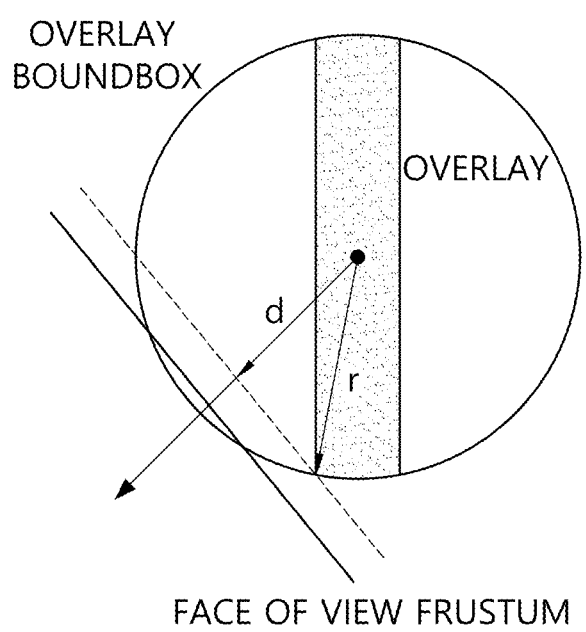
FIG. 51 is an example for explaining a VFC algorithm.

FIG. 51 is an example for explaining a VFC algorithm.

There may be various Viewing Frustum Culling (VFC) algorithms for checking if movement exists within a viewing frustum, and a VFC algorithm may be used to determine whether there is a region where a bound box of an overlay is culled.

Here, if there is a region where the bound box of the overlay is culled, it is possible to perform control so as to prevent movement in a direction toward the region, and, if there is a possibility that another additionally compensated region exists, it is possible to perform update to a corresponding location of the region. This operation may be performed by a receiver.

AABBvsFrustum may be used as a basic VAC. However, the VFC may employ various other methods and thus it is not limited thereto. Referring to FIG. 51, AABBvsFrustum may be checked to see if there is a face interacting with a bound box, and, if the face is not outside or intersects, may determine that movement safely exists within a viewport region. AABBvsFrustum may include, for example, the following as in Table 19.

TABLE 19

```
int AABBvsFrustum(AABB *b, FRUSTUM *f){
    float m, n;
    int i, result = INSIDE;
    for (i = 0; i < 6; i++){
        PLANE *p = f->plane + I;
        m = (b->mx * p->a) + (b->my * p->b) + (b->mz * p->c) + p->d;
        n = (b->dx * fabs(p->a)) + (b->dy * fabs(b->b)) + (b->dz * fabs(p->c));
        if (m + n < 0) return OUTSIDE;
        if (m - n < 0) result = INTERSECT;
    }
    return result;
}
```

In an embodiment, specific overlays may freely move within a current viewport region through interaction, but a movable region may be additionally set for each overlay. For example, a specific overlay may be fixed at a location and movement thereof may be limited so that only rotation in a specific direction is allowed.

In an embodiment, in order to represent a movable space for each overlay, information about an azimuth range, an elevation range, and a depth range may be used. In this case, it is possible to define not just a space where an overlay can move within a viewport, but also another space, and a method for processing presence in a region of a receiver may be the same as a method for processing presence in a viewport region.

In addition, an embodiment may additionally set whether to restrict movement of each overlay. Alternatively movement of each overlay may be restricted. To this end, information about a rotation range about each axis and information on a scale range may be used.

The above-described items of information may be overlay interaction related information or overlay interaction information and may be included in overlay interaction metadata, and the overlay interaction metadata may be signaled. Alternatively, the overlay interaction related information may be included in OverlayInteractionStruct( ), and the OverlayInteractionStruct( ) may be included in the overlay interaction metadata. The OverlayInteractionStruct( ) may include, for example, the following as in Table 20.

TABLE 20

```
aligned(8) class OverlayInteractionStruct( ) {
    unsigned int(1) switch_on_off_flag;
    unsigned int(1) change_opacity_flag;
    unsigned int(1) position_flag;
    unsigned int(1) depth_flag;
    unsigned int(1) rotation_flag;
    unsigned int(1) resize_flag;
```

TABLE 20-continued

```
        unsigned int(1) limit_in_viewport_flag;
        unsigned int(1) limit_transform_flag;
        if (switch_on_off_flag == 1) {
            unsigned int(32) available_levels;
        }
        if (change_opacity_flag == 1) {
            unsigned int(16) opacity_min;
            unsigned int(16) opacity_max;
        }
        if (limit_transform_flag) {
            if (position_flag == 1) {
                unsigned int(32) azimuth_min;
                unsigned int(32) azimuth_max;
                unsigned int(32) elevation_min;
                unsigned int(32) elevation_max;
            }
            if (depth_flag == 1) {
                unsigned int(32) depth_min;
                unsigned int(32) depth_max;
            }
            if (rotation_flag == 1) {
                unsigned int(1) rotation_x_axis_flag;
                unsigned int(1) rotation_y_axis_flag;
                unsigned int(1) rotation_z_axis_flag;
                bit(5) reserved=0;
                if (rotation_x_axis_flag) {
                    unsigned int(32) x_rotation_min;
                    unsigned int(32) x_rgtation_max;
                }
                if (rotation_y_axis_flag) {
                    unsigned int(32) y_rotation_min;
                    unsigned int(32) y_rotation_max;
                }
                if (rotation_z_axis_flag) {
                    unsigned int(32) z_rotation_min;
                    unsigned int(32) z_rotation_max;
                }
            }
            if (resize_flag == 1) {
                unsigned int(32) resize_min;
                unsigned int(32) resize_max;
            }
        }
    }
}
```

In Table 20, a switch_on_off_flag field may be a flag that allows interaction capable of showing or hiding an overlay, and a change_opacity_flag field may be a flag allowing controlling of glogal opacity of an overlay surface. A position_flag field, a depth_flag field, a rotation_flag field, and a resize_flag field may be a flag allowing change of location, depth, rotation, and scape, and a limit_in_viewport_flag field may be a flag for limiting movement to a viewport region. In addition, the limit_transform_flag may be a flag indicating whether a movement range of each overlay is limited.

Here, if the switch_on_off_flag field having a value of 1, an available_levels field may indicate the number of changeable levels. If the change_opacity_flag field having a value of 1, an opacity_min_field and an opacity_max field may indicate a minimum value and a maximum value of opacity. If the position_flag field having a value of 1, it is possible to change an azimuth_min_field, an azimuth_max field, an elevation_min_field, and an elevation_max field, which respectively indicate location information. Here, the azimuth_min field, the azimuth max field, the elevation_min field, and the elevation_max field may indicate a minimum azimuth value, a maximum aximuth value, a minimum elevation value, and a maximum elevation value. In addition, since a limit_transform_flag field having a value of 1, it is possible to set the movement range of the overlay.

If the depth_flag field having a value of 1, it is possible to control a depth_min field and a depth_max field respectively indicating a minimum depth value and a maximum depth value, and accordingly, it is possible to set a range for changing the depth value. In this case, the depth value can be changed with a size of the overlay being maintained.

In addition, a rotation_x_axis_flag field, a rotation_y_asix_flag field, and a rotation_z_axis_flag field may be flags for setting whether rotation about the X axis, the Y axis, and the Z axis is possible. Here, if rotation about each axis is indicated by 1, it is possible to set a range of a rotation angle about each axis. That is, if the rotation_x_axis_flag field having a value of 1, it is possible to control an x_rotation_min field and an x_rotation_max field, which respectively indicate a minimum value and a maximum value of rotation about the X axis, if the rotation_y_axis_flag field having a value of 1, it is possible to control a y_rotation_min field and a y_rotation_max field which respectively indicate a minimum value and a maximum value of rotation about the Y axis, and if the rotation_z_axis_flag field having a value of 1, it is possible to control a z_rotation_min field and a z_rotation_max field which respectively indicate a minimum value and a maximum value of rotation about the Z axis.

If the resize flag field having a value of 1, it is possible to change a resize_min and a resize_max field, which respectively indicate a minimum overlay size and a maximum overlay size, and it is possible to set a range of scale by controlling the fields. Here, the scale may be applied at the same ratio as an aspect ratio of an overlay.

Figure 52:
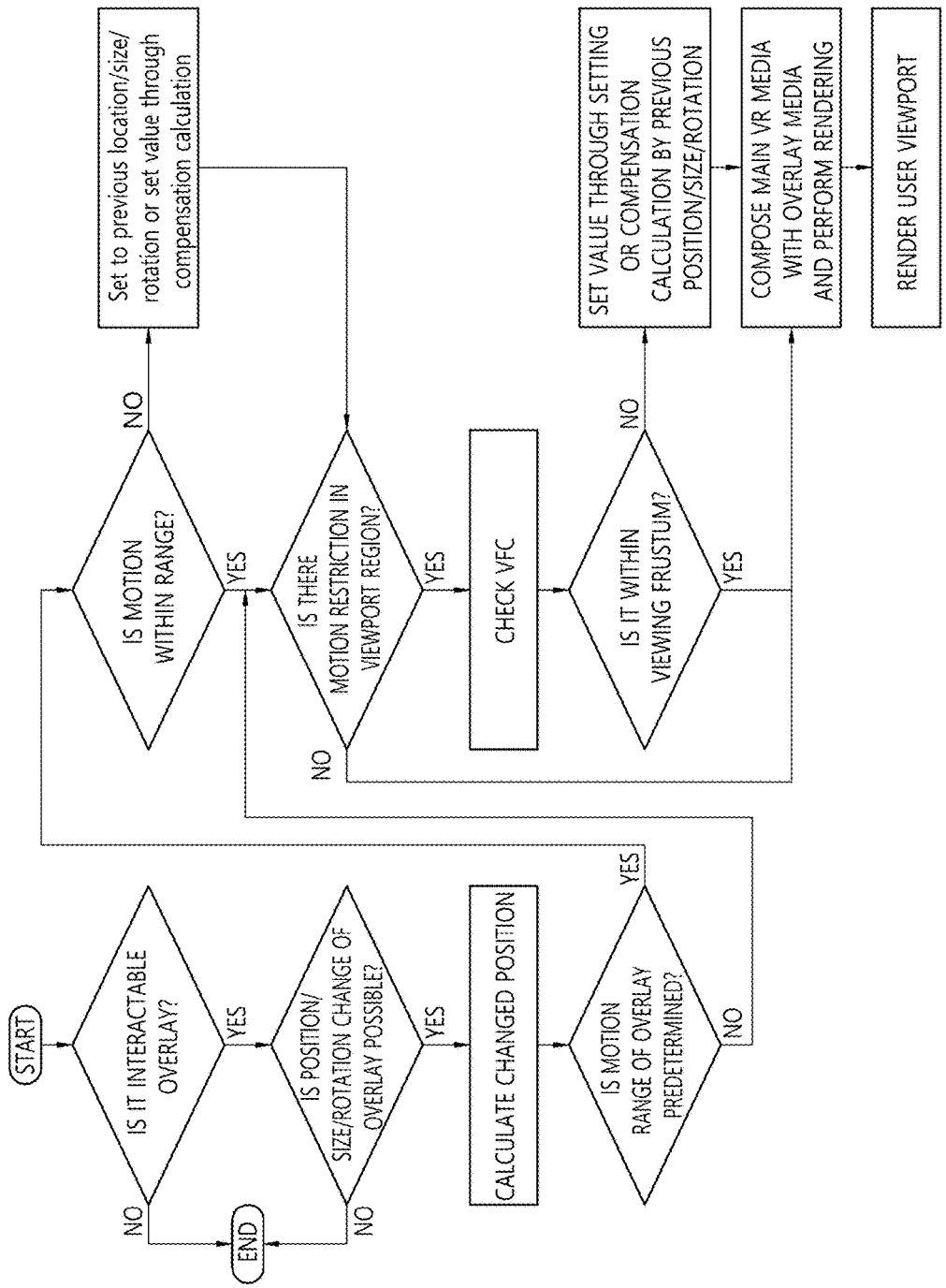
FIG. 52 is an example of a flowchart of a method for providing overlay interaction.

FIG. 52 is an example of a flowchart for explaining a method of providing overlay interaction.

Referring to FIG. 52, if a user input such as selecting and moving an overlay is obtained, an embodiment may determine whether the corresponding overlay is an interactive overlay, and, if the corresponding overlay is not an interactive overlay, a related process may be terminated. In addition, if the corresponding overlay is an interactive overlay, it may be determined as to whether location/size/rotation/change of the overlay can be changed, and, if the location/size/rotation/change of the overlay cannot be changed, a related process may be terminated. However, if the location/size/rotation/change of the overlay can be changed, an embodiment may calculate a change location and determine as to whether a movement range of the overlay is set.

If the movement range of the overlay is set, an embodiment may determine whether movement is within the range, and, if the movement is within the range, it may be determined as to whether movement in a viewport region is limited. However, if the movement is not within the range, a value may be set through setting to previous/location/size/rotation or through compensation calculation, and then it may be determined as to whether movement in the viewport region is limited. In addition, even in the case where the movement range of the overlay is not set, it may be determined as to movement in the viewport region is limited.

If there is a limit to movement, an embodiment may perform viewing frustum culling (VFC) check, and determine whether movement exists within a viewing frustum. Here, if the movement is within the viewing frustum, a main VR media and an overlay media may be composited and rendered. However, if movement does not exist within the viewing frustum, a previous location/size/rotation may be set or a value may be set through compensation calculation, and then, the main VR media and the overlay media may be composited and rendered. In addition, even in the case where there is no limit to movement, the main VR media and the overlay media may be composited and rendered.

An embodiment may perform composition and rendering of the main VR media and the overlay media, and render a user viewport.

In an embodiment, overlay metadata may include at least one of location information, size information, rendering property information, or interaction information of an overlay, as described above. Alternatively, the overlay metadata may include overlay location related information (location and size), overlay rendering property information, overlay rendering other information, and overlay interaction information, as described above. The overlay metadata may include OverlayInfoStruct( ), and the OverlayInfoStruct( ) may include the overlay location related information (location and size), the overlay rendering property information, the overlay rendering other information, and the overlay interaction information. The overlay location related information (location and size), overlay rendering property information, overlay rendering other information, and overlay interaction information, may include, for example, the following as in Table 21.

TABLE 21

```
aligned(8) class OverlayInfoStruct( ) {
    unsigned int(32) overlay_id;
    unsigned int(16) overlay_source_id;
    unsigned int(1) overlay_essential_flag;
    unsigned int(1) overlay_priority;
    OverlayPosStruct( );
    OverlayRenderStruct( );
    OverlayMiscStruct( );
    OverlayInteractionStruct( );
}
```

In Table 21, an overlay_id field may indicate ID of overlay metadata, and an overlay_source_id field may indicate ID of overlay media source data. An overlay_essential_flag field may indicate whether a corresponding overlay is an overlay mandatory to be overlaid, and an overlay_priority field may indicate a priority order of overlaying of overlay medias. Here, the priority order may influence decoding.

In addition, OverlayPosStruct( ) may include overlay location related information, for example, as shown in Table 13. OverlayRenderStruct( ) may include overlay rendering property information or overlay rendering property related information, for example, as shown in Table 17. OverlayMiscStruct( ) may include overlay other information, for example, as shown in Table 18. OverlayInteractionStruct( ) may include overlay interaction information, for example, as shown in Table 20.

FIG. 52 shows an example of configuration of dynamic overlay metadata.

Figure 53:
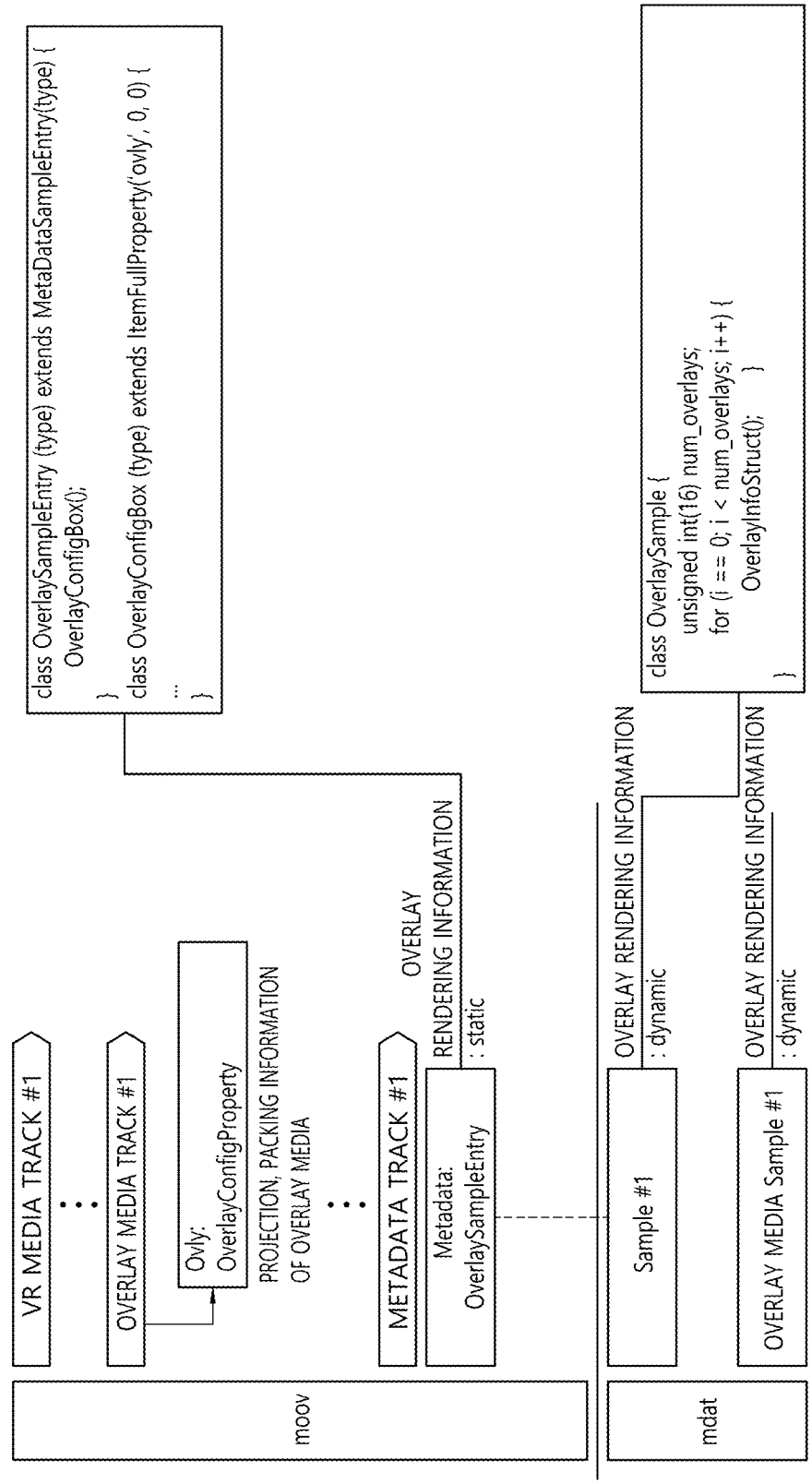
FIG. 53 shows an example of a configuration of overlay metadata.

For example, if dynamic overlay metadata is configured as timed-metadata, OverlaySampleEntry may be defined, as shown in FIG. 53, the OverlaySampleEntry may inherit MetadataSampleEntry and thereby call OverlayConfigBox. Within the OverlayConfigBox, static overlay rendering metadata may be defined. Actual dynamic overlay metadata may be stored in a sample. In OverlaySample, OverlayInfoStruct may be configured in number corresponding to a number of overlays. Here, the OverlaySampleEntry, the OverlayConfigBox, and the OverlaySample may be the same as shown in FIG. 53, and the OverlayInfoStruct may be the same as shown in Table 21.

In order to support a case where an overlay media changes in an overlay location or a rendering property over time, overlay metadata may be stored in an additional metadata track and delivered. The corresponding overlay media metadata track may include one or more samples, and each sample may include one or more items of metadata. Each sample may include one or more OverlayInfoStruct.

Figure 54:
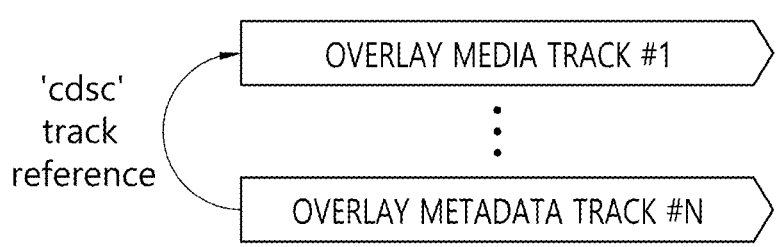
FIG. 54 shows an example of dynamic overlay metadata track and overlay media track lnk signaling.

FIG. 54 shows an example of dynamic overlay metadata track and overlay media track link signaling.

Using TrackReferenceTypeBox of an overlay metadata track, an overlay media track may be indicated. That is, as "cdsc" is given as the reference type value and track IDs indicates one or more overlay media track IDs or track group IDs (when an overlay media is delivered through one or more tracks), an overlay media track associated with overlay metadata may be indicated.

Figure 55:
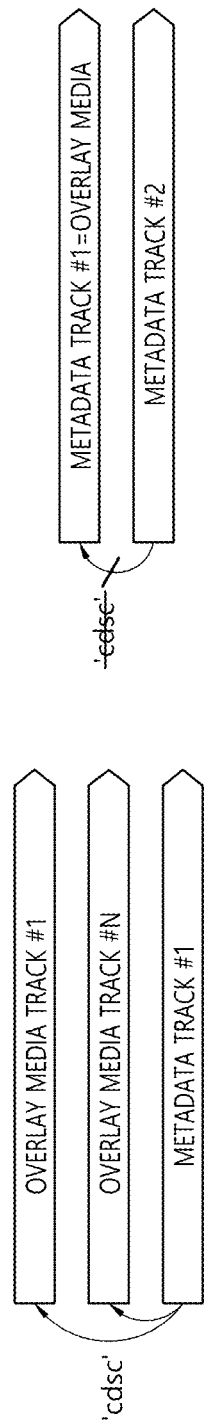
FIG. 55 is an example of linking of overlay metadata and a related overlay media.

FIG. 55 shows an example of linking of overlay metadata and a related overlay media.

In an embodiment, an overlay media track referred to by an overlay metadata track may be indicated using "cdsc". Overlay metadata may refer to one or more overlay media tracks. Here, "cdsc" may be used to indicate linking with an overlay media track, but, if an overlay media is stored in a metadata track, "cdsc" cannot be used.

However, there may be a case where a metadata track contains an overlay media content. In this case, the overlay media track is configured as a metadata track, and thus, a method for a case where an overlay rendering metadata track refers to the overlay media track, which is a metadata track, may be required. In this case, a reference track cannot be linked through "cdsc", and, for example, the reference track may be the reference track.

Figure 56:
FIG. 56 shows an example of a recommended viewport overlay.

FIG. 56 shows an example of a recommended viewport example.

As recommended viewports, locations of viewports recommended on an hourly basis may be stored in timed-metadata. These recommended viewports may be change a user's viewport automatically or may be seen as an overlay at a particular location when a VR media is rendered.

In FIG. 56, the left and right windows may correspond to overlays of recommened viewports. In this case, a method for linking a metadata track of an overlay media and an overaly rendering metadata track may be required.

Figure 57:
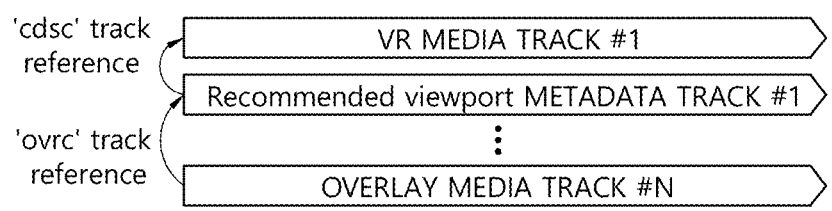
FIG. 57 shows an example of "ovrc" track reference.

FIG. 57 shows an example of "ovrc" track reference.

In an embodiment, a VR region such as a region of interest (ROI) may be overlaied on a VR media. To support this, if an additional overlay metadata track and a metadata track including recommended viewports of a VR media and the like exist, it is possible to signal a relationship between the overlay metadata track and the metadata track of the VR media.

In an embodiment, a metadata track (a recommended viewport metadata track, etc.) to which overlay metadata isto be applied may be indicated using TrackReferenceTypeBox of an overlay metadata track. To this end, as a new reference type is added, that is, as a reference type field having a value of "ovrc" and one or more metadata track (recommended viewport metadata track, etc.) IDs are indicated by track IDs, a track(s) indicated through "ovrc" and a track IDs field may be a metadata track(s) to which the current metadata is applied. TrackReferenceBox and TrackReferenceTypeBox may include, for example, the following as in Table 22.

TABLE 22

```
aligned(8) class TrackReferenceBox extends Box( 'tref' ) {
}
aligned(8) class TrackReferenceTypeBox (unsigned int(32)
reference_type) extends Box {
```

TABLE 22-continued

```
    unsigned int(32) track_IDs[ ];
}
```

In Table 22, a track_ID field may be an integer providing reference from a containing track to another track in the presentation, and a track IDs field cannot be reused and cannot have a value of 0 or the like. In addition, a reference type field may be indicated or specified as described above and may be set one of the following values.

Figure 58:
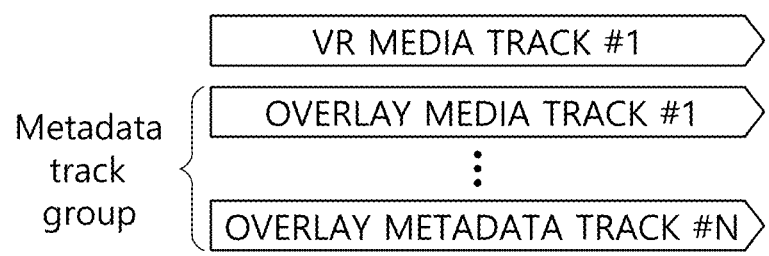
FIG. 58 shows an examample of metadata track grouping.

FIG. 58 is an example of metadata track grouping.

In an embodiment, a VR region such as a region of interest (ROI) may be overlayed on a VR media. To support this, if an additional overlay metadata track and a metadata track including recommended viewports of a VR media and the like exist, it is possible to signal a relationship between the overlay metadata track and the metadata track of the VR media.

In an embodiment, TrackGroupTypeBox, of which a Track_group_type field having a value of "mtgr", may indicate a metadata track group which is applied together to a media such as an overlay in a 360 scene. Tracks having the same value in a track_group_id field may be applied together to an overlay in the 360 scene and processed. TrackGroupTypeBox may include MetadataGroupBox and, the MetadataGroupBox may include the following as in Table 23.

TABLE 23

```
aligned(8) class MetadataGroupBox extends TrackGroupTypeBox
( 'mtgr' ) {
    unsigned int(7) metadata_type;
    unsigned int(1) metadata_essential_flag;
}
```

In Table 23, a metadata type field may indicate a metadata type. For example, if the metadata_type field has a value of 0, the metadata_type field may indicate recommended viewport metadata, and, if the metadata_type has a value of 1, the metadata_type field may indicate overlay metadata. In addition, the metadata_essential_flag field may be a flag indicative of whether corresponding metadata is mandatory to be processed and applied to a media. If the corresponding metadata is mandatory to be processed and applied to a media, a player not supporting processing of the corresponding metadata may not reproduce an associated media.

In an embodiment, a timed-metadata track, of which a sample entry type is "revp", may not include SampleToGroupBox or may include one SampleToGroupBox. Here, a grouping_field of the SampleToGroupBox may be "ovmt". The SampleToGroupBox may represent information about allocating samples in timed metadata (and eventually the corresponding samples in media tracks) to specific overlay metadata.

If there is a SampleToGroupBox of which the group type field has a value of "ovmt", there may be a SampleGroupDescriptionBox having the same group type and the SampleGroupDescriptionBox may include ID of specific overlay metadata to which a sample group belongs. A sample group entry of which the group type field has a value of "ovmt", that is, an OverlayMetaRefEntry may include, for example, the following as in Table 24.

TABLE 24

```
class OverlayMetaRefEntry( ) extends SampleGroupDescriptionEntry
(' ovmt' ) {
    OverlayInfoStrut( );
}
```

In Table 24, OverlayInfoStruct( ) may include overlay metadata to be applied to metadata samples included in a group, as shown in Table 21.

In an embodiment, tracks may be integrated to expand an overlay media metadata track. Thus, the metadata track may be expanded to store both overlay media content data and overlay rendering metadata, so that linking of those metadata is not needed. A recommended viewport may be taken as an example, and, to support this, an OverlayRcvpSampleEntry may be used. The OverlayRcvpSampleEntry may include the following as in Table 25.

TABLE 25

```
class OverlayRcvpSampleEntry( ) extends RcvpSampleEntry (' ovmv' ) {
    // overlay rendering info(position, size, opacity ... etc)
    ...
}
```

Figure 59:
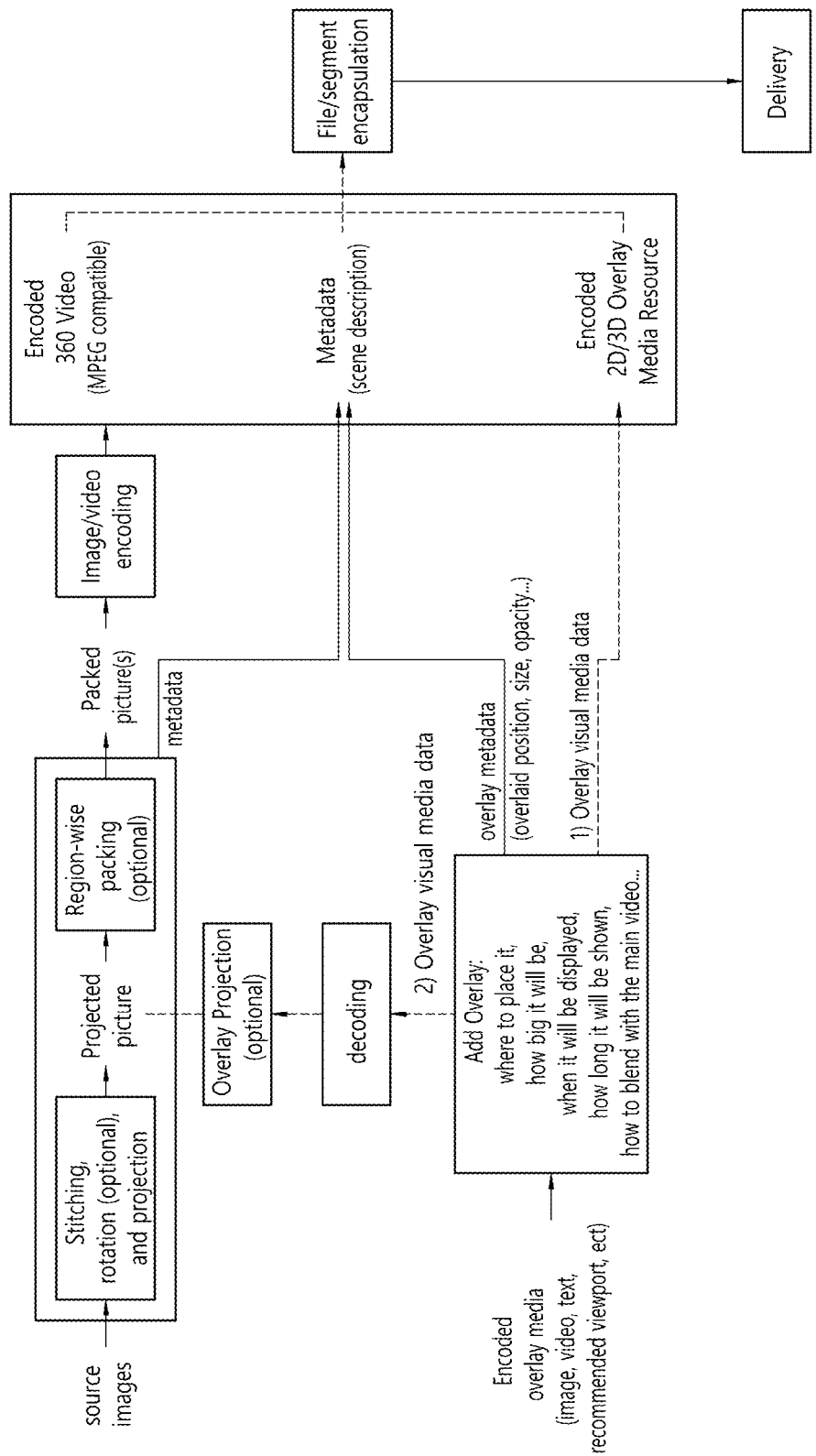
FIG. 59 shows an exemplary architecture of a transmitter that supports an overlay placed on a VR media.

FIG. 59 shows an exemplary architecture of a transmitter that supports an overlay placed on a VR media.

A transmitter according to an embodiment may obtain overlay media, so that metadata and overlay media data, generated by a producer by controlling a location/size/rendering option of an overlay, can be delivered to a receiver through a file/segment encapsulation process. Alternatively, specific projection may or may not be applied to an overlay after decoding, according to a packing and projection method, and then, a separated overlay media track or a VR media track, in which the overlay media track is packed together, may be encoded by performing texture atlas packing or region-wise packing may go through the file/segment encapsulation process, and then delivered to the receiver.

Figure 60:
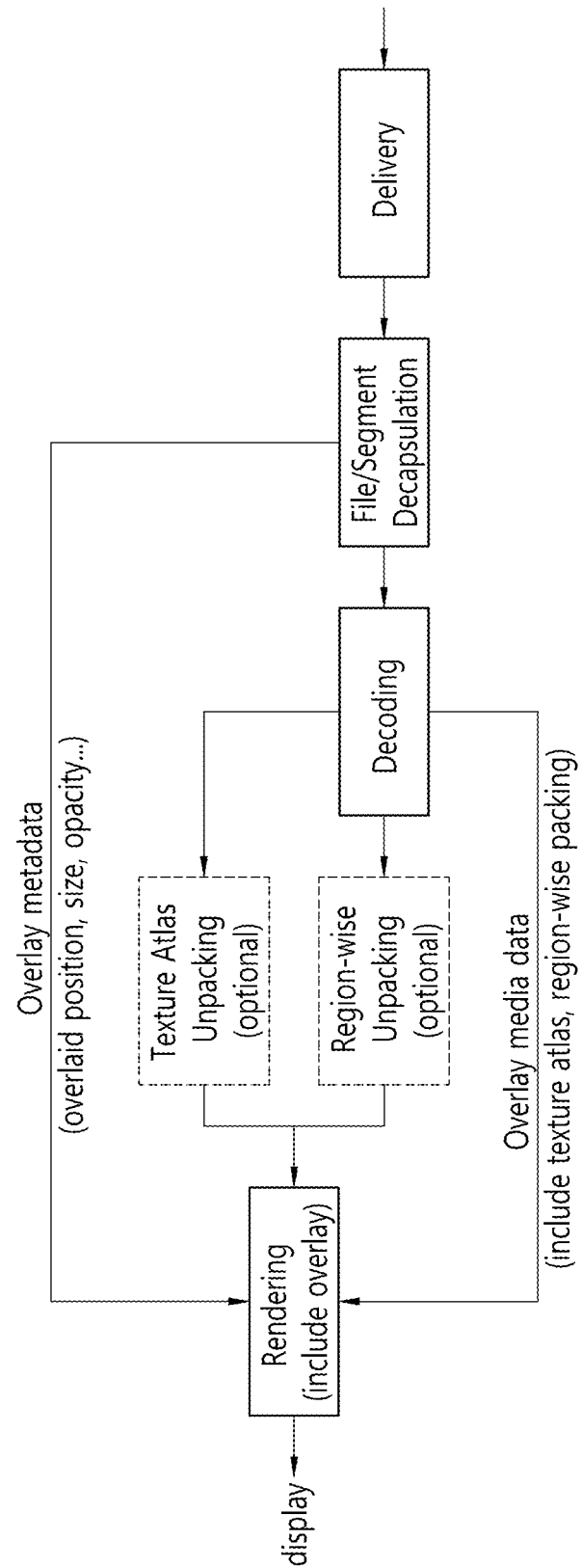
FIG. 60 shows an example of a transmitter that supports an overlay plaed on a VR media.

FIG. 60 shows an example of a transmitter supporting an overlay placed on a VR media.

A receiver according to an embodiment may decapsulate delivered data and deliver the decapsulated data to a renderer which renders overlay metadata. A media to be overlaid may be decoded, and, if the decoded media is region-wise packed or texture-atlas packed, respective overlays may be unpacked and delivered to the renderer. Alternatively, if entire data may be delivered to the renderer, and the renderer may control the data through packing information upon rendering. The receiver according to an embodiment may support either or both of the two methods, and an application method may be controlled by the receiver according to hardware specification of the receiver.

Referring back to FIG. 18, overlay metadata may be signaled on an overlay media track in the following method.

A sample entry of an overlay media track may include an OverlayConfigBox. Using this, it is possible to signal whether the corresponding media track includes overlay media and to signal overlay media related metadata included in the track. The OverlayConfigBox may be included in overlay metadata and may include, for example, the following as in Table 26.

TABLE 26

```
class OverlayConfigBox extends FullBox('ovcf', 0, 0) {
   unsigned int(8) num_overlays;
   OverlayMediaPackingStruct(num_overlays)
   for (i=0;i< num_overlays;i++) {
      OverlayInfoStruct( );
   }
}
```

In Table 26, a num_overlay field may indicate the number of overlay medias included in each sample of an overlay media track or the maximum number of overlay medias included in a sample. OverlayMediaPackingStruct( ) may include projection and packing information of an overlay media, as shown in Table 3. In addition, Overlay-InforStruct( ) may include overlay metadata and may be applied to an overlay media included in a sample of a track, as shown in Table 21.

In an embodiment, an overlay media track may include a SampleToGroupBox of which a grouping_type field has a value of "ovgr". The SampleToGroupBox may indicate samples to which overlay metadata is to be applied among samples included in a corresponding track.

In the case where the corresponding track includes a SampleToGroupBox of which a grouping_type field has a value of "ovgr", there may be a SampleGroupDescriptionBox of which the grouping_type field has a value of "ovgr", and the following information commonly applied to corresponding samples may be included. A sample group entry of which the grouping_type field has a value of "ovgr" may be indicated as OverlayGroupEntry and may include, for example, the following as in Table 27.

TABLE 27

```
class OverlayGroupEntry( ) extends
SampleGroupDescriptionEntry(' ovmm' ) {
   OverlayInfoStruct( );
}
```

In Table 27, an OverlayinfoStruct( ) ≙ may include overlay metadata applied to samples included in a group and may be the same as shown in Table 21. In addition, ovmm may be replaced with ovgr.

Figure 61:
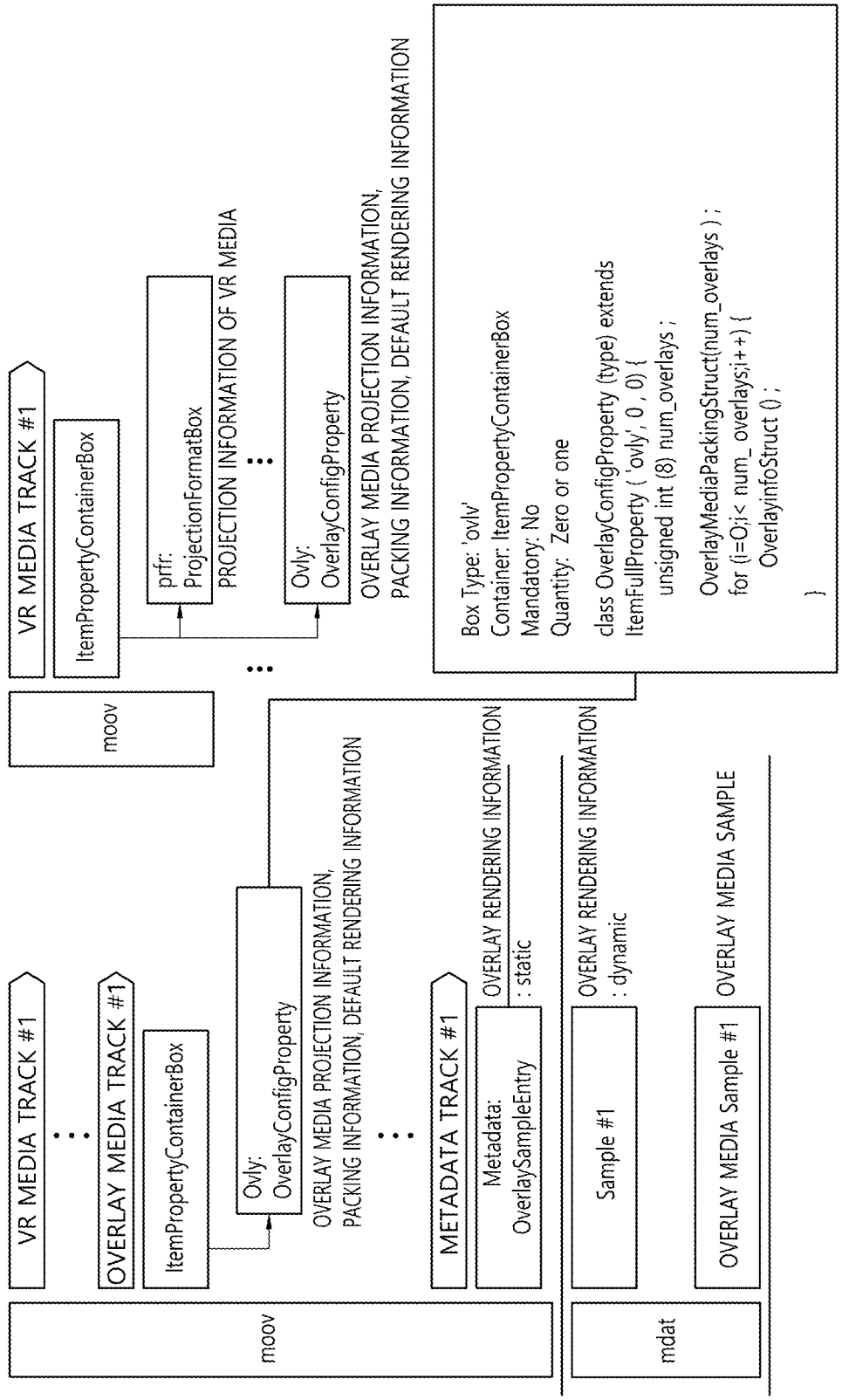
FIG. 61 shows examples of overlay media packing, projection and default rendering signaling.

FIG. 61 shows examples of overlay media packing, projection and default rendering.

Figure 62:
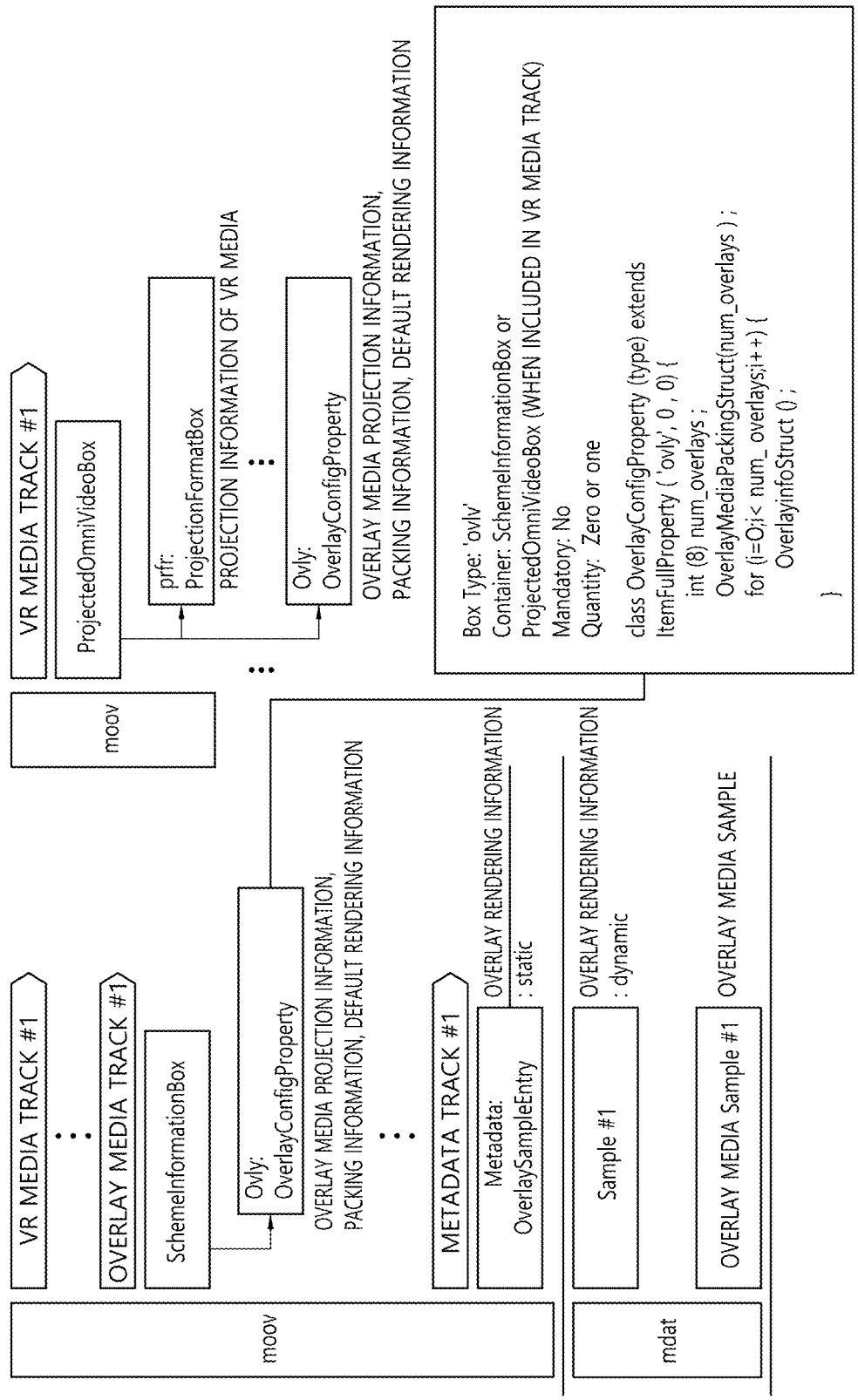
FIG. 62 shows examples of overlay media packing, projection and default rendering signaling.

FIG. 62 shows other examples of overlay media packing, projection and default rendering.

FIG. 61 may show a case where an overlay media track is an image, and FIG. 62 may show a case where an overlay media track is a video.

In an embodiment, an overlay media track may include the above-described OverlayConfigBox in a sample entry and, at the same time, include a SampleToGroupBox, of which a grouping_type field has a value of "ovgr", and an OverlayGroupEntry( ). In this case, overlay metadata included in overlay media samples associated with OverlayGroupEntry( ) may be applied.

Alternatively, in order to specify overlay default rendering information in an overlay media track, in addition to projection nd packing information, a num_overlay field indicating the number of overlays existing in the track may be defined in an OverlayConfigProperty of FIG. 61 or an OverlayConfigBox of FIG. 62, a method is changed to deliver as a parameter, and an OverlayInfoStruct( ) may be added. In this case, an OverlayMediaPackingStruct included in overlay metadata may include the following as in Table 28.

TABLE 28

```
aligned(8) class OverlayMediaPackingStruct(num_overlays) {
   unsigned int(5) num_regions;
   for(i = 0; i < num_regions; i++) {
      unsigne int(8) overlay_region_id[i];
      unsigned int(16) overlay_region_width[i];
      unsigned int(16) overlay_region_height[i];
      unsigned int(16) overlay_region_top[i];
      unsigned int(16) overlay_region_left[i];
   }
   for (i = 0; i < num_overlays; i++) {
      unsigned int(16) overlay_source_id[i];
      unsigned int(5) projection_type[i];
      unsigned int(3) packing_type;
      unsigned int(8) overlay_region_id[i];
      if(packing_type != 0) {
         unsigned int(1) guard_band_flag[i];
         if (packing_type == 1)
            TextureAtlasPacking(i);
         else if (packing_type == 2)
            RectRegionPacking(i);
         else if (packing_type == 3)
            PolygonRegionPacking(i);
         if (guard_band_flag[i])
            GaurdBand(i);
      }
   }
}
```

In Table 28, fields may correspond to the respective fields of Table 3 and indicate the same information, but aspects of the present invention are not limited thereto.

An overlay according to an embodiment may be used to add VR media or 360 media information (supplement information), advertisement, logo, etc. In addition, an overlay can be added to a 360-degree actual environment viewed see-through, instead of a 360-degree video/image, not just in a VR media but also in Augmented Reality (AR)/Mixed Reality (MR), and thus it is possible to expand to AR/MR overlay signaling.

An embodiment may provide a method for specifying overlay rendering related metadata in a VR media or a 360 media and a signaling method, and an overlay media track may be constructed in such a way as to signal rendering information (location, size, property, interaction information, etc.) over time. In addition, in an embodiment, an overlay media track may include projection, packing, and default rendering information, and a metadata track may include rendering information over time, as described above.

Figure 63:
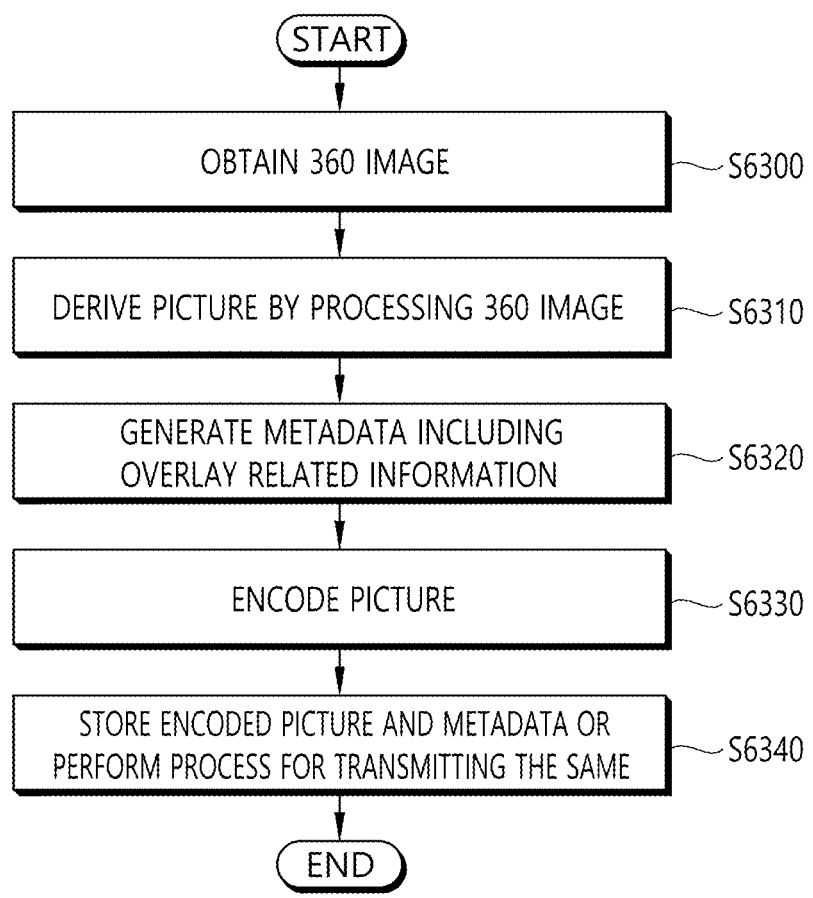
FIG. 63 schematically shows a 360 video processing method performed by a 360 video transmission apparatus according to the present invention.

FIG. 63 schematically shows a method for processing 360 video data by a 360 video transmission apparatus according to an embodiment of the present invention. The method disclosed in FIG. 63 may be performed by the 360 video transmission apparatus disclosed in FIG. 5 or FIG. 16.

Referring to FIG. 63, a 360 video transmission apparatus acquires a 360 video (S6300). Here, the 360 video may be a video/image captured by at least one camera. Alternatively, a part or an entire of the 360 video may be a virtual image generated by a computer program or the like. A 360 image may be an independent still image or may be a part of a 360 video.

The 360 video transmission apparatus derives a picture by processing the 360 video/image (S6310). The 360 video transmission apparatus may derive a 2D-based picture through the above-described various projection formats, region-wise packing process, etc. The derived picture may correspond to a projected picture or may correspond to a packed picture (when where region-wise packing process has been applied).

The 360 video transmission apparatus generates metadata related to the 360 video/image (S6320). Here, the metadata may include the fields described above in the present specification. The fields may be included boxes of various levels or may be included as data in an additional track in a file. For example, the metadata may include a part or an entire of the above-described field/information. For example, the metadata may include the above-described overlay related metadata (including information/fields).

For example, the overlay related metadata may include overlay packing information.

Here, the overlay packing information may include region-wise packing for an overlay. Whether region-wise packing has been applied to the overlay may be indicated by a region_wise_packing flag field, and a region_wise_packing_flag field may be included in an OverlayPackingConfigBox.

In this case, an index of a layer including the overlay among packed image laers may be indicated by an overlay_layer_index field, and the number of packed regions may be indicated by the num_regions field. In addition, a width value and a height value of a projected image may be indicated by a proj_picture_width field and a proj_picture_height field, and a width value and a height value of a packed image may be indicated by a packed_picture_width field and a packed_picture_height field, In addition, in the case where a region-wise packing type is indicated by a packing_type field, if the packing_type field has a value of 0, rectangular region-wise packing may be indicated. Location/size information of the corresponding overlay in the projected image may be indicated by a proj_reg_width field, a proj_reg_height field, a proj_reg_top field, and a proj_reg_left field. A detailed description thereof has been provided in conjunction with Table 1.

Alternatively, the overlay packing information may include information on an overlay media packing type and may be indicated by the packing type field. Here, the packing_type field may be included in OverlayMediaPackingStruct and overlay related metadata may include the OverlayMediaPackingStruct.

Here, if the packing type field has a value of 0, it may indicate that integrated packing is not applied (none), if the packing_type field has a value of 1, it may indicate that texture atlas packing is applied, if the packing_type field has a value of 2, it may indicate that rectangular region-wise packing is applied, and, if the packing_type field has a value of 3, it may indicate that polygonal region-wise packing is applied. That is, information as to whether region-wise packing is applied to an overlay may be indicated by the packing type field, and information as to whether a texture atlas is applied to the overlay may be also indicated by the packing_type field.

For example, overlay related metadata may include information used to specify an overlay in a decoded picture in the case where the overlay is packed. That is, the overlay related metadata may include location information, size information, and transform_type information of the overlay in the decoded picture. The location information and the size information of the overlay may be indicated by a proj_reg_width field, aproj_reg_height field, a proj_reg_top field, and a proj_reg_left field on the basis of a projected picture in the case where region-wise packing is applied to the overlay, and may be indicated by a packed_reg_width field, a packed_reg_height field, a packed_reg_top field, and a packed_reg_left field on the basis of a packed picture. Such information may be included in RectRegionPacking, and the RectRegionPacking may be included in an OerlayMediaPackingStruct.

Alternatively, the location information and the size information of the overlay may be indicated by a width field, a height field, a top field, and the left field in TextureAtlasPacking in the case where texture atlas is applied to the overlay. Such information may be included in TextureAtlasPacking, and the TextureAtlasPacking may be included in an OerlayMediaPackingStruct.

Here, the transform_type information of the overlay may be referred to as rotation value and may correspond to a case where region-wise packing is applied to the overlay and/or a case where texture atlas is applied to the overlay. The transform_type information of the overlay may be indicated by a transform_type field, and the transform_type may be included inRectRegionPacking and/or RectRegionPacking.

The transform type information may indicate none if the transform_type field has a value of 0, the transform type information may indicate may indicate mirroring horizontally if the transform_type field has a value of 1, the transform type information may indicate may indicate rotation by 180 degrees if the transform_type field has a value of 2, the transform type information may indicate may indicate mirroring horizontally after rotation by 180 degrees if the transform_type field has a value of 3, the transform type information may indicate may indicate mirroring horizontally after rotation by 90 degrees if the transform_type field has a value of 4, the transform type information may indicate may indicate rotation by 90 degrees if the transform_type field has a value of 5, the transform type information may indicate may indicate mirroring horizontally after rotation if the transform_type field has a value of 6, and the transform type information may indicate may indicate rotation by 270 degrees if the transform_type field has a value of 7. That is, the transform_type information may indicate a transform applied to the overlay among the above-described transforms. A detailed description thereof has been provided above in conjunction with Tables 3, 4, and 5.

For example, overlay related metadata may include overlay location related information, and the overlay location related information may include overlay projection information. The overlay related metadata may include OverlayPosStruct, and the overlay projection information may be included in the OverlayPosStruct. In other words, the overlay location related information may include information on a projection kind or type of an overlay and may include location information of the overlay in the projection kind or type. Here, the projection kind or type may be referred to as a location or space where the overlay is placed. This may be indicated by a region_type field, and the region_type field may be included in OverlayPosStruct. Here, if the region_type field has a value of 0, it may indicate that the overlay is located at a user's viewport, if the region_type field has a value of 1, it may indicate that the overlay is located on a sphere, and, if the region_type field has a value of 2, it may indicate that the overlay is located in a 3D space.

For example, in the case where an overlay is located at a user's viewport, location and size information of an overlay which is a rectangular surface may be indicated by a rect_left_percent field, a rect_top_percent field, a rect_width_percent field, and a rect_height_percent field. In addition, an order field may indicate a drawing order in the case where the overlay overlaps other overlays. These fields may be included in ViewportOverlayRegion, and the ViewportOverlayRegion may be included in OverlayPosStruct.

For example, in the case where an overlay is placed on a sphere, a proj_shape field may indicate a projected shape, the proj_shape field having a value of 0 may indicate that projection is not applied (none), the proj_shape field having a value of 1 may indicate that rectangular projection is applied, the proj_shape field having a value of 2 may indicate polygonal projection is applied. That is, in the case where an overlay is placed on a sphere, information as to whether to be projected in a rectangular shape in a projected picture may be indicated by the proj_shape field. If the projected shape is rectangular (proj_shape==1), location information of the overlay in the projected picture may be indicated by a proj_reg_top_percent field, a proj_reg_left_percent field, a proj_reg_width_percent field, and a proj_reg_height_percent field. These fields may be included in SphereOverlayRegion, and the SphereOverlayRegion may be included in OverlayPosStruct.

For example, in the case where an overlay is placed in a 3D space inside a sphere, it is assumed that an overlay media is rectangular and width information and height information with reference to a surface based on the Y axis and Z axis may be indicated by a width field and a height field. These fields may be included in 3DOverlayRegion, and the 3DOverlayRegion may be included in OverlayPosStruct. A detailed description thereof has been provided above in conjunction with Tables 13 to 16.

For example, overlay related metadata may be classified into timed metadata changeable over time with respect to an overlay and static metadata unchangeable over time. Here, the timed metadata may be stored in a sample, and the static metadata may be stored in a sample entry. Here, the sample entry may include OverlaySampleEntry and may inherit MetadataSampleEntry and thereby be capable of calling OverlyConfigBox.

Or, the overlay related metadata may include an OverlayconfigBox, and the static metadata may be included in the OverlayconfigBox. In addition, the overlay related metadata may include a ProjectedOmniVideoBox and/or a SchemeInformationBox, and the Overlayconfigbos may be included in the ProjectedOmniVideoBox and/or the SchemeInformationBox. This may correspond to a case where an overlay is a video.

Or, the overlay related metadata may include OverlayConfigProperty, and the static metadata may be included in the OverlayConfigProperty. In addition the overlay related metadata may include an ItemPropertyContainerBox, and OverlayconfigProperty may be included in the ItemPropertyContainerBox. This may correspond to a case where an overlay is an image. A detailed description thereof has been provided above with reference to FIGS. 39, 40, 53, 61, and 62, For example, the overlay related metadata may include overlay rendering information. Here, the overlay rendering information may include rendering property information.

Here, the overlay rendering information may include information opacity of an overlay. Whether transparency of an entire overlay surfaceis specified may be indicated by an opacity_info_flag field, and information on a transparency level or a transparency level value may be indicated by an opacity field.

Here, the overlay rendering information may include information on a blending_type to be applied to the overlay. Whether blending to be applied for overlay composition is specified may be indicated by a blending_flag field, and a blending type may be indicated by the blending_type field.

Here, the blending_type field having a value of 1 may indicate source-over, the blending_type field having a value of 2 may indicate source_atop, the blending_type field having a value of 3 may indicate source in, the blending_type field having a value of 4 may indicate source_out, the blending_type field having a value of 5 may indicate dest_atop, the blending_type field having a value of 6 may indicate dest_over, the blending_type field having a value of 7 may indicate dest_in, the blending_type field having a value of 8 may indicate dest_out, the blending_type field having a value of 9 may indicate clear, and the blending_type field having a value of 10 may indicate xor, and a default setting may be source_over indicated by the beldnig_type field having a value of 1. Here, source_over may mean that an overlay source is locationed on a destination. These fields and information may be included in OverlayRenderStruct and may be included in OverlayRenderStructsms overlay related metadata. A detailed description thereof has been provided in conjunction with Table 17.

For example, the overlay related metadata may include overlay other rendering information, and the overlay other rendering information may be referred to as overlay miscellaneous information. The overlay other rendering information may include information on supporting of an overlay border, information on supporting of various overlay shapes, information on supporting of billboard, and information on a specific point indicated by an overlay location as a target and an overlay are located differently, and a detailed information thereof has been provided in conjunction with Table 18.

For example, the overlay related metadata may include overlay interaction information. The overlay related metadata may include OverlayInteractionStruct, and the overlay interaction information may be included in the OverlayInteractionStruct.

Here, the overlay interaction information may include at least one of the following: information on whether on/off switching of an overlay is allowed, information on whether the overlay can be moved by a user, information on whether depth of the overlay can be changed, information on whether the overlay can be rotated, information on whether the overlay can be resized.

For example, the information on whether on/off switching of the overlay is allowed may be indicated by a switch_on_off_flag field, and, if allowed, an allowed range or level information may be additionally included in the overlay related metadata. The information on whether the overlay can be moved by a user may be indicated by a position_flag field, and if so, information on an elevation range and an azimuth range may be additionally included in the overlay related metadata. The information on whether depth of the overlay can be changed may be indicated by a depth_flag field, and, if so, a depth range may be additionally included in the overlay related metadata. The information on whether the overlay can be rotated may be indicated by a rotation_flag field, and, if so, information on an rotatable range about each axis may be additionally included in the overlay related metadata. The information on whether the overlay can be resized may be indicated by a resize_flag field, and, if so, a resizing-allowed range may be additionally included in the overlay related metadata. The above-described fields and information may be included in OverlayInteractionStruct. A detailed description thereof has been provided in conjunction with Table 19.

For example, the overlay related metadata may further include group information indicating a picture to be rendered together with an overlay. Here, the picture to be rendered together with the overlay may be referred to as a main VR media, and a main VR media track and an overlay media track including the overlay may be grouped, and a corresponding track group may be indicated by the TrackGroupTypeBox. Here, tracks in a track group may have the same value in a track_group_id field. Here, one or more overlay media tracks may be included in a group, and one or more overlays may be rendered together with a main VR media. A detailed description thereof has been provided above with reference to FIG. 41.

The 360 video transmission apparatus encodes the derived picture (S6330). The 360 video transmission apparatus may encode the 2D picture and output the encoded 2D picture in a bit stream format.

The 360 video transmission apparatus may encode the above-described overlay texture (media) according to a type of texture (media) to be overlaid and output the encoded overlay texture (media). In this case, the encoded overlay texture (media) may be included in 360 image/video data which will be described later on.

Alternatively, the texture (media) to be overlaid may be pre-stored in a 360 video reception apparatus and may be transmitted separately through a network.

The 360 video transmission apparatus may perform a process for storing and transmitting the encoded picture and the metadata (S6340). The 360 video transmission apparatus may generate data related to the encoded picture and/or 360 image/video data based on the metadata. In the case where a series of pictures of images forming a 360 video is encoded, the 360 video data including the encoded pictures may be generated. The picture may include a main media (background media), as described above.

The 360 video transmission apparatus may encode the overlay media according to a type of an overlay media and output the encoded overlay media. In this case, the encoded overlay media may be included in 360 image/video data which will be described later on. For example, the 360 image/video data may store the main media and/or the overlay media in a track unit.

Or, the overlay media may be pre-stored in the 360 video reception apparatus and may be signaled to the 360 video reception apparatus through a network separately from the 360 image/video data. Or, the overlay media may be signaled to the 360 reception apparatus from a separate entity through a network.

The 360 video transmission apparatus may encapsulate data related to the encoded picture(s) and/or the metadata in a file format or the like, and the 360 video transmission apparatus may encapsulate 360 video data and/or the metadata in a file format, such as ISOBMFF and CFF, or process the same in other DASH segment format or the like so as to store or transmit the 360 video data and/or the metadata. The 360 video transmission apparatus may include the metadata in a file format. For example, the metadata may be included in boxes of various levels in the ISOBMFF file format or may be included as data in an additional track in a file.

In addition, the 360 video transmission apparatus may encapsulate the metadata itself into a file. The 360 video transmission apparatus may perform a transmission process on the encapsulated 360 video data according to a file format. The 360 video transmission apparatus may process the 360 video data according to an arbitrary transmission protocol. The transmission process may include a process for delivery through a broadcasting network or a process for delivery through a communication network such as a broadband. In addition, the 360 video transmission apparatus may perform a transmission process on the metadata. The 360 video transmission apparatus may transmit the transmission-processed 360 image/video data (including the metadata) through a broadcasting network and/or a broadband.

Figure 64:
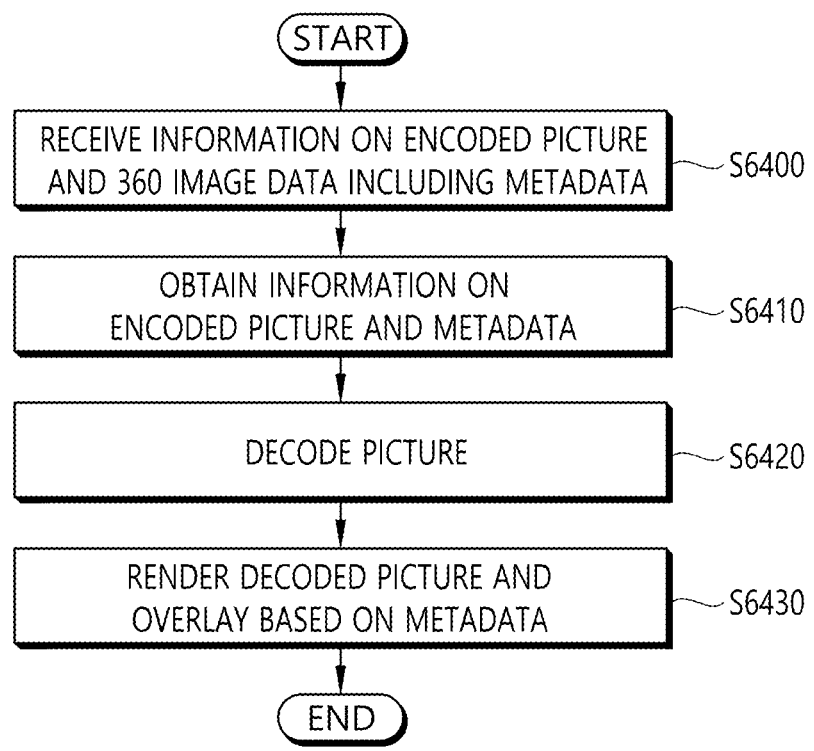
FIG. 64 schematically shows a 360 video processing method performed by a 360 video reception apparatus according to the present invention.

FIG. 64 schematically shows a method for processing 360 video data by a 360 video reception apparatus according to the present invention. The method disclosed in FIG. 64 may be performed by the 360 video reception apparatus disclosed in FIG. 6 or FIG. 17.

Referring to FIG. 64, the 360 video reception apparatus receives 360 image/video data (signal) (S6400). The 360 video reception apparatus may receive 360 image/video data, signaled from a 360 video transmission apparatus, through a broadcasting network. The 360 image/video data may include information on an encoded picture(s) of a 360 image/video and the metadata. In addition, the 360 video reception apparatus may receive 360 image/video data through a communication network, such as a broadband, or through a storage medium.

The 360 video reception apparatus obtain information on the encoded picture and the metadata (S6410). The information on the encoded picture and the metadata may be obtained through file/segment decapsulation of the 60 image/video data or the like.

The metadata may include the fields described above in the present specification. The fields may be included in boxes of various levels or may be included as data in an additional track of a file. For example, the metadata may include a part of entire of the fields/information described in Tables 1 to 28. For example, the metadata may include the above-described overlay related metadata (including information/field).

For example, the overlay related metadata may include overlay packinig information.

Here, the overlay packing information may include information as to whether region-wise packing is applied to an overlay. The information as to whether region-wise packing is applied to an overlay may be indicated by a region_wise_packing_flag field, and the region_wise_packing_flag field may be included in OverlayPackingConfigBox.

In this case, an index of a layer including an overlay among packed image layers may be indicated by an overlay_layer_index field, and the number of packed regions may be indicated by a num_regions field. In addition, a width value and a height value of a projected image may be indicated by a proj_picture_width field and a proj_picture_height field, and a width value and a height value of a packed image may be indicated by a packed_picture_width field and a packed_picture_height field.

In addition, a region-wise packing type may be indiated by a packing_type field. In this case, the packing_type field has a value of 0, rectangular region-wise packing may be indicated. Location/size information of a corresponding overlay in a projected image may be indicated by a proj_reg_width field, a proj_reg_height field, a proj_reg_top field, and a proj_reg_left field. A detailed description thereof has been described above in conjunction with Table 1.

Alternatively, the overlay packing information may include information on a overlay media packing type and may be indicated by a packing type field. Here, the packing type field may be included in OverlayMediaPackingStruct, and overlay related metadata may include the OverlayMediaPackingStruct.

Here, the packing type field having a value of 0 may indicate that integrated packing is not applied (none), the packing_type field having a value of 1 may indicate that texture atlas packing is applied, the packing_type field having a value of 2 may indicate that rectangular region-wise packing is applied, abd the packing_type field having a value of 3 may indicate polygonal region-wise packing is appleild. That is, information as to whether to apply regio-wise packing to an overlay may be indictated by the packing_type field, and information as to whether to apply texture atlas to an overlay may be also indicated by the packing_type field.

For example, in the case where an overlay is packed, overlay related metadata may include information for specifying the overlay in a decoded picture. That is, the overlay related metadata may include location information, size information, and transform type information of the overlay in the decoded picture. Here, in the case where region-wise packing is applied to the overlay, the location information and the size information of the overlay may be indicated by a proj_reg_width field, a proj_reg_height field, a proj_reg_top field, and a proj_reg_left field on the basis of a projected picture and may be indicated by a packed_reg_width field, a packed_reg_height field, a packed_reg_top field, and a packed_reg_left field on the basis of a packed picture. Such information may be included in RectRegionPacking, and the RectRegionPacking may be included in OverlaymediaPackingStruct.

Or, in the case where texture atlas is applied to an overlay, location information and size information of the overlay may be indicated by a width field, a height field, a top field, and a left field in TextureAtlasPackinig. Such information may be included in the TextureAtlasPacking, and the TextureAtlasPacking may be included in the OverlaymediaPackingStruct.

Here, the transform type information of the overlay may be referred to as a rotation value and may correspond to a case where region-wise packing is applied to the overlay and/or a case where texture atlas is applied to the overlay. The transform type information of the overlay may be indicated by a transform_type field, and the transform_type may be included inRectRegionPacking and/or RectRegionPacking.

The transform type information may be as indicate none if the transform_type field has a value of 0, the transform type information may indicate may indicate mirroring horizontally if the transform_type field has a value of 1, the transform type information may indicate may indicate rotation if the transform_type field has a value of 2, the transform type information may indicate may indicate mirroring horizontally after rotation by 180 degrees if the transform_type field has a value of 3, the transform type information may indicate may indicate mirroring horizontally after rotation by 90 degrees if the transform_type field has a value of 4, the transform type information may indicate may indicate rotation by 90 degrees if the transform_type field has a value of 5, the transform type information may indicate may indicate mirroring horizontally after rotation by 270 degrees if the transform_type field has a value of 6, and the transform type information may indicate may indicate rotation by 270 degrees if the transform_type field has a value of 7. That is, the transform type information may indicate a transform applied to the overlay among the above-described transforms. A detailed description thereof has been provided above in conjunction with Tables 3, 4, and 5.

For example, overlay related metadata may include overlay location related information, and the overlay location related information may include overlay projection information. The overlay related metadata may include Overlay-PosStruct, and the overlay projection information may be included in the OverlayPosStruct. In other words, the overlay location related information may include information on a projection kind or type of an overlay and may include location information of the overlay in the projection kind or type. Here, the projection kind or type may be referred to as a location or space where the overlay is placed. This may be indicated by a region type field, and the region type field may be included in OverlayPosStruct. Here, if the region type field has a value of 0, it may indicate that the overlay is located at a user's viewport, if the region type field has a value of 1, it may indicate that the overlay is located on a sphere, and, if the region type field has a value of 2, it may indicate that the overlay is located in a 3D space.

For example, in the case where an overlay is located at a user's viewport, location and size information of an overlay which is a rectangular surface may be indicated by a rect_left_percent field, a rect_top_percent field, a rect_width_percent field, and a rect_height_percent field. In addition, an order field may indicate a drawing order in the case where the overlay overlaps other overlays. These fields may be included in ViewportOverlayRegion, and the ViewportOverlayRegion may be included in OverlayPosStruct.

For example, in the case where an overlay is placed on a sphere, a proj_shape field may indicate a projected shape, the proj_shape field having a value of 0 may indicate that projection is not applied (none), the proj_shape field having a value of 1 may indicate that rectangular projection is applied, the proj_shape field having a value of 2 may indicate polygonal projection is applied. That is, in the case where an overlay is placed on aphere, information as to whether to be projected in a rectangular shape in a projected picture may be indicated by the proj_shape field. If the projected shape is rectangular (proj_shape=1), location information of the overlay in the projected picture may be indicated by a proj_reg_top_percent fuekd, a proj_reg_left_percent field, a proj_reg_width_percent field, and a proj_reg_height_percent field. These fields may be included in SphereOverlayRegion, and the SphereOverlayRegion may be included in OverlayPosStruct.

For example, in the case where an overlay is placed in a 3D space inside a sphere, it is assumed that an overlay media is rectangular and width information and height information with reference to a surface based on the Y axis and Z axis may be indicated by a width field and a height field. These fields may be included in 3DOverlayRegion, and the 3DOverlayRegion may be included in OverlayPosStruct. A detailed description thereof has been provided above in conjunction with Tables 13 to 16.

For example, overlay related metadata may be classified into timed metadata changeable over time with respect to an overlay and static metadata unchangeable over time. Here, the timed metadata may be stored in a sample, and the static metadata may be stored in a sample entry. Here, the sample entry may include OverlaySampleEntry and may inherit MetadataSampleEntry and be thereby capable of calling OverlyConfigBox.

Or, the overlay related metadata may include an OverlayconfigBox, and the static metadata may be included in the OverlayconfigBox. In addition, the overlay related metadata may include a ProjectedOmniVideoBox and/or a SchemeInformationBox, and the Overlayconfigbos may be included in the ProjectedOmniVideoBox and/or the SchemeInformationBox. This may correspond to a case where an overlay is a video.

Or, the overlay related metadata may include OverlayConfigProperty, and the static metadata may be included in the OverlayConfigProperty. In addition the overlay related metadata may include an ItemPropertyContainerBox, and OverlayconfigProperty may be included in the ItemPropertyContainerBox. This may correspond to a case where an overlay is an image. A detailed description thereof has been provided above with reference to FIGS. 39, 40, 53, 61, and 62, For example, the overlay related metadata may include overlay rendering information. Here, the overlay rendering information may include rendering property information.

Here, the overlay rendering information may include information opacity of an overlay. Whether transparency of an entire overlay surfaceis specified may be indicated by an opacity_info_flag field, and information on a transparency level or a transparency level value may be indicated by an opacity field.

Here, the overlay rendering information may include information on a blending type to be applied to the overlay. Whether blending to be applied for overlay composition is specified may be indicated by a blending_flag field, and a blending type may be indicated by the blending_type field. Here, the blending_type field having a value of 1 may indicate source-over, the blending_type field having a value of 2 may indicate source_atop, the blending_type field having a value of 3 may indicate source in, the blending_type field having a value of 4 may indicate source out, the blending_type field having a value of 5 may indicate dest_atop, the blending_type field having a value of 6 may indicate dest_over, the blending_type field having a value of 7 may indicate dest_in, the blending_type field having a value of 8 may indicate dest_out, the blending_type field having a value of 9 may indicate clear, and the blending_type field having a value of 10 may indicate xor, and a default setting may be source_over indicated by the beldnig_type field having a value of 1. Here, source_over may mean that an overlay source is locationed on a destination. These fields and information may be included in OverlayRenderStruct and may be included in OverlayRenderStructsms overlay related metadata. A detailed description thereof has been provided in conjunction with Table 17.

For example, the overlay related metadata may include overlay other rendering information, and the overlay other rendering information may be referred to as overlay miscellaneous information. The overlay other rendering information may include information on supporting of an overlay border, information on supporting of various overlay shapes, information on supporting of billboard, and information on a specific point indicated by an overlay location as a target and an overlay are located differently, and a detailed information thereof has been provided in conujunction with Table 18.

For example, the overlay related metadata may include overlay interaction information. The overlay related metadata may include OverlayInteractionStruct, and the overlay interaction information may be included in the OverlayInteractionStruct.

Here, the overlay interaction information may include at least one of the following: information on whether on/off switching of an overlay is allowed, information on whether the overlay can be moved by a user, information on whether depth of the overlay can be changed, information on whether the overlay can be rotated, information on whether the overlay can be resized.

For example, the information on whether on/off switching of the overlay is allowed may be indicated by a switch_on_off_flag field, and, if allowed, an allowed range or level information may be additionally included in the overlay related metadata. The information on whether the overlay can be moved by a user may be indicated by a position_flag field, and if so, information on an elevation range and an azimuth range may be additionally included in the overlay related metadata. The information on whether depth of the overlay can be changed may be indicated by a depth_flag field, and, if so, a depth range may be additionally included in the overlay related metadata. The information on whether the overlay can be rotated may be indicated by a rotation_flag field, and, if so, information on an rotatable range about each axis may be additionally included in the overlay related metadata. The information on whether the overlay can be resized may be indicated by a resize flag field, and, if so, a resizing-allowed range may be additionally included in the overlay related metadata. The above-described fields and information may be included in OverlayInteractionStruct. A detailed description thereof has been provided in conjunction with Table 19.

For example, the overlay related metadata may further include group information indicating a picture to be rendered together with an overlay. Here, the picture to be rendered together with the overlay may be referred to as a main VR media, and a main VR media track and an overlay media track including the overlay may be grouped, and a corresponding track group may be indicated by the TrackGroupTypeBox. Here, tracks in a track group may have the same value in a track_group_id field. Here, one or more overlay media tracks may be included in a group, and one or more overlays may be rendered together with a main VR media. A detailed description thereof has been provided above with reference to FIG. 41.

The 360 video reception apparatus decodes a picture(s) based on information on the encoded picture (S6420). The decoded picture may correspond to a projected picture or may correspond to a packed picture (when region-wise packing is applied). The decoded picture may be included in a main media (background media). Alternatively, the decoded picture may include an overlay media.

The 360 video reception apparatus may decode the overlay texture (media) according to a type of texture (media) to be overlaid. In this case, the encoded overlay texture (media) may be included in 360 image/video data which will be described later on.

Or, the overlay media may be pre-stored in the 360 video reception apparatus or may be signaled to the 360 video reception apparatus through a network separately from 360 image/video data. Or, the overlay media may be signaled to the 360 video reception apparatus from a separate entity through a network.

In some cases, the 360 video reception apparatus may decode the picture based on the metadata. This may include, for example, a case where decoding is performed on some regions of a picture in which viewports are located or a case where changing a viewport or decoding of a different specific picture at a location linked to an overlay is required.

The 360 video reception apparatus renders the decoded picture and overlay based on the metadata (S6430). The 360 video reception apparatus may render the decoded picture and overlay by processing the same based on the metadata. In this case, the decoded picture may bee rendered in a 3D surface through a process such as reprojection, as described above. The overlay may be rendered at a location, such as a viewport, a 3D surface, and a 3D space, based on the metadata according to the above-described overlay type.

The above-described steps may be omitted in some embodiments or may be replaced with other steps of performing similar/identical operations.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

The above-described embodiments of the present invention may be applied to VR and AR. The above-described embodiments of the present invention may be implemented on the basis of a chipset, as below.

Figure 65:
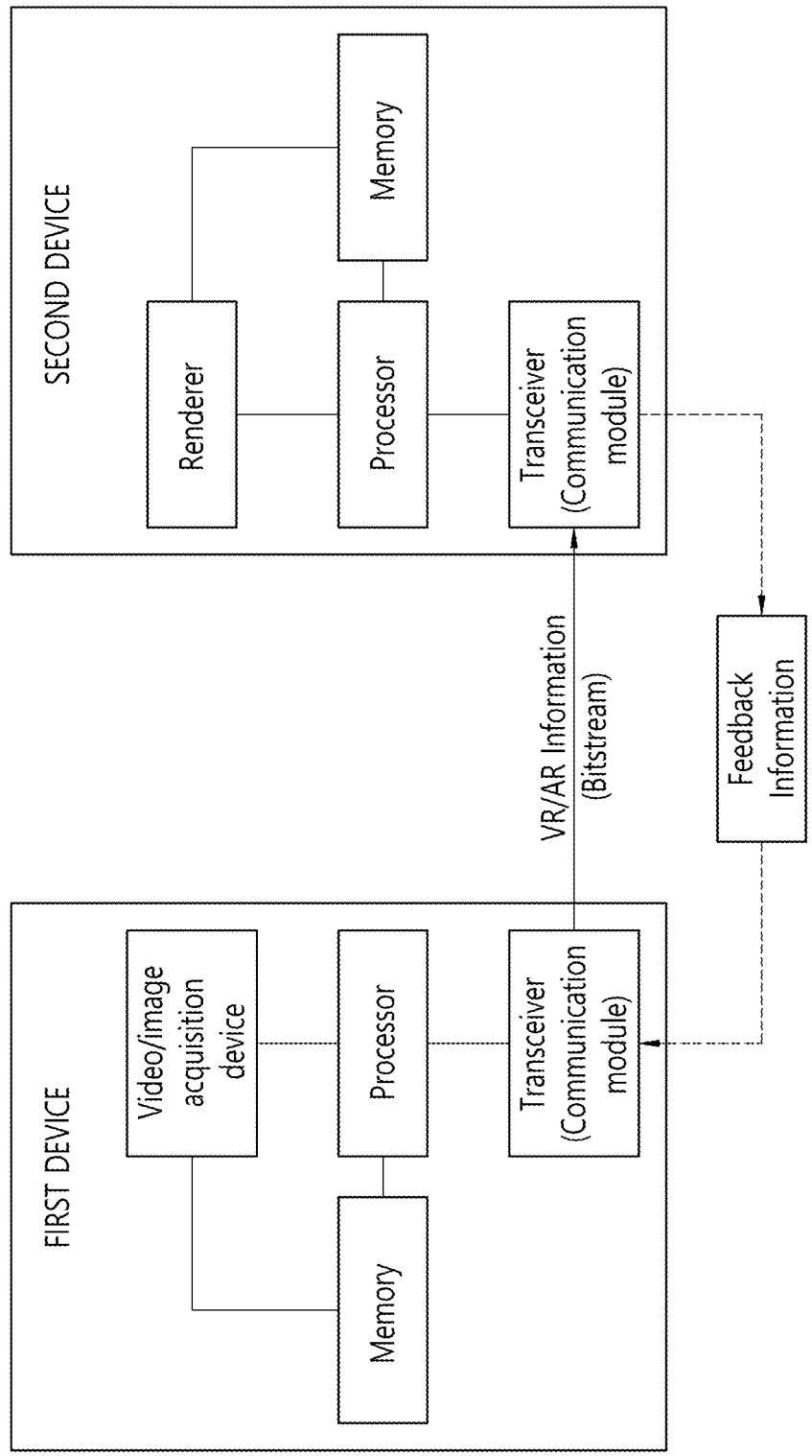
FIG. 65 exemplarily shows a device capable of supporting embodiments of the present invention.

FIG. 65 exemplary shows a device capable of supporting embodiments of the present invention. For example, the first device may include a transmission apparatus (ex. a 360 video transmission apparatus), and the second device may include a reception apparatus (ex. a 360 video reception apparatus). Technical features of the present specification for the transmission apparatus and the reception apparatus may be applied to the present embodiment.

For example, the first device may include a processor, a memory, a video/image acquisition device, and a transceiver. The processor may be configured to perform proposed functions, procedures, and/or methods that are described in the present specification. For example, the processor may be configured to control and/or perform the above-described procedure such as stitching, projection, (region-wise) packing, composition, (video/image) encoding, metadata generation and processing, etc. The processor may be configured to control and/or perform a 360 video/image acquisition procedure and a procedure for encapsulation and transmission processing of VR/AR information (ex., 360 video/image data, etc.). The processor may configure metadata disposed in embodiments of the present invention and control transmission of the metadata. The memory is operably coupled to the processor and store a diversity of information for operating the processor. The transceiver is operably coupled to the processor and transmit and/or receive a wireless/wired signal.

In addition, for example, the second device may include a processor, a memory, a transceiver, and a renderer. The renderer may be omitted and implemented as an external device. The processor may be configured to perform proposed functions, procedures, and/or methods that are described in the present specification. For example, the processor may be configured to control and/or perform the above-described procedure such as acquisition and processing of meatadata, (video/image) decoding, (region-wise) unpacking, selection, composition, reprojection, and rendering. The processor may be configured to control and/or perform a procedure for decapsulation and reception processing of VR/AR information (ex. 360 video/image data, etc.). The processor may configure metadata disclosed in embodiments of the present invention and transmit the metadata. The memory is operably coupled to the processor and store a diversity of information for operating the processor. The transceiver is operably coupled to the processor and transmit and/or receive a wireless/wired signal.

In the present specification, a processor may include an application-specific integrated circuit (ASIC), a different chipset, a logic circuit and/or a data processing device. A memory may include a read-only memory (ROM), a random access memory (RAM), a flash memory, a memory card, a storage medium and/or a different storage device. A transceiver may include a baseband circuit for processing a radio frequency signal. In the case where an embodiment is implemented as software, technologies described in the present specification may be implemented as a module (ex., a procedure, a function, etc.) for performing functions described in the present specification. The module may be stored in the memory and executed by the processor. The memory may be implemented inside the processor. Alternatively, the memory may be implemented outside the processor and may be communicatively connected to the processor using any of various means well known in the related technical fields.

The first device may be a base station, a network node, a transmitting terminal, a receiving terminal, a wireless device, a wireless communication device, a vehicle, a vehicle having a self-driving function, a connected car, an Unmanned Aerial Vehicle (UAV), an artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or a financial transaction device), a security device, a climate/environment device, a 5G service related device, or any other device related to the fourth industrial revolution fields.

The second device may be a base station, a network node, a transmitting terminal, a receiving terminal, a wireless device, a wireless communication device, a vehicle, a vehicle having a self-driving function, a connected car, an Unmanned Aerial Vehicle (UAV), an artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or a financial transaction device), a security device, a climate/environment device, a 5G service related device, or any other device related to the fourth industrial revolution fields.

For example, a terminal may include a mobile phone, a smart phone, a laptop computer, a digital broadcasting terminal, a personal digital assistants (PDA), a portable multimedia player (PMP), a navigation device, a slate PC, a table PC, an ultrabook, and a wearable device (for example, a watch-type terminal (smartwatch), a glass-type terminal (smart glass), and head mounted display (HMD)). For example, the HMD may be a display device to be worn on a user's head. For example, the HMD may be used to realize VR, AR, or MR.

For example, the drone may be an unmanned flying object capable of flying in accordance with a radio control signal. For example, the VR device may include a device capable of realizing a virtual reality object or background. For example, the AR device may include a device capable of realizing AR by connecting a virtual reality object or background to a reality object or background. For example, the MR device may include a device capable of realizing MR by fusing a virtual reality object or background to a reality object or background. For example, the hologram device may include a device capable of realizing a 360-degree stereoscopic image by recording and reproducing stereoscopic information using interference of light which happens when two laser lights meet. For example, the public safety device may include an image relaying device or an imaging device that can be wrong on a user's body. For example, the MTC device and the IoT device may be a device that does not require a user's direct intervention or manipulation. For example, the MTC device and the IoT device may include a smartmeter, a bending machine, a temperature gauge, a smart lamp, a door lock, other various sensors, etc. For example, the medical device may be a device used to diagnose, treat, relieve, cure, or prevent diseases. For example, the medical device may be used to diagnose, treat, relieve, or amend injuries or disabilities. For example, the medical device may be a device used to inspect, replace, or transform a structure or function. For example, the medical device may be a device used to control pregnancy. For example, the medical device may include a diagnostic device, a surgical device, a (In Vitro) diagnostic device, a hearing aid, a treatment device, etc. For example, the security device may be a device installed to prevent a possible accident and maintain safety. For example, the security device may be a camera, a CCTV, a recorder, a blackbox, etc. For example, the fintech device may be a device capable of providing financial services such as mobile payment. For example, the fintech device may include a payment device, a Point of Sales (POS), etc. For example, the climate/environment device may include a device for monitoring or predicting climate/environment.

The first device and/or the second device may have one or more antennas. For example, an antenna may be configured to transmit and receive radio signals.

The above-described technical features according to the present invention may be applied to various services such as VR/AR. In addition, the above-described technical features according to the present invention may be performed through the fifth generation (5G) or next-generation communication. For example, data (ex. a video/image bitstream, metadata, etc.) output from a transmission device (ex, a 360 video transmission apparatus) may be transmitted to a reception device (ex. a 360 video reception apparatus) through 5G communication. In addition, a (VR/AR) image/video acquisition device may be provided outside and may transmit an obtained image/video to the transmission device through 5G communication. In addition, the transmission device and/or reception device according to the present invention may support various service scenarios through 5G communication.

Figure 66:
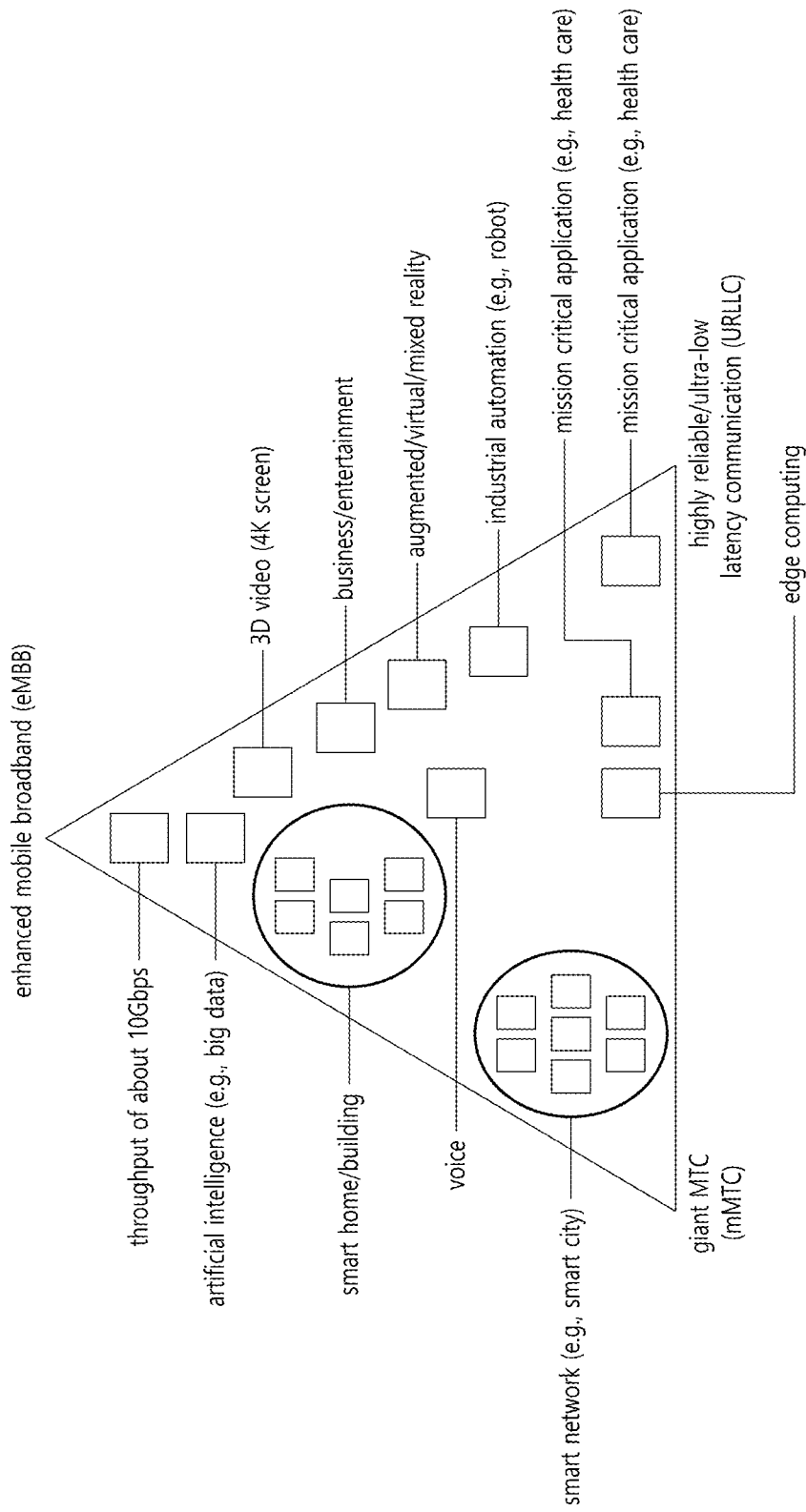
FIG. 66 shows 5G usage scenarios to which technical features of the present invention are applicable.

FIG. 66 shows an example of a 5G usage scenario to which the technical features of the present invention is applicable. The 5G usage scenario herein illustrated is merely exemplary, and the technical features of the present invention may be applied to any other 5G usage scenario which is not illustrated.

Referring to FIG. 66, three major requirement areas for 5G includes (1) an enhanced mobile broadband (eMBB) area, (2) a massive machine type communication (mMTC) area, and (3) ultra-reliable and low latency communications (URLLC) area. Some usage examples may require a plurality of areas for optimization, and another usage example may focus only on a single key performance indicator (KPI). 5G supports such various usage examples in a flexible and reliable way.

The eMBB focuses on data throughput, latency, user density, mobile broadband access capacity, and overall coverage enhancement. The eMBB aims at about a 10 gbps data rate. The eMBB makes it possible to surpass basic mobile internet accesses, and covers a plenty of bidirectional operations and medial and entertainment application in Could or in Virtual Reality (VR). Data is one of key driving power of 5G, and an 5G era may not provide an exclusive voice service for the first time. In 5G, a voice is expected to be processed by an application program by use of data connection provided by a communication system. A major cause of increased traffics is that a content size has increased and the number of application requiring a high data rate has increased. A streaming service (audio and video), an interactive video, and a mobile internet connection may become more widely used as a more number of devices is capable of accessing the Internet. These numerous applications requires connectivity to be turned on all the time in order to push real-time information and notification to a user. Cloud storages and applications are growing in number in mobile communication platforms and can be applied both to business and entertainment purpose. The Cloud storage is a special usage example that drives the growth of an uplink data rate. Also, 5G can be used for remote work on Cloud, and requires a far lower end-to-end latency so as to maintain excellent user experience when a tactile interface is used. In entertainment, for example, a cloud game and a video streaming is another key factor of increasing demands for mobile broadband capabilities. Entertainment includes a high mobility environment such as trains, cars, and airplanes and thus it is essential for smartphones and tablet PCs. Another usage example is Augmented Reality (AR) for entertainment and information search. Here, the AR requires a very low latency and an instantaneous data quantity.

The mMTC is designed to enable communication between multiple low-cost devices driven by batteries, and used to support applications such as smart gauge, distribution, a work field, and a human body sensor. The mMTC aims at battery life of about 10 years and millions of devices per 1 km2. The mMTC enables smooth connection of embedded sensors in every field, and it is the most highly expected 5G usage example. It is predicted that the number of IoT devices can reach 20.4 billions by 2020. Industrial IoT is one of areas performing a major role to enable a smart city, asset tracking, smart utility, and agricultural and security infrastructure.

The URLLC enables a device and a machine to communicate with a very high reliability, a very low latency, and high availability, and thus, it is ideal for vehicular communication, industrial control, factory automation, remote surgery, a smart grid, and a public safety application. The URLLC aims at latency of about 1 ms. The URLLC includes a new service that can change industries by use of an ultrareliable/low latency link, such as remote control of major infrastructure and self-driving vehicles. Level of reliability and latency is essential for smart grid control, industry automation, robot engineering, and drone control and adjustment.

Next, multiple usage examples included in a triangle shown in FIG. 66 will be described in more detail.

5G may supplement fiber-to-the home (FTTH) and cable-based broadband (or DOCSIS) as a means for providing a stream that is measured at hundreds Mbit/s to Gbit/s. This high speed may be required not just for Virtual Reality (VR) and Augmented Reality (AR), but also for delivery of TV with a resolution of 4K or higher (6K, 8K, or more). VR and AR applications include almost immersive sports games. For a specific application, a special network setting may be required. For example, for a VR game, a game company may need to integrate a core server with an edge network server of a network operator in order to minimize latency.

An automative is expected as a new important driving power for 5G, in addition with various usage examples for vehicular mobile communication. For example, entertainment for passengers require a high capacity and a high mobile broadband at the same time. It is because future users will keep expecting high-quality connection, regardless of their locations and speeds. Another usage example in the automative field is an AR dashboard. Through the AR dashboard, a driver is capable of identify an object in the dark, which is viewed over a front window. The AR dashboard displays information to be overlaid with respect to the object's distance and motion. In the future, a wireless module may enable vehicle-to-vehicle communication, information exchange between a vehicle and supporting infrastructure, and information exchange between an automative and other connected device (ex. a device carried around by a pedestrian). A safety system guides an alternative course of a behavior to allow a user to drive more safely, thereby reducing a possibility of accident. The nest step may be a remote control vehicle or an self-driving vehicle. This requires very reliable and very fast communication between different self-driving vehicles and/or between an automotive and infrastructure. In the future, an self-driving vehicle may take full charge of driving operations, and a driver may focus on a traffic error that cannot be identified by the vehicle. Technical requirements for the autonomous vehicles are ultra-low latency and ultraspeed reliability in such a way to increase traffic safety to an extent that cannot be archived by human being.

A smart city and a smart home, which are mentioned as a smart society, may be embedded in a high-density wireless sensor network. A distribution network of intelligence sensors may identify a condition for cost efficiency and energy efficiency of a city or a household. A similar setting may be set for each household. A temperature sensor, a window and heating controller, a theft alarm, and home appliances are wirelessly connected to each other. Many of these sensors typically require a low data rate, low power consumption, and low cost. However, for example, a real-time HD video may be required for a specific type of device for a monitoring purpose.

Consumption and distribution of energy including heat or gas is highly distributed and thus automated control of a distribution sensor network is required. A smart grid such sensors to connect each other using digital information and a communication technology, so that the sensors can collect information and operate according to the collected information. Such information may include behaviors of a supplier and a customer and thus enable the smart grid to improve efficiency, reliability, economicity, sustainable productivity, and distribution of fuels, such as electricity, in an automated way. The smart grid may be regarded as a different sensor network having a low latency.

In health related fields, there are many applications that take advantage of mobile communication. A communication system may support remote diagnosis that provides problem-orientated at a remote distance. This can help reduce distance related barriers and improves access to medical services in agricultural areas. This is also used for important diagnosis and for life saving in emergency situations. A mobile communication-based wireless sensor network may provide remote monitoring and sensors for parameters such as heart rate and blood pressure.

Significance of wireless and mobile communication is more and more growing in industrial application fields. It requires high costs to install and maintain wires. Thus, a possibility of replacement with a wireless link capable of reconfiguring a cable is seen as an attractive opportunity for many industrial fields. However, this requires wireless connection to operate with a latency, a reliability and a capability similar to those of the cable and to simplify management of the latency, the reliability, and the capability. A low latency and a very low error probability are new requirements for 5G.

Distribution and load tracking is an important usage example for mobile communication, which enables inventory and package tracking at any place using a location based information system. A usage example of the distribution and load tracking typically requires a low data rate but needs a wide range and reliable location information.

In addition, embodiments according to the present invention may be implemented to support eXtended Reality (XR). The XR is a term referring to all of Virtual Reality (VR), Augmented Reality (AR), and Mixed Reality (MR). A VR technology provides a reality object or background only as a CG image, an AR technology provides a virtually generated CG image overlaid on a reality object image, and an MR technology is a computer graphic technology for providing virtual objects mixed and linked to a real word.

The MR technology is similar to the AR technology in that a reality object and a virtual object are provided together. However, while the AR technology uses the virtual object to supplement the reality object, the MR technology uses the virtual object and the reality object equally.

An XR technology may be applied to Head-Mounted display (HMD), a Head-Up Display (HUD), a mobile phone, a tablet Pc, a laptop computer, a TV, a digital signage, etc., and a device to which the XR technology is applied may be referred to as an XR device. The XR device may include the first device and/or the second device which is described above.

The XR device may be connected to various services through a communication network based on 5G or the like.

Figure 67:
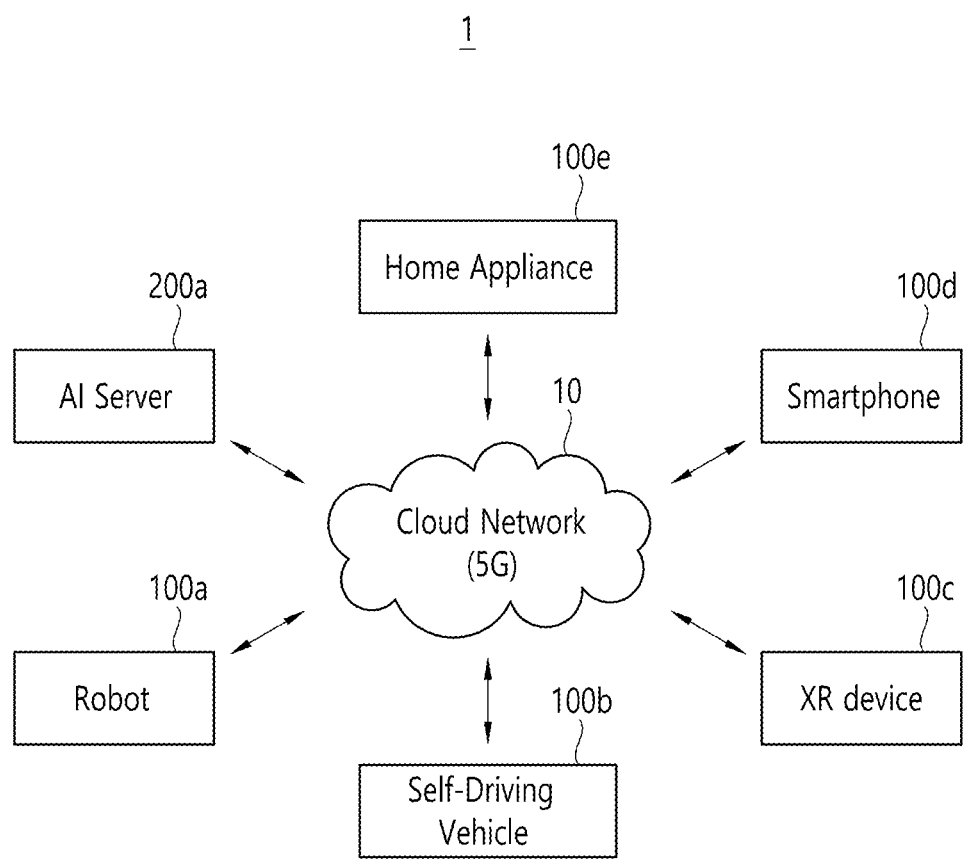
FIG. 67 shows a service system according to an embodiment of the present invention.

FIG. 67 shows a service system according to an embodiment of the present invention.

Referring to FIG. 67, an XR device 100c may be connected to at least one of the following through a network 10: an AI server 200a, a robot 100a, an self-driving vehicle 100b, a smart phone 100d, and a home appliance 100e. Here, the robot 100a, the self-driving vehicle 100b, the XR device 100c, the smart phone 100d, or a home appliance 100e to which an AI technology is applied may be referred to as an AI device.

The network 10 may include a wireless/wired communication network. The network 10 may include a Cloud network. The Cloud network may refer to a network forming a part of Cloud computing infrastructure or a network existing in the Cloud computing infrastructure. Here, the Cloud network may be constructed using a 3G network, a 4G or LongTerm Evolution (LTE) network, a 5G network, or the like.

The respective devices 100a to 100e and 200a forming the system 1 may be connected to each other through the Cloud network 10. In particular, the respective devices 100a to 100e and 200a may communicate each other through a base station and may communicate each other without a base station.

The AI server 200a may include a server for performing AI processing and a server performing calculation of big data.

The AI server 200a may be connected to at least one of the robot 100a, the self-driving vehicle 100b, the XR device 100c, the smart phone 100d, or the home appliance 100e through the network 10 and may help a part of AI processing of the connected AI devices 100a to 100e.

At this point, the AI server 200a may train an artificial neural network according to a machine algorithm, on behalf of the AI devices 100a to 100e, and may store a learning model or transmit the same to the AI devices 100a to 100e.

At this point, the AI server 200a may receive input data from the AI devise 100a to 100e, infer a result value for the received input data using a learning model, generate a response or a control command based on the inferred result value, and transmit the response or the control command to the AI devices 100a to 100e.

Alternatively, the AI devices 100a to 100e may infer a result value for input data using a learning model by itself and generate a response or a control command based on the inferred result value.

The XR device 100c may be implemented as a Head-Mount Display (HMD) equipped in a vehicle, a TV, a mobile phone, a smart phone, a computer, a wearable device, a home appliance, a digital signage, a vehicle, a fixed robot or a mobile robot, etc.

The XR device 100c may analyze 3D point cloud data or image data obtained through various sensors or from an external device, generate location data and property data for 3D points, so that information related to a surrounding space or a reality object can be obtained and an XR object can be rendered and output. For example, the XR device may output an XR object including additional information for a recognized by corresponding to the XR object to the recognized object.

The XR device 100c may perform the above-described operations using a learning model composed of at least one artificial neural network. For example, the XR device 100c may recognize a reality object in 3D point Cloud data or image data using a learning model and provide information corresponding to the recognized reality object. Here, the learning model may be trained by the XR device 100c or may be trained by an external device such as the AI server 200a or the like.

Here, the XR device 100c may generate a result using a learning model by itself and perform operation and may transmit sensor information to an external device such as the AI server 200a, receive a result generated based on the sensor information, and perform operation.

The robot 100a may include a guide robot, a transport robot, a cleaning robot, a wearable robot, an entertainment robot, a pet robot, an unmanned flying robot, a drone, etc.

The robot 100a may include a robot control module for controlling operation, and the robot control module may refer to a software module or a chip which implements the software module.

Using sensor information obtained from various sensors, the robot 100a may obtain state information of the robot 100a, detect (recognize) a surrounding environment and an object, generate map data, determine a moving path and a travel plan, determine a response to user interaction, or determine an operation.

Here, in order to determine a moving path and a travel plan, the robot 100a may utilize sensor information obtained by at least one sensor among a lidar, a radar, and a camera.

The XR device 100c may perform remote access and/or remote control of the robot 100a through the network. In this case, the robot 100a may perform an operation or travel by sharing a view or screen with a user of the XR device 100c and controlling a driving unit based on control/interaction of the user. At this point, the robot 100a may obtain intention information of interaction according to a user's movement or voice, determine a response based on the obtained intention information, and perform an operation.

The robot 100a to which the XR technology is applied may refer to a robot subject to control/interaction in an XR image. In this case, the robot 100a may be distinguishable from the XR device 100c and interact with each other. In this case, the robot 100a may be distinguishable from the XR device 100c and interact with each other. If the robot subject to control/interaction in the XR image acquires sensor information from sensors including a camera, the robot 100a or the XR device 100 may generate an XR image based on the sensor information and the XR device 100c may output the generated XR image. In addition, the robot 100a may operate based on a control signal input through the XR device 100c or based on a user's interaction.

For example, a user may check an XR image corresponding to a viewpoint of the robot 100a remotely interacting through an external device such as the XR device 100c and, through interaction, the user may control a self-driving path of the mobile robot 100a, control an operation or travel, or check information on a surrounding object.

The self-driving vehicle 100b may include a mobile robot, a vehicle, a train, a manned/unmanned flying object, a vessel, etc.

The self-driving vehicle 100b may include a self-driving control module for controlling an autonomous driving function, and the self-driving control module may refer to a software module or a chip which implements the software module. The self-driving control module may be included as an element of the self-driving vehicle 100b and may be constructed as additional hardware outside the autonomous vehicle 100b and connected to the self-driving vehicle 100b.

Using sensor information obtained from various sensors, the autonomous vehicle 100b may obtain state information of the self-driving vehicle 100b, detect (recognize) a surrounding environment and an object, generate map data, determine a moving path and a travel plan, or determine an operation.

Here, in order to determine a moving path and a travel plan, the self-driving vehicle 100b may utilize sensor information obtained from at least one sensors among a lidar, a radar, and a camera, as does the robot 100a.

In particular, the self-driving vehicle 100b may recognize an environment or an object in a hidden area or an area at a predetermined distance, by receiving sensor information from external devices to or more or may receive information recognized by the external devices from the external devices.

The XR device 100c may perform remote access and/or remote control of the self-driving vehicle 100b through the network 10. In this case, the robot 100a may be distinguishable from the XR device 100c and interact with each other. In this case, the robot 100a may be distinguishable from the XR device 100c and interact with each other. If the robot subject to control/interaction in the XR image acquires sensor information from sensors including a camera, the robot 100a or the XR device 100 may generate an XR image based on the sensor information and the XR device 100c may output the generated XR image. In addition, the robot 100a may operate based on a control signal input through the XR device 100c or based on a user's interaction.

The self-driving vehicle 100b to which the XR technology is applied may refer to an self-driving vehicle having a means for providing an XR image, an self-driving vehicle subject to control/interaction in an XR image, and the like. In particular, the self-driving vehicle 100b subject to control/interaction in an XR image may be distinguishable from the XR device 100c and interact with each other.

The self-driving vehicle 100b having a means for providing an ZR image may obtain sensor information from sensors including a camera, and output an XR mage generated based on the obtained sensor information. For example, the self-driving vehicle 100b may be provided with an HUF and output an XR image, so that an XR object corresponding to a reality object or an object in a screen can be provided to an occupant.

At this point, in the case where an XR object is output on a HUD, the XR object may be output in a manner in which at least a part of the XR object overlaps an actual object gated by an occupant. On the other hand, in the case where an XR object is output to a display provided inside the self-driving vehicle 100b, the XR object may be output in a manner in which at least a part of the XR object overlaps an object existing in a picture. For example, the self-driving vehicle 100b may output XR objects corresponding to an object such as a traffic lane, another vehicle, a traffic light, a traffic sign, a two-wheeled vehicle, a pedestrian, a building, etc.

If sensor information is obtained from sensors including a camera, the self-driving vehicle 100b subject to control/interaction in an XR image may generate an XR image based on the sensor information and the XR device 100c may output the generated XR image. In addition, such an self-driving vehicle 100b may operate based on a control signal input through an external device such as the XR device 100c or based on a user's interaction.

The XR device 100c may be provided inside the robot 100a and/or the self-driving vehicle 100b to provide an additional XR content to a user or may provide a user with an image of the inside/outside of the robot 100a and/or the self-driving vehicle 100b.

Further, the XR device 100c may be used for various services such as entertainment, exercise, education, traffic, medials, electronic transactions, manufacturing, national security, etc. For example, it is possible to experience or watch movies, theme parks, sports, etc. through the XR device 100c and support medical experiment and training for a dangerous situation, such as a fire drill. In addition, it is possible to provide route search service, such as AR Ways, using a localization and map generation (simultaneous localization and mapping (SLAM)) technology through the XR device 100c and to look up and purchase a product by accessing a virtual shopping mall.

What is claimed is:

1. A 360-degree video data processing method performed by a 360-degree video reception apparatus, the method comprising:
   receiving 360-degree video data including encoded pictures;
   obtaining metadata;
   decoding pictures; and
   rendering the decoded pictures and an overlay based on the metadata,
   wherein:
   the metadata includes overlay related metadata,
   the overlay related metadata includes packing information of the overlay,
   in response to the packing information of the overlay indicating a specific value, an unpacking prior to rendering of projected pictures of the overlay is required based on information that represents a mapping between packed regions of the overlay and projected regions of the overlay, and
   the overlay is rendered based on the overlay related metadata.

2. The method of claim 1, wherein:
   the packing information of the overlay includes information as to whether region-wise packing is applied to the overlay.

3. The method of claim 2, wherein the packing information includes information on whether a texture atlas is applied to the overlay.

4. The method of claim 1, wherein the overlay related metadata includes location information, size information, and transform type information of the overlay.

5. The method of claim 4, wherein transform type information indicates one among none, mirroring horizontally, rotation by 180 degrees, mirroring horizontally after rotation by 180 degrees, mirroring horizontally after rotation by 90 degrees, rotation by 90 degrees, mirroring horizontally after rotation by 270 degrees, and rotation by 270 degrees.

6. The method of claim 1, wherein the overlay related metadata includes information as to whether the overlay is projected to a projected picture as a rectangle when the overlay is placed on a sphere.

7. The method of claim 1, wherein the overlay related metadata includes static metadata of the overlay, and
   the static metadata of the overlay is stored in an OverlayConfigBox.

8. The method of claim 7, wherein the OverlayConfigBox is included in a ProjectedOmniVideoBox.

9. The method of claim 1, wherein the overlay related metadata includes static metadata of the overlay, and
   the static metadata of the overlay is stored in an OverlayConfigProperty.

10. The method of claim 9, wherein the OverlayConfigProperty is included in an ItemPropertyContainerBox.

11. The method of claim 1, wherein the overlay related metadata includes information on opacity of the overlay.

12. The method of claim 1, wherein the overlay related metadata includes information on a blending type to be applied to the overlay, wherein the blending type includes source over.

13. The method of claim 1, wherein:
   the overlay related metadata includes interaction information of the overlay, and
   the interaction information of the overlay includes at least one of information on whether on/off switching of the overlay is possible by an user interaction, information on whether the overlay is movable by the user interaction, information on whether depth of the overlay is changeable by the user interaction, information on whether rotation of the overlay is possible by the user interaction, and information on whether resizing of the overlay is possible by the user interaction.

14. The method of claim 1, wherein the overlay related metadata includes group information indicating picture to be rendered with the overlay.

15. The method of claim 1, wherein the 360 video reception apparatus is connected to a self-driving vehicle and provides an image of an inside or outside of the self-driving vehicle to a user.

16. A 360-degree video data processing method performed by a 360-degree video transmission apparatus, the method comprising:
    obtaining a 360-degree video;
    deriving pictures;
    generating metadata;
    encoding the pictures; and
    performing a process for storing or transmitting the encoded pictures and the metadata,
    wherein:
    the metadata includes metadata related to an overlay,
    the overlay related metadata includes packing information of the overlay,
    in response to the packing information of the overlay indicating a specific value, an unpacking prior to rendering of projected pictures of the overlay is required based on information that represents a mapping between packed regions of the overlay and projected regions of the overlay.

17. The method of claim 16, wherein:
    the packing information of the overlay includes information whether region-wise packing is applied to the overlay.

18. The method of claim 16, wherein the metadata related to the overlay further includes location information, size information, and transform type information of the overlay in the decoded picture.

19. A 360-degree video reception apparatus comprising:
    a reception processor configured to receive 360-degree video data including encoded pictures, and obtain metadata;
    a data decoder configured to decode pictures; and
    a renderer configured to render the decoded pictures and an overlay based on the metadata,
    wherein:
    the metadata includes overlay related metadata,
    the overlay related metadata includes packing information of the overlay, and
    in response to the packing information of the overlay indicating a specific value, an unpacking prior to rendering of projected pictures of the overlay is required based on information that represents a mapping between packed regions of the overlay and projected regions of the overlay, and
    the renderer is configured to render the overlay based on the overlay related metadata.

20. A 360-degree video transmission apparatus comprising:
    a projection processor configured to generate pictures of the 360-degree video;
    a metadata processor configured to generate metadata;
    a data encoder configured to encode the pictures; and
    a transmission processor configured to perform a process for storing or transmitting the encoded pictures and the metadata,
    wherein:
    the metadata includes metadata related to an overlay,
    the overlay related metadata includes packing information of the overlay, and
    in response to the packing information of the overlay indicating a specific value, an unpacking prior to rendering of projected pictures of the overlay is required based on information that represents a mapping between packed regions of the overlay and projected regions of the overlay.

* * * * *